United States Patent
Leinbaugh

(10) Patent No.: US 10,649,583 B1
(45) Date of Patent: May 12, 2020

(54) SENSOR FUSION ALGORITHMS FOR A HANDHELD CONTROLLER THAT INCLUDES A FORCE SENSING RESISTOR (FSR)

(71) Applicant: Valve Corporation, Bellevue, WA (US)

(72) Inventor: Jeffrey George Leinbaugh, Kirkland, WA (US)

(73) Assignee: Valve Corporation, Bellevue, WA (US)

(*) Notice: Subject to any disclaimer, the term of this patent is extended or adjusted under 35 U.S.C. 154(b) by 0 days.

(21) Appl. No.: 16/289,420

(22) Filed: Feb. 28, 2019

Related U.S. Application Data

(63) Continuation-in-part of application No. 15/984,245, filed on May 18, 2018, which is a continuation-in-part
(Continued)

(51) Int. Cl.
*G06F 3/041* (2006.01)
*G06F 3/044* (2006.01)
(Continued)

(52) U.S. Cl.
CPC ........ *G06F 3/0418* (2013.01); *G06F 3/03547* (2013.01); *G06F 3/044* (2013.01);
(Continued)

(58) Field of Classification Search
CPC ........ A63F 13/20; A63F 13/21; A63F 13/214; A63F 13/218; A63F 13/22; A63F 13/24;
(Continued)

(56) References Cited

U.S. PATENT DOCUMENTS 5,184,120 A * 2/1993 Schultz .................. G06F 3/023
340/870.04
5,302,936 A 4/1994 Yaniger
(Continued)

OTHER PUBLICATIONS

Brown et al, "5 improvements we're excited to see from Valve's 'Knuckles' controllers", retrieved on Jan. 20, 2019 at <<https://www.vrheads.com/5-Improvements-were-exclted-see-valves-knuckles-controllers>>, VR Heads, Jul. 11, 2017.
(Continued)

*Primary Examiner* — Thomas J. Cleary
(74) *Attorney, Agent, or Firm* — Lee & Hayes, P.C.

(57) ABSTRACT

Logic of a handheld controller can implement sensor fusion algorithms based on force data provided by a force sensing resistor (FSR) in combination with touch sensor data provided by a touch sensor. An example sensor fusion algorithm can be used to pause calibration adjustments for the touch sensor—at least with respect to a high-level value that corresponds to a touch of a control—in response to a user pressing upon the control of the handheld controller with an above-threshold amount of force, which may be detected by a FSR associated with the control. For instance, calibration adjustments with respect to the high-level value can be paused in response to FSR values crossing a threshold value from below the threshold value to above the threshold value, and the calibration adjustments can be resumed in response to the FSR values crossing the threshold value in the opposite direction.

20 Claims, 32 Drawing Sheets

Related U.S. Application Data of application No. 15/834,372, filed on Dec. 7, 2017, now Pat. No. 10,307,669, which is a continuation-in-part of application No. 15/679,521, filed on Aug. 17, 2017, now Pat. No. 10,391,400, which is a continuation-in-part of application No. 29/580,635, filed on Oct. 11, 2016, now Pat. No. Des. 806,173.

(60) Provisional application No. 62/520,958, filed on Jun. 16, 2017.

(51) Int. Cl.
    *G06F 3/0354* (2013.01)
    *A63F 13/22* (2014.01)
    *A63F 13/218* (2014.01)
    *A63F 13/24* (2014.01)

(52) U.S. Cl.
    CPC .......... *A63F 13/218* (2014.09); *A63F 13/22* (2014.09); *A63F 13/24* (2014.09); *A63F 2300/1018* (2013.01); *A63F 2300/1043* (2013.01); *A63F 2300/1056* (2013.01); *G06F 2203/04105* (2013.01); *G06F 2203/04108* (2013.01)

(58) Field of Classification Search
    CPC ........ A63F 13/245; A63F 13/40; A63F 13/44; A63F 2300/1018; A63F 2300/1043; A63F 2300/1056; G06F 3/011; G06F 3/014; G06F 3/03547; G06F 3/038; G06F 3/041; G06F 3/0414; G06F 3/0418; G06F 3/04142; G06F 3/044; G06F 2203/04105; G06F 2203/04108
    See application file for complete search history.

(56) References Cited

U.S. PATENT DOCUMENTS

| | | | |
|---|---|---|---|
| 7,932,892 B2 | 4/2011 | Chen et al. | |
| 8,062,126 B2 | 11/2011 | Marks et al. | |
| 8,636,199 B1 | 1/2014 | Slayden et al. | |
| 8,816,964 B2* | 8/2014 | Edwards | G06F 3/021 345/168 |
| 9,690,408 B1* | 6/2017 | Krah | G06F 3/0412 |
| 9,696,223 B2 | 7/2017 | Lisseman et al. | |
| 10,353,506 B2* | 7/2019 | Vosgueritchian | G06F 3/0414 |
| 10,386,224 B2 | 8/2019 | Shim et al. | |
| 2002/0010020 A1 | 1/2002 | Johnson | |
| 2002/0175894 A1 | 11/2002 | Grillo | |
| 2004/0012557 A1 | 1/2004 | Daniel | |
| 2005/0172734 A1 | 8/2005 | Alsio et al. | |
| 2005/0179644 A1 | 8/2005 | Alsio et al. | |
| 2005/0259069 A1 | 11/2005 | Baker et al. | |
| 2006/0146018 A1 | 7/2006 | Arneson et al. | |
| 2006/0293864 A1* | 12/2006 | Soss | G06F 3/0414 702/104 |
| 2007/0078316 A1 | 4/2007 | Hoarau et al. | |
| 2007/0146349 A1 | 6/2007 | Errico et al. | |
| 2007/0249422 A1 | 10/2007 | Podoloff | |
| 2008/0136778 A1 | 6/2008 | Hursh | |
| 2008/0146336 A1 | 6/2008 | Feldman et al. | |
| 2008/0261693 A1 | 10/2008 | Zalewski | |
| 2008/0311990 A1 | 12/2008 | Chiu et al. | |
| 2009/0005166 A1 | 1/2009 | Sato | |
| 2009/0256817 A1 | 10/2009 | Perlin et al. | |
| 2009/0305786 A1 | 12/2009 | Chang | |
| 2010/0245239 A1 | 9/2010 | Sternberg | |
| 2011/0059796 A1 | 3/2011 | Kondo et al. | |
| 2011/0080339 A1 | 4/2011 | Sun et al. | |
| 2011/0084932 A1* | 4/2011 | Simmons | G06F 3/0414 345/174 |
| 2011/0159959 A1 | 6/2011 | Mallinson et al. | |
| 2012/0088580 A1 | 4/2012 | Takeda et al. | |
| 2012/0143091 A1* | 6/2012 | Annett | A61B 5/228 600/590 |
| 2012/0214594 A1 | 8/2012 | Kirovski et al. | |
| 2013/0027341 A1 | 1/2013 | Mastandrea | |
| 2013/0063342 A1 | 3/2013 | Chen et al. | |
| 2013/0096849 A1 | 4/2013 | Campbell et al. | |
| 2014/0098018 A1 | 4/2014 | Kim et al. | |
| 2014/0240267 A1 | 8/2014 | Luo | |
| 2015/0091858 A1 | 4/2015 | Rosenberg et al. | |
| 2015/0120777 A1 | 4/2015 | Ramos | |
| 2015/0352437 A1 | 12/2015 | Koseki et al. | |
| 2016/0026253 A1 | 1/2016 | Bradski et al. | |
| 2016/0030835 A1 | 2/2016 | Argiro | |
| 2016/0085355 A1* | 3/2016 | Pirogov | G06F 3/041 345/174 |
| 2016/0124500 A1 | 5/2016 | Lee et al. | |
| 2016/0246369 A1 | 8/2016 | Osman | |
| 2016/0259404 A1 | 9/2016 | Woods | |
| 2016/0283008 A1 | 9/2016 | Perlin et al. | |
| 2016/0306932 A1 | 10/2016 | Fateh et al. | |
| 2016/0317267 A1* | 11/2016 | Meerbeek | A46B 15/0004 |
| 2016/0342218 A1 | 11/2016 | Burba et al. | |
| 2016/0356658 A1* | 12/2016 | Hou | G01L 1/20 |
| 2016/0357261 A1 | 12/2016 | Bristol et al. | |
| 2017/0031503 A1 | 2/2017 | Rosenberg et al. | |
| 2017/0139481 A1 | 5/2017 | Long | |
| 2017/0205903 A1 | 7/2017 | Miller et al. | |
| 2017/0351345 A1 | 12/2017 | Nirjon et al. | |
| 2018/0025531 A1 | 1/2018 | Terahata | |
| 2018/0067545 A1 | 3/2018 | Provancher et al. | |
| 2018/0099219 A1 | 4/2018 | Hope et al. | |
| 2018/0161670 A1 | 6/2018 | Boev | |
| 2018/0264357 A1 | 9/2018 | Dalton et al. | |
| 2018/0272232 A1 | 9/2018 | Campbell et al. | |
| 2019/0076716 A1* | 3/2019 | Chiou | A63B 69/00 |
| 2019/0138107 A1 | 5/2019 | Nietfeld et al. | |
| 2019/0232160 A1 | 8/2019 | Hope et al. | |
| 2019/0325651 A1 | 10/2019 | Bradner et al. | |
| 2019/0344173 A1 | 11/2019 | Mucha et al. | |

OTHER PUBLICATIONS

Non Final Office Action dated Jan. 8, 2019 for U.S. Appl. No. 15/679,521 "Electronic Controller With Hand Retainer and Finger Motion Sensing" Mucha, 11 pages.
Non Final Office Action dated Jan. 8, 2019 for U.S. Appl. No. 15/834,425 "Electronic Controller with a Hand Retainer, outer shell, and finger sensing" Hope, 11 pages.
Non Final Office Action dated Jan. 18, 2019 for U.S. Appl. No. 15/834,425 "Electronic Controller with a Hand Retainer, outer shell, and finger sensing" Hope, 20 pages.
PCT Search Report and Written Opinion dated Feb. 6, 2019 for PCT Application No. PCT/US2018/064116, 8 pages.
PCT Search Report and Written Opinion dated Feb. 8, 2019 for PCT Application No. PCT/US2018/064120, 11 pages.
Non Final Office Action dated Jul. 15, 2019 for U.S. Appl. No. 16/010,385 "Electronic Controller with Finger Motion Sensing" Nietfeld, 11 pages.
Freescale Semiconductor, Inc. "Touch Sensors", 2009, <<https://www.freescale.com/touch>>, 2 pages.
Invitation to Pay Fees dated Aug. 6, 2019 for Application PCT/US2019/32982 "Sensor Fusion Algorithms for a Handheld Controller That Includes a Force Sensing Resistor (FSR)", 2 pages.
Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.
Final Office Action dated Jul. 29, 2019 for U.S. Appl. No. 15/834,425 "Electronic Controller with a Hand Retainer, outer shell, and finger sensing" Hope, 23 pages.
Non Final Office Action dated Sep. 19, 2019 for U.S. Appl. No. 15/984,231 "Force Sensing Resistor (FSR) With Polyimide Substrate, Systems, and Methods Thereof" Campbell, 35 pages.
PCT Search Report and Written Opinion dated Jul. 24, 2019 for PCT Application No. PCT/US19/32928, 4 pages.

(56) References Cited

OTHER PUBLICATIONS

PCT Search Report and Written Opinion dated Oct. 8, 2019 for PCT Application No. PCT/US19/32982, 11 pages.
PCT Search Report and Written Opinion dated Aug. 15, 2019 for PCT Application No. PCT/US2019/032968, 12 pages.
PCT Search Report and Written Opinion dated Sep. 10, 2019 for PCT Application No. PCT/US2019/037794, 10 pages.
PCT Search Report and Written Opinion dated Sep. 17, 2019 for PCT Application No. PCT/US2019/037802, 7 pages.

* cited by examiner

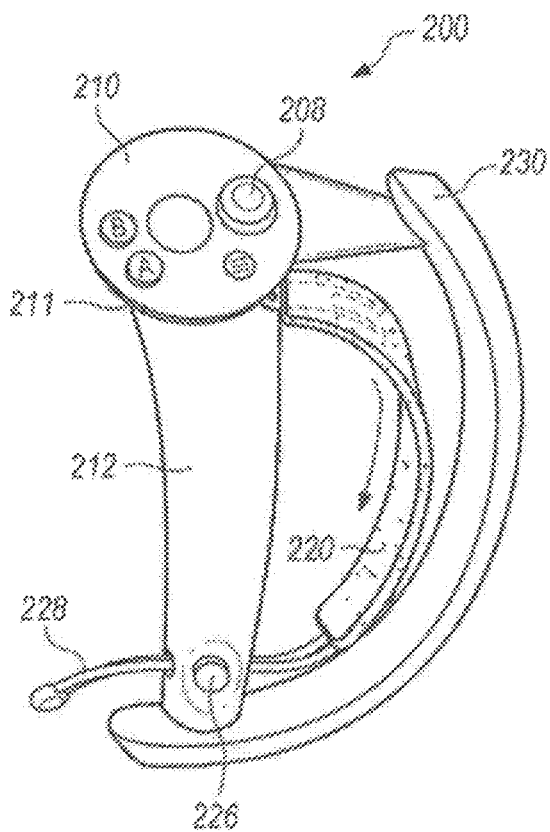 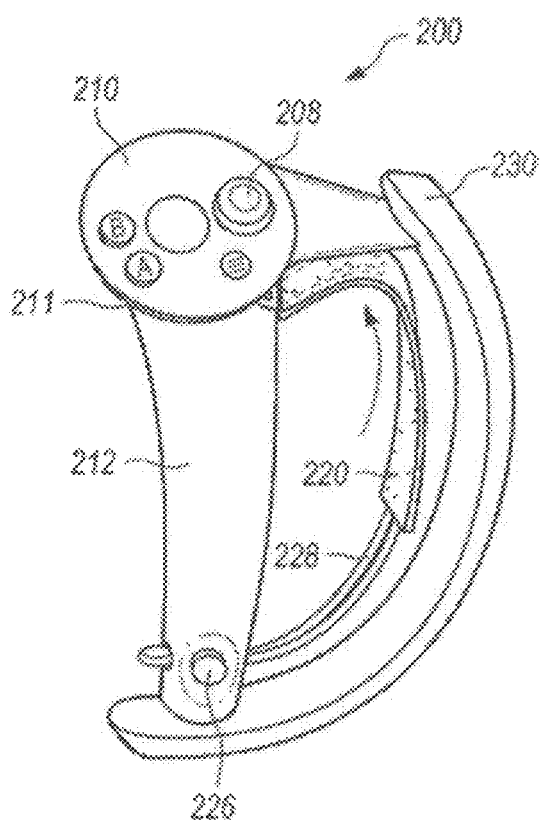
FIG. 10A  FIG. 10B
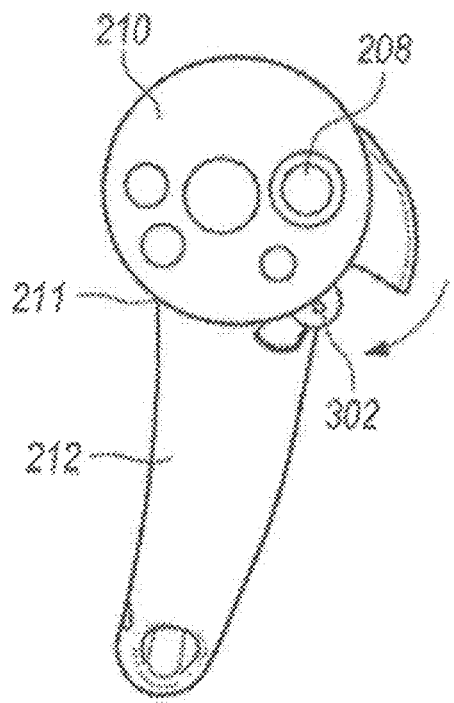 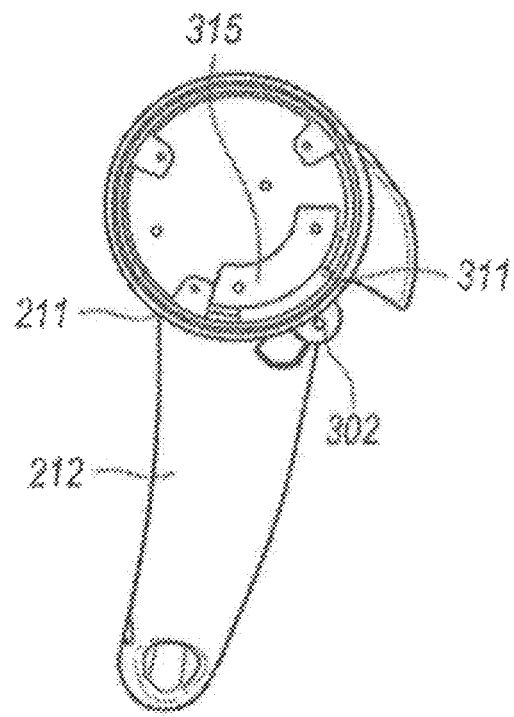
FIG. 11A  FIG. 11B

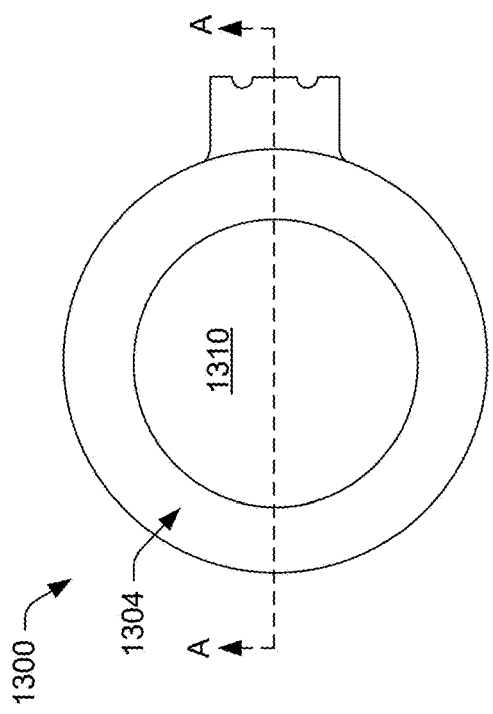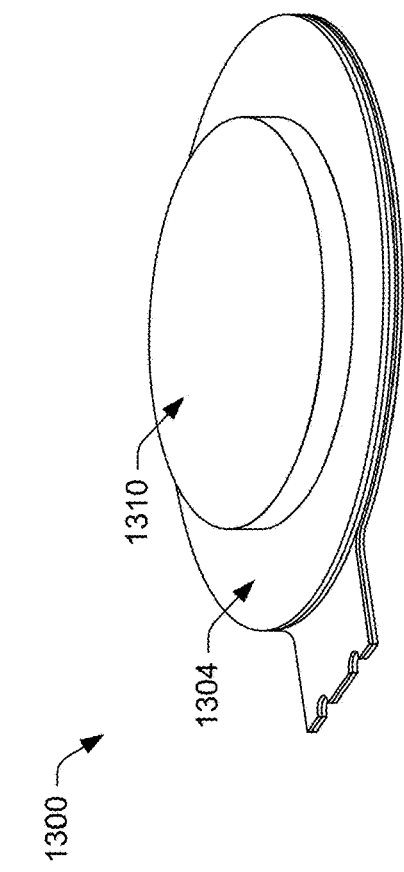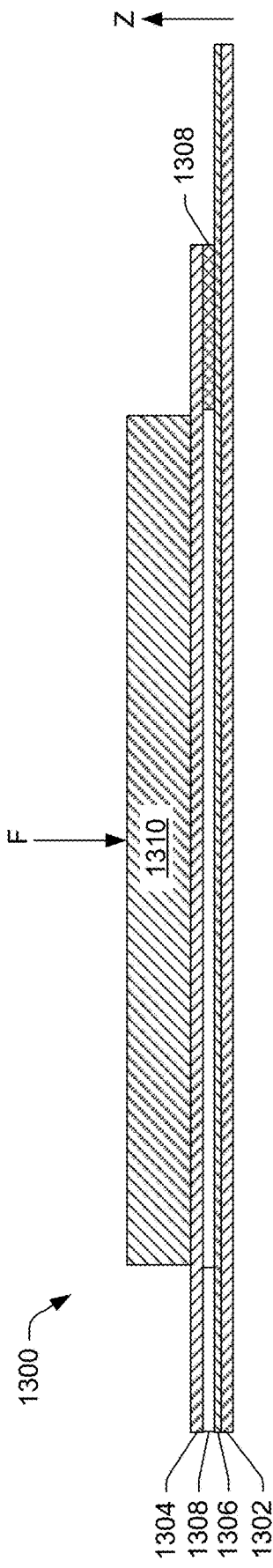
FIG. 13A
FIG. 13B
FIG. 13C

STAGE 1  STAGE 2  STAGE 3  STAGE 4

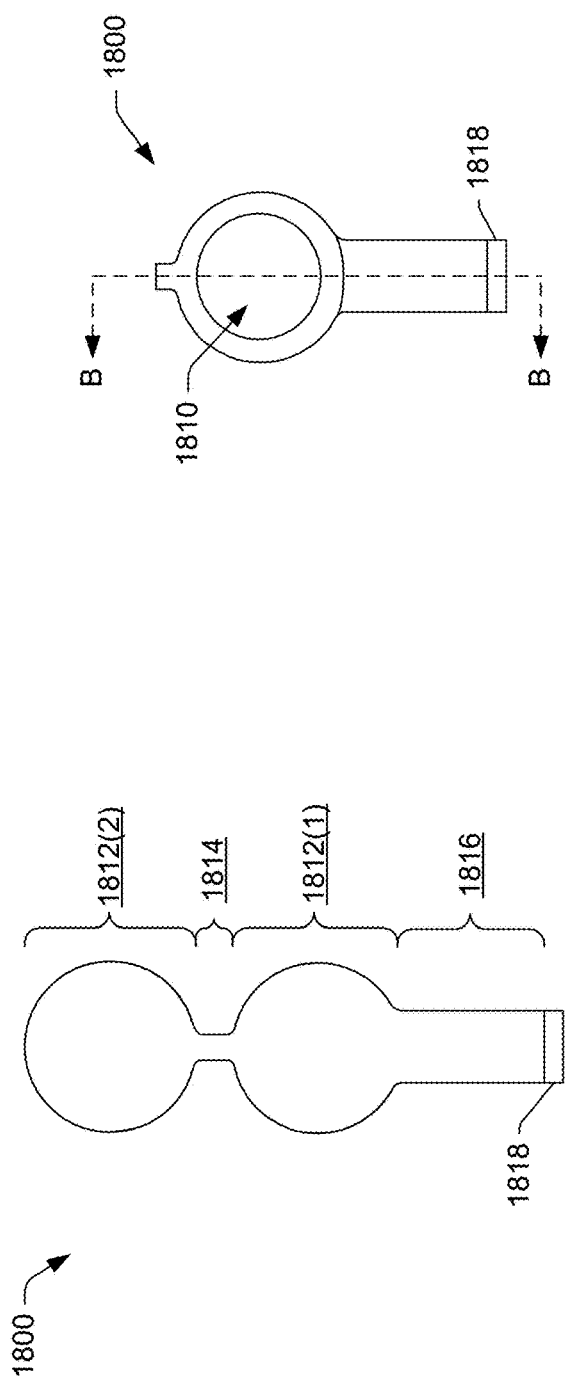
FIG. 18A (Before Fold)
FIG. 18B (After Fold)
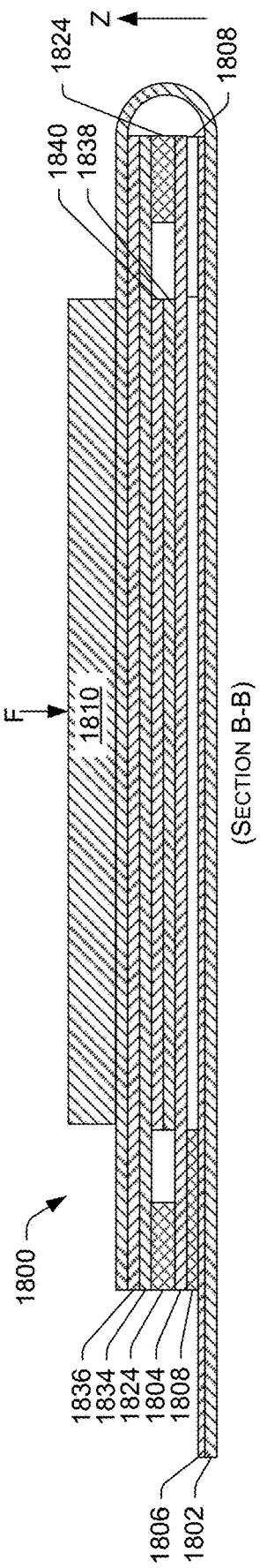
FIG. 18C (Section B-B)

SENSOR FUSION ALGORITHMS FOR A HANDHELD CONTROLLER THAT INCLUDES A FORCE SENSING RESISTOR (FSR)

CROSS-REFERENCE TO RELATED APPLICATIONS

This application claims priority under 35 U.S.C. § 120 as a continuation-in-part to pending U.S. patent application Ser. No. 15/984,245 filed on 18 May 2018, entitled "SENSOR FUSION ALGORITHMS FOR A HANDHELD CONTROLLER THAT INCLUDES A FORCE SENSING RESISTOR (FSR)," which itself claims priority as a continuation-in-part to U.S. patent application Ser. No. 15/834,372 filed on 7 Dec. 2017, entitled "ELECTRONIC CONTROLLER WITH FINGER SENSING AND AN ADJUSTABLE HAND RETAINER," which itself claims priority as a continuation-in-part to U.S. patent application Ser. No. 15/679,521 filed on 17 Aug. 2017, entitled "ELECTRONIC CONTROLLER WITH HAND RETAINER AND FINGER MOTION SENSING," which itself claims priority as a continuation-in-part to U.S. patent application Ser. No. 29/580,635 filed 11 Oct. 2016, and claims priority to U.S. Provisional Patent Application 62/520,958 filed 16 Jun. 2017.

BACKGROUND OF THE DISCLOSURE

The video game industry has become large and important, and has spawned many innovations in both software and related hardware. Various hand-held video game controllers have been designed, manufactured, and sold, for a variety of game applications. Some of those innovations have applicability outside of the video game industry, such as for controllers of industrial machines, defense systems, robotics, etc. Virtual reality (VR) systems are an application of great contemporary interest and rapid technical advancement, both within and outside of the video game industry. The controllers for VR systems have to perform several different functions, and meet strict (and sometimes competing) design constraints, often while optimizing certain desired characteristics like ease of use, etc.

One example objective of controllers used in VR systems is to mimic natural interactions, such as grasping, throwing, squeezing, etc., as much as possible. Various types of sensors have been utilized in an effort to meet this objective, including, among others, the force sensing resistor (FSR), which uses variable resistance to measure an amount of force applied to the FSR. However, existing controllers with FSRs tend to exhibit fairly crude response curves (e.g., Force vs. Resistance response curves) due to the materials used in their construction, making them useful for little more than a binary (e.g., on/off) switch. This is undesirable in VR systems. In addition, mylar-based FSRs require a header connector that is large and bulky, which means that the FSR consumes a large footprint, is difficult to miniaturize, and cannot be directly soldered to other components. Yet another drawback of using mylar in the construction of an FSR is its inability to tolerate the high temperatures of a reflow oven, which limits the ways in which manufacturing costs can be reduced for mylar-based FSRs. Instead of using mylar for the bottom substrate, it is also known to construct a FSR with a printed circuit board (PCB) as the bottom substrate. However, PCB substrates also exhibit crude (and sometimes non-monotonic) response curves, rendering these types of FSRs unsuitable for VR applications. Hence, there is a need in the art for an improved controller design that may improve VR systems and/or better facilitate user operation.

BRIEF DESCRIPTION OF THE DRAWINGS

FIG. 10A depicts a front view of right-hand controller according to another example embodiment of the present disclosure, with a partially-closed hand retainer.

FIG. 10B depicts a front view the controller of FIG. 10A, except with the hand retainer fully open.

FIG. 11A depicts a front view of head and handle components of a controller according to an example embodiment of the present disclosure, including a hand retainer anchor that can move peripherally about the head.

FIG. 11B depicts the head and handle components of FIG. 11A except with a faceplate removed from the head to expose a lockable collar portion that may facilitate selective adjustment of the hand retainer anchor peripherally about the head.

FIG. 13A depicts a force sensing resistor (FSR) according to an example embodiment of the present disclosure.

FIG. 13B depicts a front view of the FSR of FIG. 13A.

FIG. 13C depicts a cross section of the FSR of FIG. 13B, taken along Section A-A, the cross section showing the first substrate made of polyimide.

FIG. 15 is not to scale. Rather, FIG. 15 is presented to illustrate example layers of material, and is not meant to represent an actual cross-sectional view of the FSR.

FIG. 16 is not to scale. Rather, FIG. 16 is presented to illustrate example layers of material, and is not meant to represent an actual cross-sectional view of the FSR.

FIG. 17 is not to scale. Rather, FIG. 17 is presented to illustrate example layers of material, and is not meant to represent an actual cross-sectional view of the FSR.

FIG. 18A depicts a front view of a FSR, before a folding step to form the complete FSR, according to another embodiment of the present disclosure.

FIG. 18B depicts a front view of the FSR of FIG. 18A, after the folding step is performed.

FIG. 18C depicts a cross section of the FSR of FIG. 18A, taken along Section B-B.

FIG. 18D is not to scale. Rather, FIG. 18D is presented to illustrate example layers of material, and is not meant to represent an actual cross-sectional view of the FSR.

DETAILED DESCRIPTION

Figure 1:
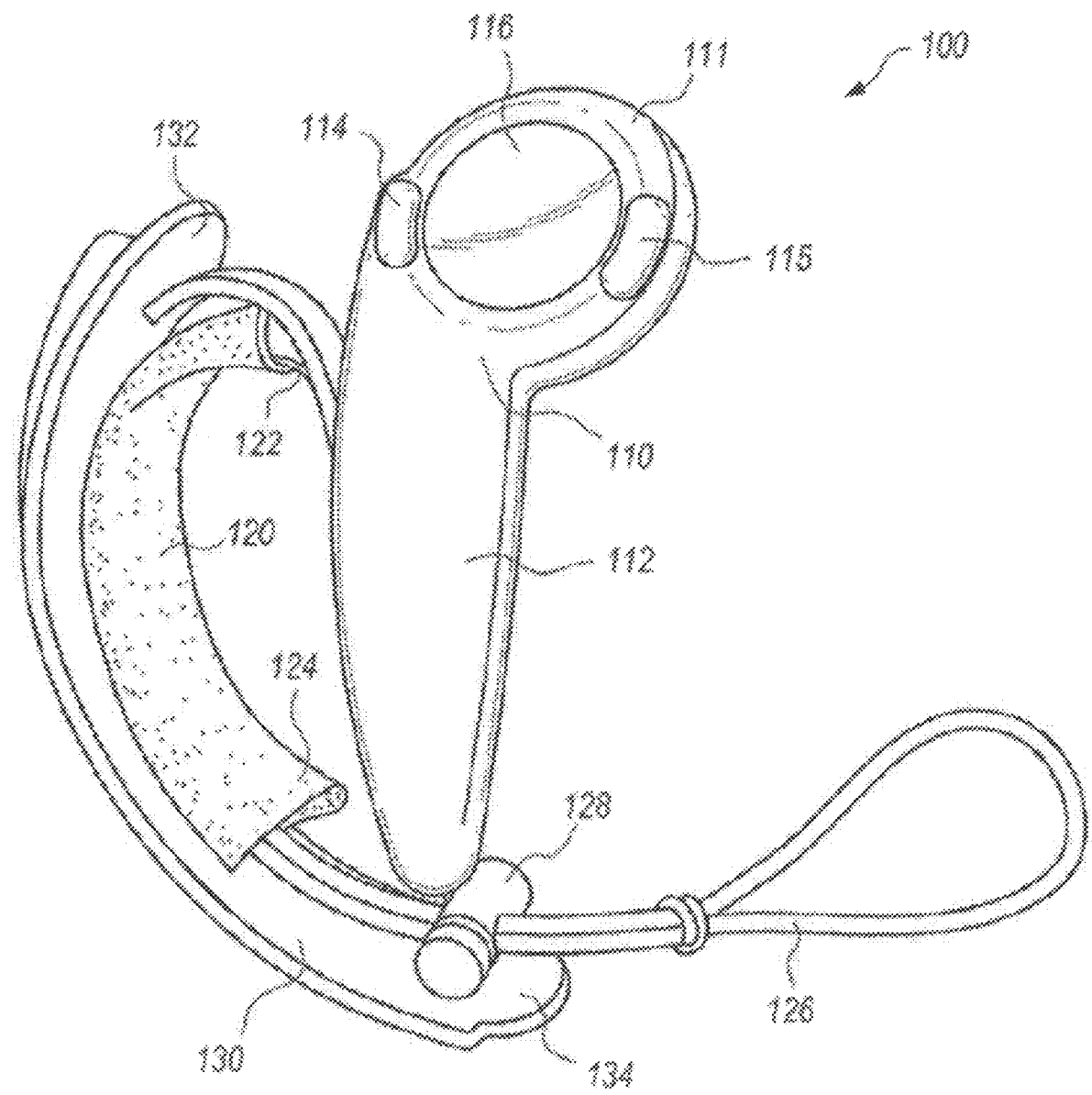
FIG. 1 depicts a controller according to an example embodiment of the present disclosure, with a hand retainer in an open position.

Described herein is, among other things, a force sensing resistor (FSR) that is constructed with a first substrate made of polyimide disposed underneath a second substrate that is resistive and flexible. The first substrate has conductive material (e.g., a plurality of interdigitated metal fingers) disposed on its front surface. One or more spacer layers are also interposed between the first substrate and the second substrate so that a center portion of the second substrate is suspended over the first substrate. An actuator is disposed on the second substrate to convey an applied force onto a front surface of the second substrate. When this occurs, the center portion of the second substrate flexes inward toward the first substrate, and some of the resistive material on the back surface of the second substrate comes into contact with some of the conductive material on the front surface of the first substrate. As the applied force increases, the surface area of the conductive material that is contacted by the resistive material increases. Likewise, as the applied force decreases, the surface area of the conductive material that is contacted by the resistive material decreases. This change in surface area contact under variable applied force causes the FSR to act as a variable resistor whose value is controlled by the applied force.

Due at least partly to the polyimide material used for the first substrate, the disclosed FSR exhibits characteristics that make it desirable for use in a controller of a VR system, among other possible end-use applications. For instance, the polyimide substrate allows for selectively soldering the output terminals (or leads) of the FSR directly onto a board (e.g., a PCB) without the use of a bulky header connector, which allows for a FSR with a smaller footprint, as compared to mylar-based FSRs that require a large, bulky header connector. Because polyimide is commonly used as a material of choice for flex circuits, the polyimide substrate of the FSR allows for conveniently connecting the FSR to other flex circuits, which may reduce the cost of manufacturing the disclosed FSR, as compared to the cost of manufacturing conventional FSRs. Polyimide can also withstand high temperatures, such as those of a reflow oven, opening the door to cost-saving manufacturing processes. In addition, polyimide—when used as the first substrate of the disclosed FSR—exhibits desirable characteristics, such as less hysteresis and higher repeatability, as compared to conventional FSRs. Overall, the disclosed FSR, having a first substrate made of polyimide, exhibits a Force vs. Resistance response curve that models a true analog input, making the FSR desirable for use in a controller of a VR system.

Also disclosed herein is a controller for an electronic system (e.g., a VR system) that includes the disclosed FSR having a first substrate made of polyimide. The controller may be configured to be held by a hand of a user and may include a controller body. The disclosed FSR can be mounted on a planar surface of a structure within the controller body, such as a structure that is mounted within a handle of the controller body, or a structure that is mounted underneath at least one thumb-operated control that is included on a head of the controller body. The FSR, when implemented in the controller for the electronic system, is configured to measure a resistance value that corresponds to an amount of force applied to an associated portion of the controller (e.g., a force applied to an outer surface of the handle, to at least one thumb-operated control, etc.).

Implementing the FSR in a controller for a VR system allows for expanding the spectrum of natural interaction beyond its current state using conventional controllers. For example, the electronic system and/or the controller can determine, via the FSR, a force with which a user squeezes the handle of the controller, and/or a force with which the user presses a thumb-operated control. Because the disclosed FSR exhibits a desirable response curve, such a controller can translate presses or squeezes of varying force into a varying digitized numerical value that can be used for a video game to control a game mechanic (e.g., to crush a rock, to squeeze a balloon, the toggle through available weapons usable by a game character, etc.). A FSR with desirable response characteristics can replace conventional mechanical switches in order to reduce fatigue of the user and/or to reduce accidental actuation of the controls. For instance, the FSR can act as a switch by detecting when an applied force exceeds a threshold. This threshold can be adjusted dynamically. For example, the threshold can be adjusted to a lower value in order to reduce hand fatigue during gameplay (e.g., when the user is pressing a control associated with the FSR to shoot a weapon frequently during gameplay). Conversely, the threshold can be adjusted to a higher value in order to reduce the instances of accidental control operation, which may be useful in a thrilling or exciting game where the user might react to stimuli in the video game.

Also disclosed herein is a handheld controller that includes logic to implement sensor fusion algorithms based on force data provided by a FSR of the controller in combination with touch data or proximity data provided by a touch sensor or an array of proximity sensors, respectively. An example sensor fusion algorithm can be used to re-calibrate the FSR when an object contacts a control associated with the FSR, as detected by the touch sensor. For instance, the logic may determine, based on touch data provided by the touch sensor, that an object has come into contact with a control on the controller body that is configured to be pressed. The logic may also determine, based on force data provided by the FSR at a time at which the object has come into contact with the control, a resistance value measured by the FSR, and may correlate the resistance value with a digitized FSR input value of zero in order to "re-calibrate" the FSR upon detecting a touch at the control.

Another example sensor fusion algorithm can be used to ignore spurious inputs detected by the FSR when an object is in contact with an adjacent control. For instance, the logic may determine, based on force data provided by the FSR, a resistance value measured by the FSR that corresponds to a digitized FSR input value which meets or exceeds a threshold value that is to be met in order to register a FSR input event for a first control of the handheld controller. The logic may also determine, based on touch data provided by the touch sensor at a time at which the FSR resistance value is measured by the FSR, that the object is in contact with a second control of the handheld controller that is adjacent to the first control, and may refrain from registering the FSR input event while the object is in contact with the second control.

Another example sensor fusion algorithm can be used to detect a hand size of a hand grasping a handle of the controller, as detected by the array of proximity sensors, and to adjust the threshold force to register a FSR input event at the FSR according to the hand size. This may be useful for making force-based input easier for users with smaller hands (and harder, but not difficult, for users with larger hands). For instance, an array of proximity sensors that are spatially distributed on a handle of the handheld controller can be used to determine a size of a hand that is grasping the handle, and the logic may adjust, based on the size of the hand, a threshold value to an adjusted threshold value that is to be met in order to register a FSR input event for the handle.

Another example sensor fusion algorithm can be used to pause calibration adjustments for the touch sensor—at least with respect to a high-level value that corresponds to a touch of a control—in response to a user pressing upon the control of the handheld controller with an above-threshold amount of force, which may be detected by a FSR associated with the control. For example, logic of the handheld controller may monitor touch sensor data provided by a touch sensor associated with a control of the handheld controller for purposes of re-calibrating or resetting at least a high-level value of a range of values measured by the touch sensor. For instance, this high-level value may correspond to an object touching the control without pressing upon the control. The calibration for the touch sensor works by iteratively adjusting the high-level value, as the handheld controller is used, so that the high-level value is calibrated to a value that correctly represents a digitized proximity value output by the touch sensor whenever an object (e.g., a finger) comes into contact with the control, without pressing upon the control. An example reason why these calibration adjustments are performed during use of the handheld controller is because the touch sensor data may drift over time for various reasons. For example, as use of the handheld controller progresses over time, the sweatiness (or dryness) of the user's hands may change, and/or the humidity, the temperature, and/or another environmental parameter may change over time, which can affect the values that are measured by the touch sensor (e.g., when the touch sensor is a capacitive sensor, the measured capacitance may be affected based on the moister on a user's hand, such as from perspiration). Accordingly, the calibration for the touch sensor adjusts for these types of changes by calibrating at least a high-level value to a value that is indicative of an object contacting the control (without pressing), as opposed to the object hovering over the control without touching the control, or the object pressing upon the control, for example.

When a user presses upon a control of the handheld controller, the touch sensor associated with that control—which is calibrated as described above and elsewhere herein—may calibrate incorrectly. This may be because the touch sensor measures a first digitized proximity value (e.g., a value of 1000 in arbitrary units) when a user's finger (or another object) initially makes contact with the control, and when the user transitions from touching to pressing hard upon the control, the user's finger will typically spread out on the top surface of the control, whereby the finger covers a larger area than before pressing. Furthermore, the top surface of the control may even deflect inward towards the controller body when the user's finger presses upon the control. This causes the digitized value measured by the touch sensor to change based on the pressure applied to the control. For instance, when a user presses upon the control, the touch sensor may measure a second digitized proximity value (e.g., a value of 1500 in the arbitrary units) that is significantly greater than the first digitized proximity value (e.g., the value of 1000) measured when the user was touching the control without pressing. This phenomenon can adversely affect the calibration of the touch sensor because, when the user presses upon the control—especially if done repeatedly—the calibration algorithm interprets the higher digitized proximity value (e.g., when a value of 1500 when the user is pressing upon the control) to be the high-level value corresponding to the user touching the control without pressing. Subsequently, after recalibrating to this false high-level value, the user may let up on the applied pressure and revert to touching the control without pressing. At this point, the calibration algorithm interprets the digitized proximity value as a value that is indicative of the user's finger lifting off of the control, when, in fact, the user may still be touching the control. This incorrect calibration may have an adverse effect on the operability of a system that uses the handheld controller with calibration tracking for the touch sensor of the control. For example, in VR applications, a virtual hand of a user shown on a display screen may drop a virtual object when the user of the handheld control does not intend to drop the virtual object (e.g., the user may still be grasping the handheld controller). As another example, a user may intend to release their grip by a small amount (e.g., transitioning from a hard grasp to a light grasp), but a VR application may interpret the touch sensor data as the user letting go of the virtual object, which is not what the user intended with the slight release of pressure.

To address these and other issues, disclosed herein is an example sensor fusion algorithm that can be used to pause calibration adjustments for a touch sensor—at least with respect to a high-level value that corresponds to a touch of a control—in response to a user pressing upon the control of the handheld controller with an above-threshold amount of force, which may be detected by a FSR associated with the control. That is, a sensor fusion algorithm can use force data provided by a FSR to drive improvements in the output of a touch sensor, such as a capacitive sensor. For instance, logic of the handheld controller may perform calibration adjustments for a touch sensor by adjusting, in response to a criterion being satisfied, a high-level value indicative of an object contacting a control associated with the touch sensor. The logic may further determine that a first digitized FSR value exceeds a threshold value indicative of a transition from the object contacting-to-pressing upon the control, and, in response to the threshold value being exceeded, the logic may pause the calibration adjustments, at least with respect to the high-level value. Subsequently, in response to determining that a second digitized FSR value is less than or equal to the threshold indicative of a transition from the object pressing-to-contacting the control, the logic may resume the calibration adjustments, at least with respect to the high-level value.

By pausing and resuming calibration adjustments for the touch sensor—with respect to the high-level value—based on force data provided by the FSR, the high-level value for the touch sensor will not be calibrated to an increased value when an object (e.g., a finger) is pressing upon a control of the handheld controller with an above-threshold amount of force. This pausing technique avoids "double counting" the input provided to the control of the handheld controller. Said another way, the FSR of the control can take over for the touch sensor as the user transitions from touching the control to pressing upon the control. Likewise, the touch sensor can take over for the FSR in the reverse direction as the user transitions from pressing upon the control to touching the control without applying pressure. This mechanism of pausing and resuming the calibration adjustments with respect to the high-level value for the touch sensor improves the calibration of the touch sensor because the high-level value will correctly correspond to a state where an object contacts the control, as opposed to a different state where the object is spaced apart from the control or a state where the object is pressing upon the control.

FIGS. 1-4 depict a controller 100 for an electronic system according to an example embodiment of the present disclosure. The controller 100 may be utilized by an electronic system such as a VR video gaming system, a robot, weapon, or medical device. The controller 100 may include a controller body 110 having a handle 112, and a hand retainer 120 to retain the controller 100 in the hand of a user (e.g. the user's left hand). The handle 112 comprises a tubular housing that may optionally be substantially cylindrical. In this context, a substantially cylindrical shape need not have constant diameter, or a perfectly circular cross-section.

In the embodiment of FIGS. 1-4, the controller body 110 may include a head (between the handle 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking member 130 that is fixed to the controller body 110, and optionally includes two noses 132, 134, each protruding from a corresponding one of two opposing distal ends of the tracking member 130. In the embodiment of FIGS. 1-4, the tracking member 130 is preferably but not necessarily a tracking arc having an arcuate shape. The tracking member 130 includes a plurality of tracking transducers disposed therein, preferably with at least one tracking transducer disposed in each protruding nose 132, 134. Additional tracking transducers may be disposed also in the controller body 110, with preferably at least one distal tracking transducer disposed adjacent the distal end 111.

The foregoing tracking transducers may be tracking sensors that are responsive to electromagnetic radiation (e.g. infrared light) emitted by the electronic system, or they may alternatively be tracking beacons that emit electromagnetic radiation (e.g. infrared light) that is received by the electronic system. For example, the electronic system may be a VR gaming system that widely broadcasts, i.e. paints, pulsed infrared light towards the controller 100, with the plurality of tracking transducers of the tracking member 130 being infrared light sensors that may receive or be shadowed from the broadcast pulsed infrared light. The tracking transducers in each nose 132, 134 (e.g. 3 sensors in each nose) preferably overhang the user's hand on each distal end of the tracking member 130, and so are better exposed (around the user's hand) to receive electromagnetic radiation emitted by the electronic system or to transmit the electromagnetic radiation to the electronic system, at more angles without an unacceptable amount of shadowing.

Preferably, the tracking member 130 and the controller body 110 are made of a substantially rigid material such as hard plastic, and are firmly fixed together so that they do not appreciably translate or rotate relative to each other. In this way, the tracking of the translation and rotation of the constellation of tracking transducers in space, is preferably not complicated by motion of the tracking transducers relative to each other. For example, as shown in FIGS. 1-4, the tracking member 130 may be fixed to the controller body 110 by being joined to the controller body 110 at two locations. The hand retainer 120 may be attached to the controller 100 (either the controller body 110 or the tracking member 130) adjacent those two locations, to bias the user's palm against the outside surface of the handle 112 between the two locations.

In certain embodiments, the tracking member 130 and the controller body 110 may comprise an integral monolithic component having material continuity, rather than being assembled together. For example, the tracking member 130 and the controller body 110 may be molded together by a single injection-molding process step, resulting in one integral hard plastic component that comprises both the tracking member 130 and the controller body 110. Alternatively, the tracking member 130 and the controller body 110 may be initially fabricated separately, and then later assembled together. Either way, the tracking member 130 may be considered as fixed to the controller body 110.

The hand retainer 120 is shown in the open position in FIG. 1. The hand retainer 120 may optionally be biased in the open position by a curved resilient member 122, to facilitate the insertion of the user's left hand between the hand retainer 120 and the controller body 110 when the user is grasping for the controller with vision blocked by VR goggles. For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 126. In such embodiments, the tension that the curved resilient member 122 imparts to the hand retainer 120 (to bias it in the open position) causes the hand retainer to automatically open when the draw cord 126 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 2:
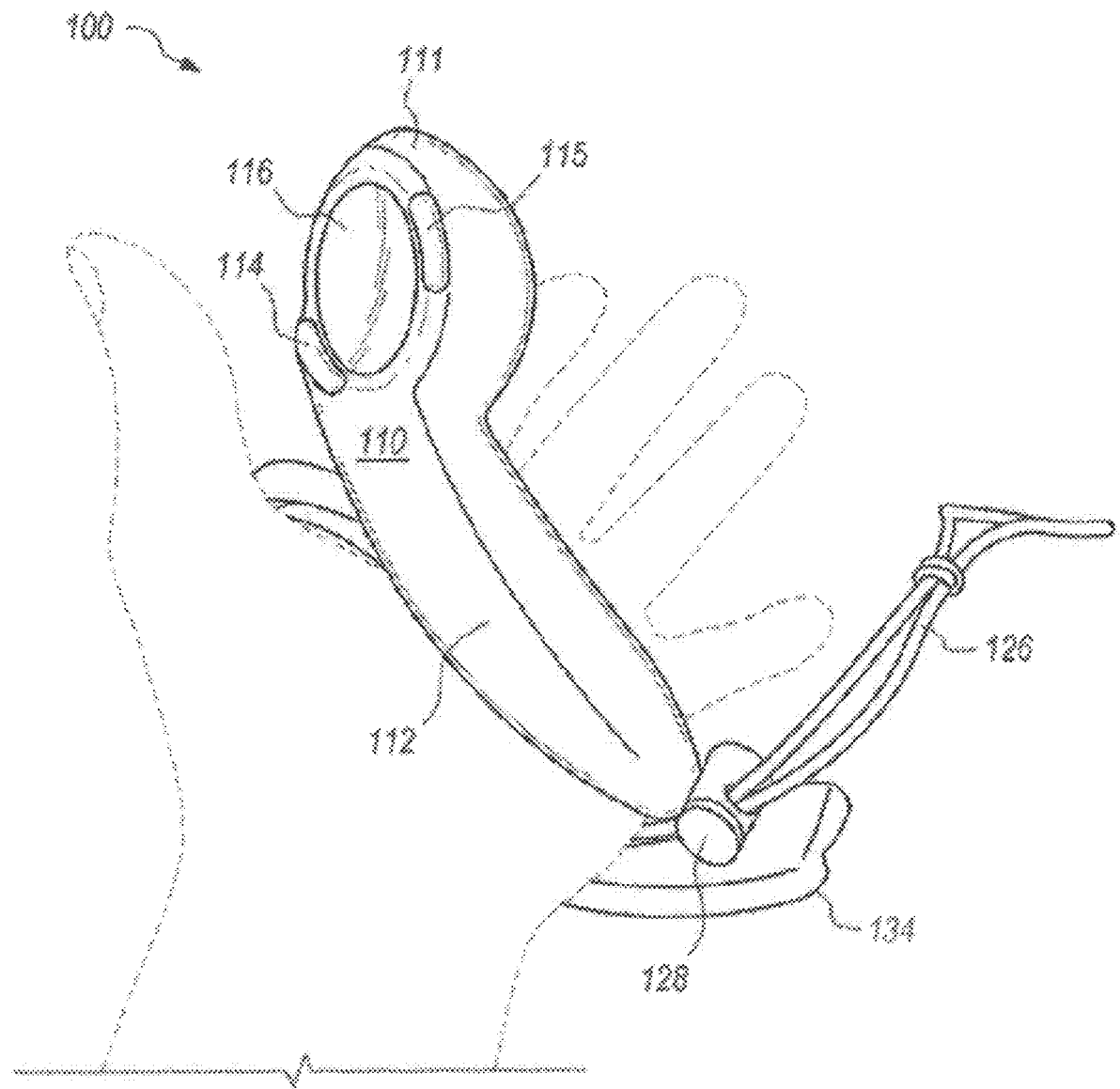
FIG. 2 depicts the controller of FIG. 1 in a user's open hand, palm up.
Figure 3:
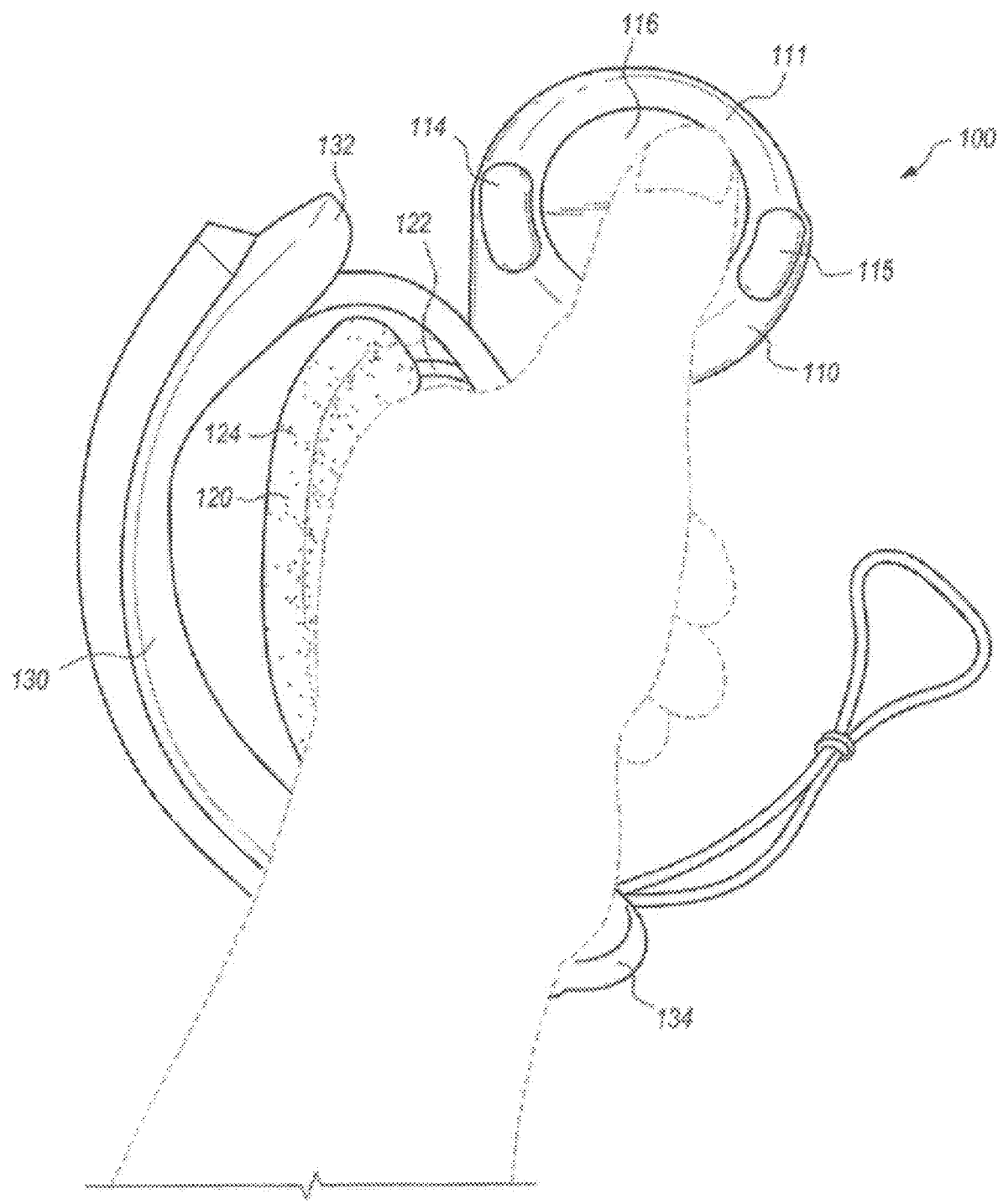
FIG. 3 depicts the controller of FIG. 1 in a user's closed hand.
Figure 4:
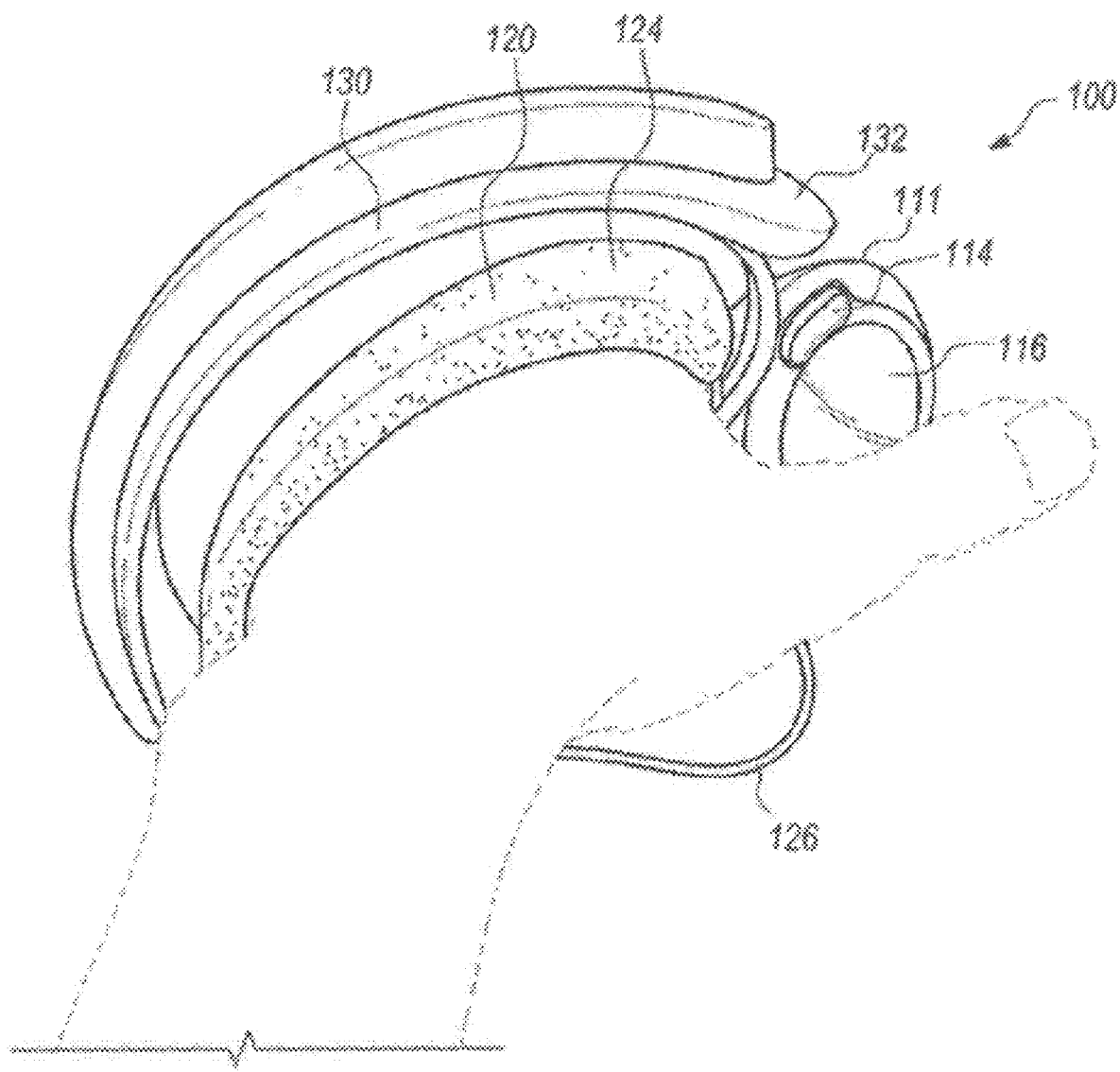
FIG. 4 depicts the controller of FIG. 1 in a user's hand, palm down.

The hand retainer 120 may be disposed between the handle 112 and the tracking member 130, and be configured to contact the back of the user's hand. FIG. 2 shows the controller 100 during operation with the user's left hand inserted therein but not grasping the controller body 110. In FIG. 2, the hand retainer 120 is closed and tightened over the hand, to physically bias the user's palm against the outside surface of the handle 112. In that way, the hand retainer 120, when closed, may retain the controller 100 to the hand even when the hand is not grasping the controller body 110. FIGS. 3 and 4 depict the controller 100 during operation when the hand retainer 120 is closed, and the hand is grasping the controller body 110 and the thumb is operating one or more of the thumb-operated controls (e.g. track pad 116).

The handle 112 of the controller body 110 preferably includes an array of proximity sensors that are spatially distributed partially or completely around its outer surface. The proximity sensors of the array are not necessarily of equal size and do not necessarily have equal spacing between them, although the array may comprise a grid. The array of proximity sensors is preferably responsive to the proximity of the user's fingers to the outside surface of the handle 112. For example, the array of proximity sensors may be a plurality of capacitive sensors embedded under the outer surface of the handle 112, with that outer surface comprising an electrically insulative material. The capacitance between such an array of capacitive sensors and a portion of the user's hand is inversely related to the distance there between. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle 112.

When the hand retainer 120 (e.g. a hand-retention strap) is closed tightly, it may serve not only to prevent the controller 100 from falling out of hand, but also to keep fingers from excessively translating relative to the proximity sensor array of the handle 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking transducers, and may render the release of a thrown object based on the sensed release of the user's fingers from the outer surface of the handle of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 1-4 may help the tracking member 130 to protect back of user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle 112 of the controller body 110, and/or tracking sensors in the tracking member 130.

Figure 5:
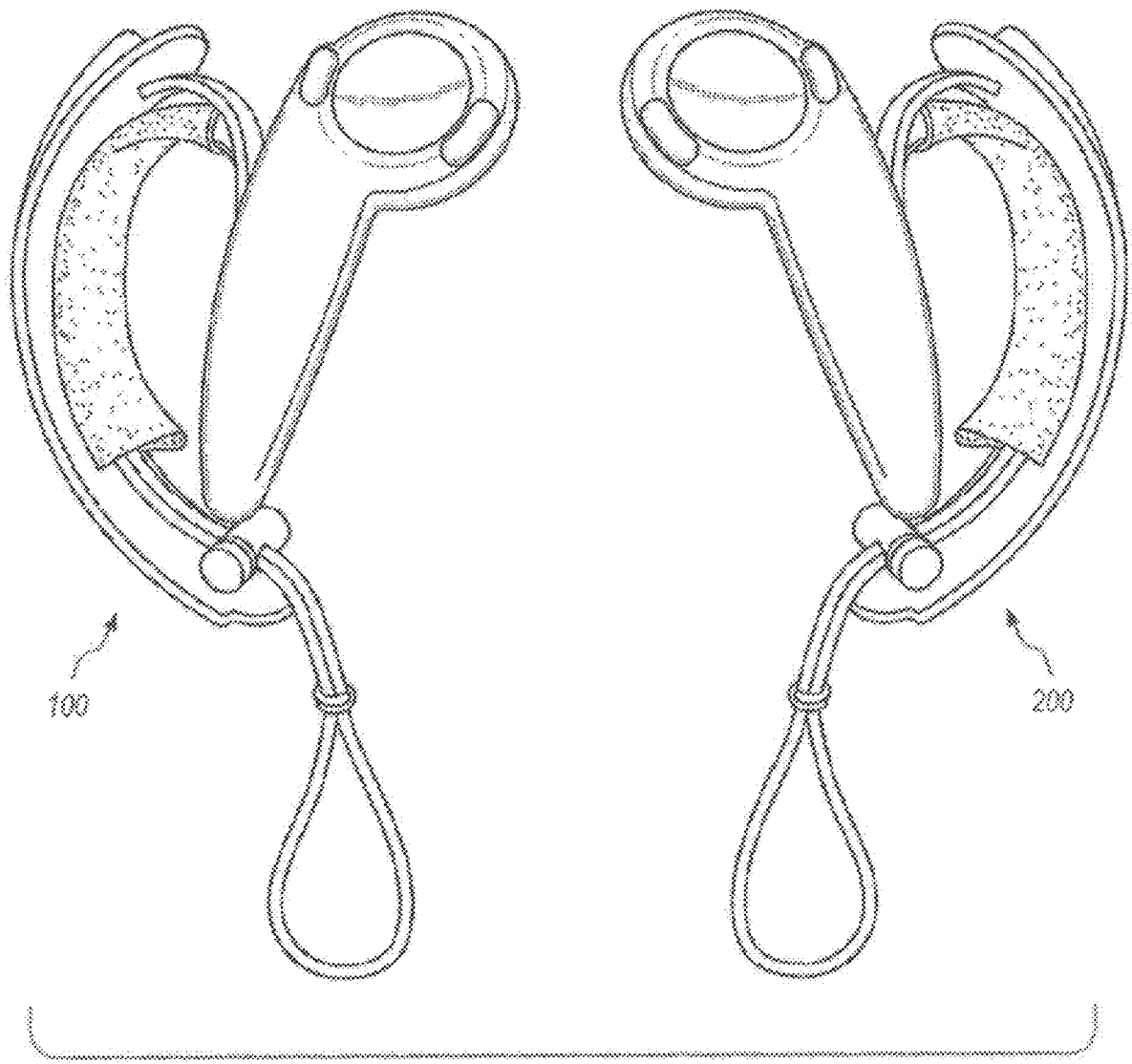
FIG. 5 depicts a pair of controllers according to an example embodiment of the present disclosure, with hand retainers in an open position.

As shown in FIG. 5, in certain embodiments the controller 100 may be the left controller in a pair of controllers that includes a similar right controller 200. In certain embodiments, the controllers 100 and 200 may (together) track the motion and grip of both of a user's hands, simultaneously, for example to enhance a VR experience.

Figure 6A:
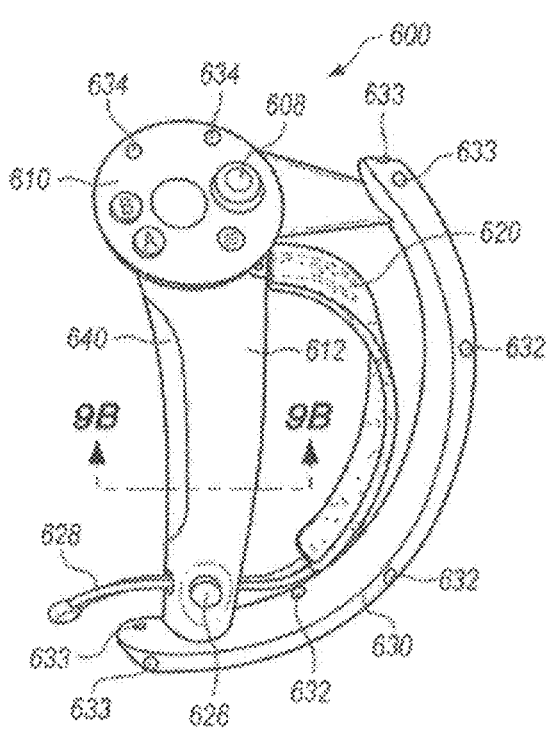
FIG. 6A depicts a front view of right-hand controller according to another example embodiment of the present disclosure.
Figure 6B:
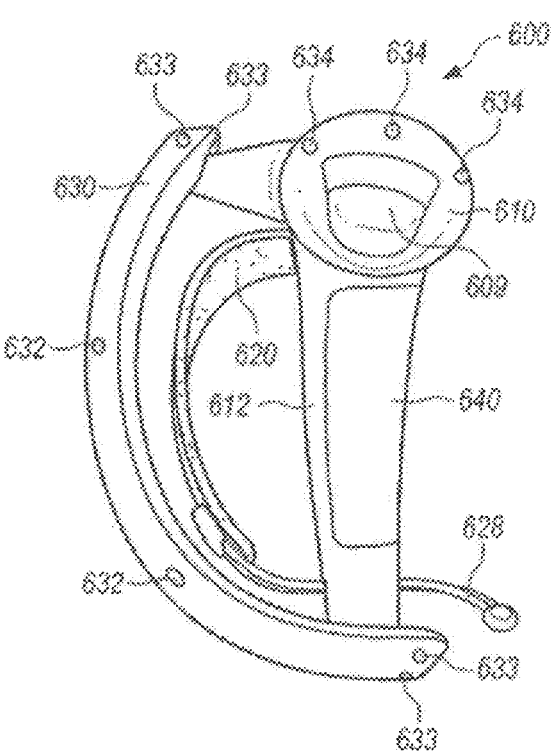
FIG. 6B depicts a back view of the right-hand controller of FIG. 6A.

FIG. 6A depicts a front view of right-hand controller 600 according to another example embodiment of the present disclosure. FIG. 6B depicts a back view of the right-hand controller 600. The controller 600 has a controller body comprising a head 610 and a handle 612. In the embodiment of FIGS. 6A-6B, the head 610 includes at least one thumb-operated control A, B, 608, and may also include a control configured to be operated by the index finger (e.g. trigger 609). The handle 612 comprises a tubular housing that is partially wrapped by an outer shell 640.

In the embodiment of FIGS. 6A-6B, a tracking member 630 is fixed to the controller body at the head 610 and at an end of the handle 612. A hand retainer 620 is configured to physically bias the user's palm against the outer shell 640 between the head 610 and the end of the handle 612. The hand retainer 620 is preferably disposed between the handle 612 and the tracking member 630, and may comprise a hand retention strap that is adjustable in length and configured to contact the back of the user's hand. In the embodiment of FIGS. 6A-6B, the hand retainer 620 optionally includes a draw cord 628, and optionally can be adjusted in length by a cord lock 626 (adjacent a distal end of the handle 612) that selectively prevents sliding motion by the draw cord 628 at the location of the cord lock 626.

In the embodiment of FIGS. 6A-6B, tracking transducers 632, 633 are disposed on the tracking member 630, with tracking transducers 633 being disposed on protruding noses at opposing distal ends of the tracking member 630. Additional tracking transducers 634 are optionally disposed on a distal region of the head 610. The tracking transducers 632, 633, and 634 may be tracking sensors that are responsive to electromagnetic radiation (e.g. infrared light) emitted by the electronic system (e.g. virtual reality gaming system), or may be tracking beacons that emit electromagnetic radiation (e.g. infrared light) that is received by the electronic system. For example, the electronic system may be a VR gaming system that widely broadcasts, i.e. paints, pulsed infrared light towards the controller 600, with the tracking transducers 632, 633, and 634 being infrared light sensors that may receive the broadcast pulsed infrared light. The response of such tracking sensors may be communicated back to the electronic system, and the system may interpret such response to effectively track the location and orientation of the controller 600.

Figure 7A:
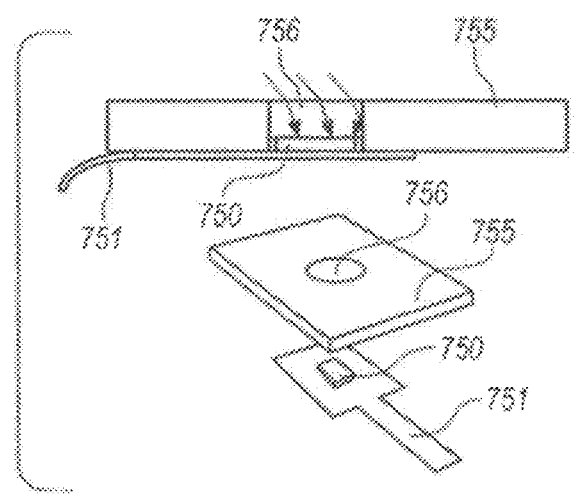
FIG. 7A depicts a window for an infrared light sensor, according to an embodiment of the present disclosure.
Figure 7B:
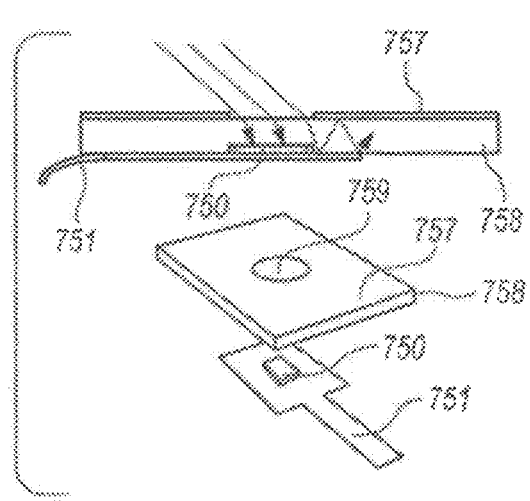
FIG. 7B depicts a window for an infrared light sensor, according to another embodiment of the present disclosure.

One or more of the tracking transducers 632, 633, 634 optionally may be structured as shown in the embodiment of FIG. 7A, or alternatively shown in the embodiment of FIG. 7B, or alternatively in a conventional way that is not shown. The lower portion of FIG. 7A depicts an exploded perspective view of an infrared light sensor 750 that is electrically connected to a flex circuit 751, shown beneath a rectangular portion of an overlying windowed housing wall 755 that comprises an infrared-opaque plastic. The windowed housing wall 755 includes a window 756. The window 756 preferably comprises an infrared-transmissive polycarbonate plastic, and may include an underside recession to accommodate the thickness of the infrared light sensor 750.

According to the embodiment of FIG. 7A, the windowed housing wall (e.g. the outer structure of the tracking member 630, or the head 610 of FIG. 6A) may be fabricated from a so-called "double shot" injection molding process, so that the majority of the housing wall is fabricated from infrared-opaque plastic, but with infrared-transmissive plastic being disposed in the window 756 above the infrared light sensor 750.

The upper portion of FIG. 7A depicts a cross-sectional view of the infrared light sensor 750, flex circuit 751, and the windowed housing wall 755 as assembled. Infrared light, shown in FIG. 7A as three downward arrows incident upon the window 756 from above, passes through the window 756 to be received by the underlying infrared light sensor 750. Since the housing wall 755 comprises infrared-opaque plastic, the infrared light that strikes it will not pass through, and a portion may be reflected back into the window to be received by the infrared light sensor 750. In this way, the window 756 permits infrared light to affect the infrared light sensor 750, despite the majority of the housing wall 755 comprising infrared-opaque plastic, so that the infrared light sensor 750 receives infrared light only from a preferred angular range.

Alternatively, one or more of the tracking transducers 632, 633, 634 optionally may be structured as shown in the embodiment of FIG. 7B. The lower portion of FIG. 7B depicts an exploded perspective view of the infrared light sensor 750 as electrically connected to the flex circuit 751, shown beneath a rectangular portion of an overlying housing wall 758 that comprises an IR-transmissive plastic. The housing wall 758 is coated with an infrared-opaque film 757 that is patterned to include a window 759 (where the infrared-opaque film 757 is absent).

The upper portion of FIG. 7B depicts a cross-sectional view of the infrared light sensor 750, flex circuit 751, the housing wall 758, and the IR-opaque film 757, as assembled. Infrared light, shown in FIG. 7B as three downward arrows incident upon the housing wall 758 from above, passes through the window 759 in the infrared-opaque film 757 to pass through the housing wall 758 there to be received by the underlying infrared light sensor 750. Since the housing wall 758 comprises infrared-transmissive plastic, the infrared light that strikes it may pass into it and be lost, and perhaps unintentionally and undesirably even reach a nearby sensor via internal reflections. In this way, the window 759 in the infrared-opaque film 757 permits infrared light to primarily affect the infrared light sensor 750.

Figure 8:
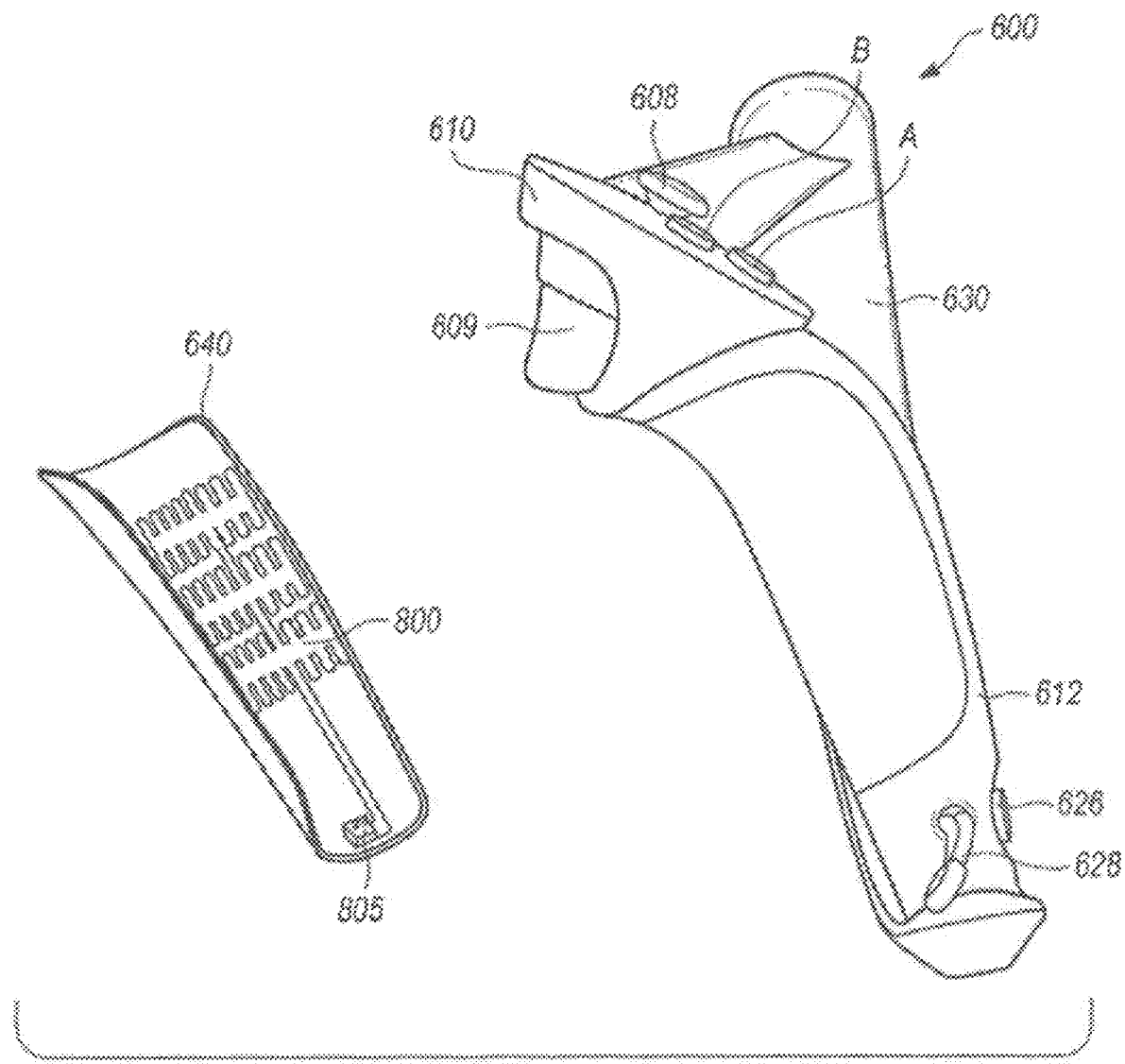
FIG. 8 shows a side view of the right-hand controller of FIG. 6A, with an outer shell that partially wraps the tubular housing of the controller's handle being exploded away to reveal instrumentation on its inner surface.

FIG. 8 shows a side view of the right-hand controller 600, with the outer shell 640, which partially wraps the tubular housing of the handle 612 being exploded away to reveal instrumentation on its inner surface. In the embodiment of FIG. 8, the instrumentation may comprise an array of proximity sensors 800 that are spatially distributed on the inner surface of the outer shell 640, the array of proximity sensors 800 being responsive to a proximity of the user's fingers to the outer shell 640. The proximity sensors 800 of the array are not necessarily of equal size, nor are they necessarily spaced regularly or equally from each other. In certain embodiments, the array of proximity sensors 800 preferably may be a plurality of capacitive sensors that may be connected to a flex circuit that is bonded to the inner surface of the outer shell 640. In the embodiment of FIG. 8, the outer shell 640 includes a first electrical connector portion 805, which may be connected to a mating second electrical connector portion of the handle 612 (as shown in more detail in FIGS. 9A-9B).

Figure 9A:
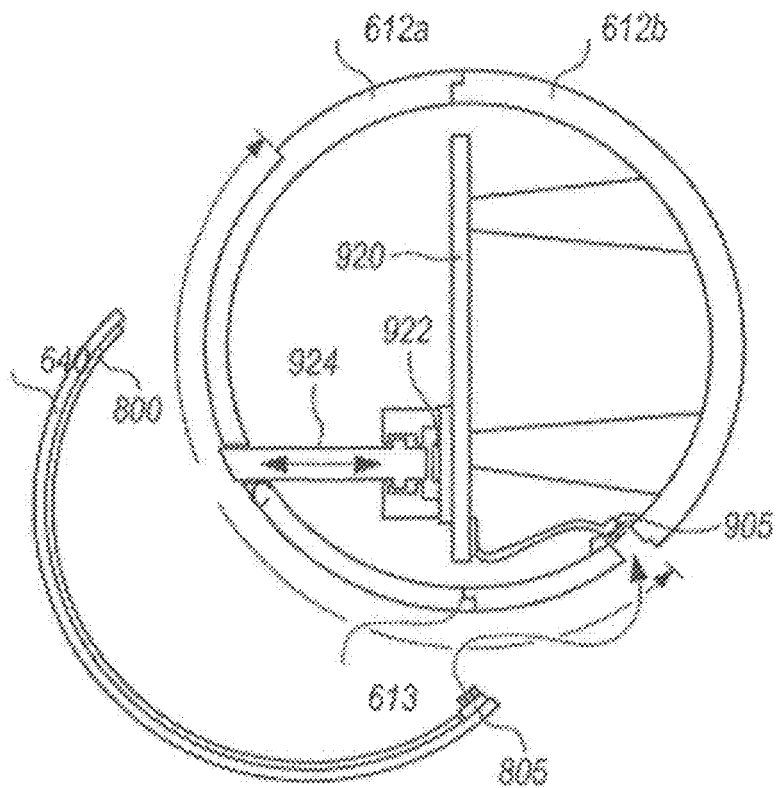
FIG. 9A depicts a cross section of the right-hand controller of FIG. 6A, with an outer shell that partially wraps the tubular housing of the controller's handle being exploded away.
Figure 9B:
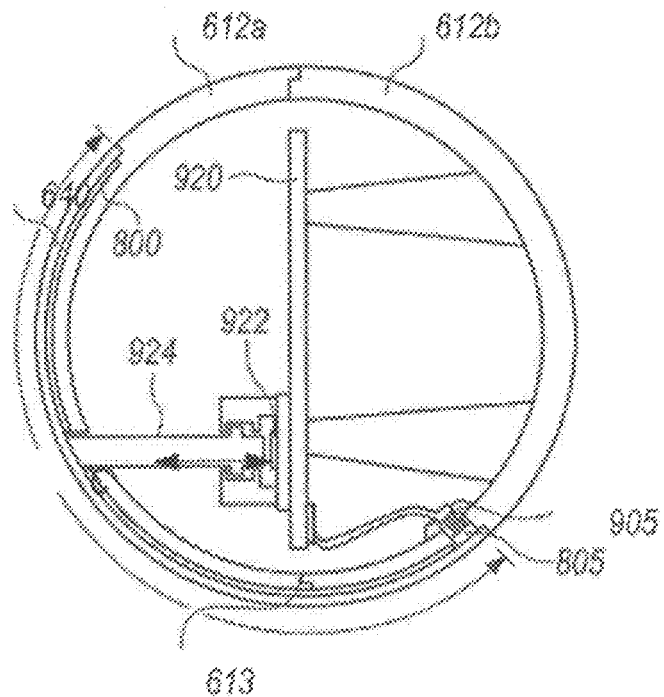
FIG. 9B depicts the cross section of FIG. 9A, except with the outer shell installed in its normal operational position.

FIGS. 9A-B depicts cross sections of the right-hand controller 600 of FIG. 6A, showing that the controller's handle optionally may comprise a tubular housing 612a, 612b, that is split longitudinally by a seam 613 where the tubular housing portions 612a and 612b adjoin. In FIG. 9A, the outer shell 640 is shown exploded away from the rest of the handle. FIG. 9B depicts the cross section of FIG. 9A, except with the outer shell 640 installed in its normal operational position. In the embodiment of FIGS. 9A-9B, the first electrical connector portion 805 of the outer shell 640 is shown to be mating and connectable to the second electrical connector portion 905 of the controller handle.

In the embodiment of FIGS. 9A-9B, the outer shell 640 partially wraps the tubular housing 612a, 612b in such a way that it preferably overlaps the longitudinal seam 613, so that the longitudinal seam 613 may be positioned to optimize the process of manufacture rather than to accommodate the desired circumferential location of the proximity sensor array 800. In certain embodiments, the outer shell 640 overlaps a circumferential portion C of the tubular housing 612a, 612b of the handle, and the circumferential portion C angularly spans at least 100 degrees but not more than 170 degrees of the full circumference of the tubular housing 612a, 612b of the handle. Such a circumferential overlap may, in certain embodiments, enable the proximity sensor array 800 to sense the proximity of a desired portion of the user's fingers or palm, for example the region of the hand that best indicates grasping.

The tubular housing 612a, 612b of the handle need not have a circular cross-section, and that the word "circumference" is used herein whether or not the tubular housing 612a, 612b of the handle has a circular cross-section. Herein, the term "circumference" implies the complete perimeter about the tubular housing 612a, 612b of the handle, which may be circular if the tubular housing 612a, 612b is a right circular hollow cylinder, but which may be a closed shape other than a circle if the tubular housing is shaped as a non-circular cylinder or hollow prism.

In the embodiment of FIGS. 9A-9B, a printed circuit board (PCB) 920 may be mounted within the tubular housing 612a, 612b of the handle, with the second electrical connector portion 905 being electrically coupled to the PCB 920. The PCB 920 optionally includes a force sensing resistor (FSR) 922, and the controller may further comprise a plunger 924 that conveys a compressive force applied via the outer shell 640 towards the outside of the tubular housing 612a, 612b of the handle inward to the FSR 922. In certain embodiments, the FSR 922, in conjunction with the proximity sensor array 800, may facilitate sensing of both the onset of grasping by the user, and the relative strength of such grasping by the user, which may be facilitate certain gameplay features.

In certain embodiments, the outer shell 640 has a shell thickness (measured radially in FIGS. 9A-9B) that is less than one-third of a housing wall thickness of the tubular housing portions 612a or 612b of the handle. In those embodiments, such a thickness inequality may improve the sensitivity of the proximity sensor array 800 relative to an alternative embodiment where the proximity sensor array 800 is disposed on or in the tubular housing 612a, 612b of the handle.

FIG. 10A depicts a front view of right-hand controller 200 according to another example embodiment of the present disclosure, with a partially-closed hand retainer 220 (e.g. a hand retention strap). FIG. 10B depicts a front view the controller 200, except with the hand retainer 220 fully open. In the embodiment of FIGS. 10A-10B, the controller 200 includes a controller body having a head 210 and a handle 212. The head 210 adjoins the handle 212 at a neck region 211 of the controller 200. The handle 212 preferably includes an array of proximity sensors that are spatially distributed just under its outside surface, and that are preferably responsive to a proximity of the user's fingers to the outer surface of the handle 212.

In the embodiment of FIGS. 10A-10B, the head 210 includes thumb-operated controls A, B, and 208. The controller 200 also includes a tracking member 230 that is preferably fixed to the controller body at the head 210 and at a distal end of the handle 212. The tracking member 230 preferably includes a plurality of tracking transducers that may be sensors that are responsive to electromagnetic radiation emitted by the electronic system (e.g. pulsed infrared light emitted by a virtual reality gaming system), or tracking beacons that emit electromagnetic radiation to be received by the electronic system. In the embodiment of FIGS. 10A-10B, the tracking member 230 is preferably but not necessarily a tracking arc having an arcuate shape. The hand retainer 220 is preferably disposed between the handle 212 and the tracking arc 230.

In the embodiment of FIGS. 10A-10B, the controller 200 includes a draw cord 228, and a cord lock 226 adjacent a distal end of the handle 212. The cord lock 226 may selectively prevent sliding motion by the draw cord 228 at the cord lock 226. In the embodiment of FIG. 10A, as the draw cord 228 is pulled progressively further past the cord lock 226, the hand retainer 220 is drawn tighter into a closed position (as shown by the motion arrow depicted in FIG. 10A). The closed position physically biases the user's palm against an outer surface of the handle 212.

In the embodiment of FIGS. 10A-10B, the hand retainer 220 preferably includes a resilient member (e.g. an internal or external elastically deformable strip such as a metal strip) that biases the hand retainer 220 towards the open position shown in FIG. 10B. In the embodiment of FIG. 10B, when the user selectively causes the cord lock 226 to release and permit relative sliding of the draw cord 228, the preloaded bias towards straightening of the elastically deformed resilient member causes the hand retainer 220 to naturally open (as shown by the motion arrow depicted in FIG. 10B). The open position may facilitate inserting or withdrawing the user's hand from the controller 200, especially when the user's vision may be obstructed by the wearing of virtual reality goggles.

FIG. 11A depicts a front view of the head 210 and handle 212 components of the controller 200, including a hand retainer anchor 302 that can be adjusted to move peripherally about the head 210. FIG. 11B depicts the same head 210 and handle 212 components, except with a faceplate removed from the head 210 to expose a lockable collar portion 311 that may facilitate selective adjustment of the hand retainer anchor 302 peripherally about the head 210.

In the embodiment of FIG. 11B, the lockable collar portion 311 may translate along an arcuate path defined by an internal arcuate guide 315. The lockable collar portion 311 can be selectively locked by the user to prevent further movement of the anchor 302 about the periphery of the head 210. Now referring to FIGS. 4 and 10A-11B, the resilient member of the hand retainer 220 is attached to the hand retainer anchor 302 of the head 210, which permits the hand retainer 220 to be adjusted towards or away from the user's purlicue (between the user's thumb and fingers). In certain embodiments, the resilient member of the hand retainer 220 is preferably attached to the hand retainer anchor 302 of the head 210 by a pivoting or rotatable attachment, so that the hand retainer 220 can pivot relative to the hand retainer anchor 302 at the location of the attachment. Such degree of freedom is additional to the adjustability of the position of the hand retainer anchor 302 about the periphery of the head 210.

Figure 12A:
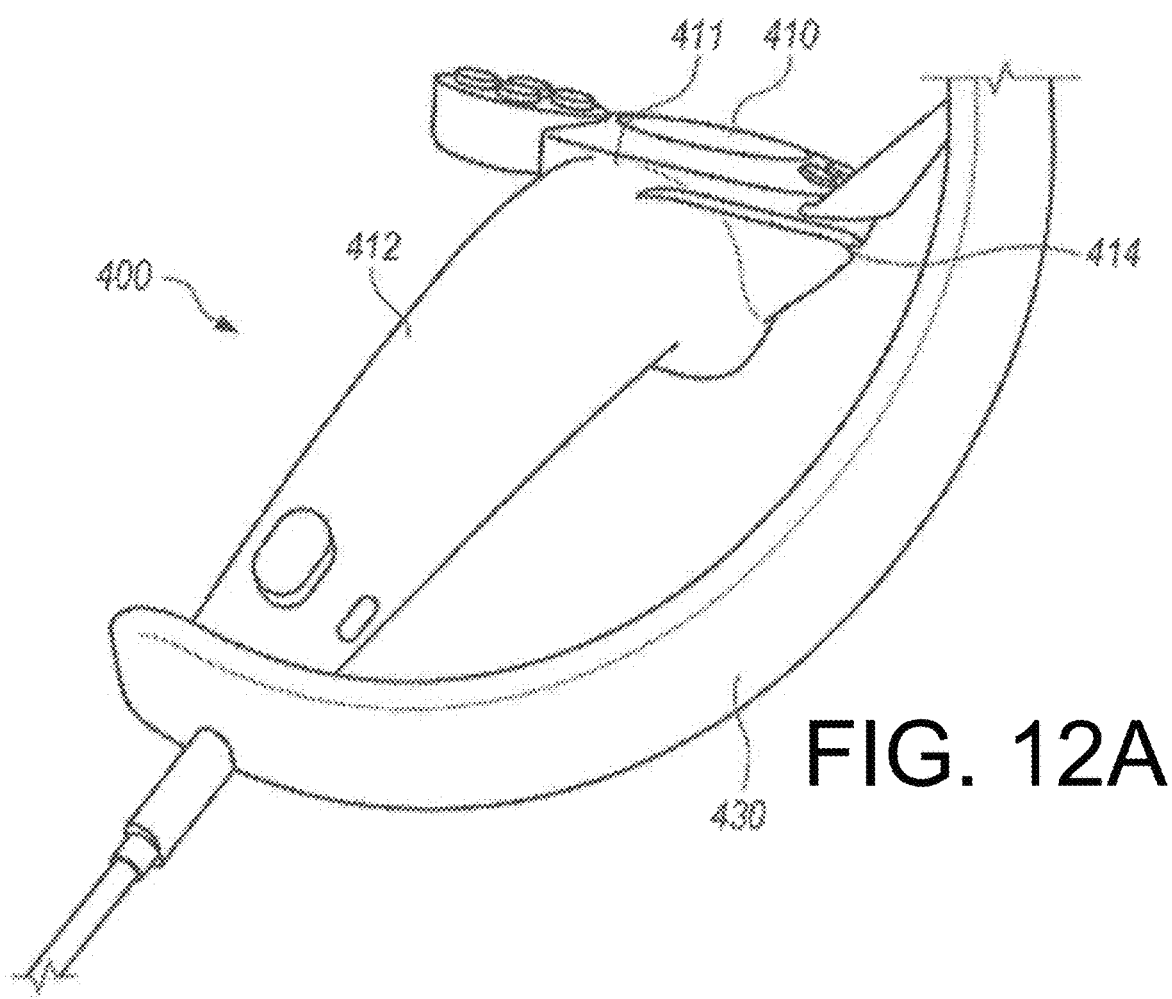
FIG. 12A depicts a partially assembled controller according to an alternative embodiment of the present disclosure, with a hand retainer component removed.
Figure 12B:
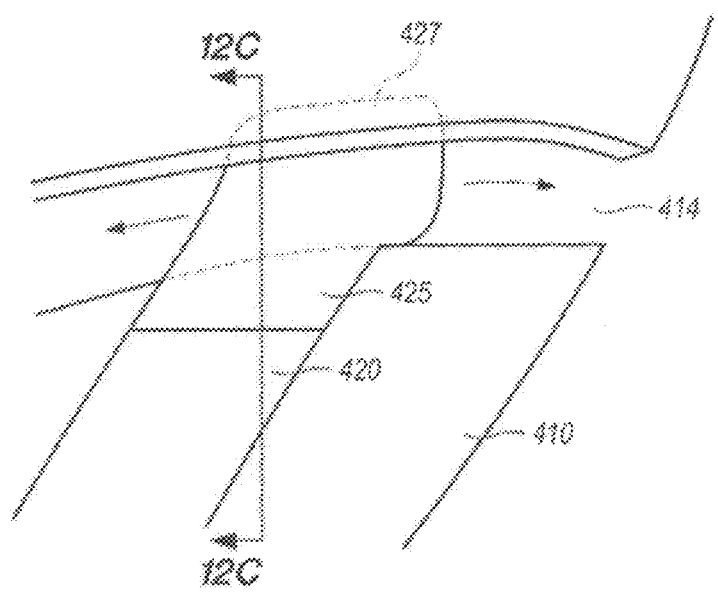
FIG. 12B depicts a closer view of a channel feature of the controller of FIG. 12A.
Figure 12C:
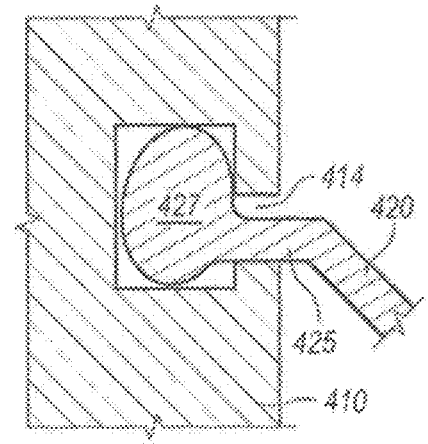
FIG. 12C is a cross-sectional view of the channel depicted in FIG. 12B.

FIGS. 12A, 12B, and 12C depict an alternative embodiment of a partially assembled controller 400 having a controller body that includes a head 410 and a handle 412 joined to the head in a neck region 411. In the alternative embodiment of FIGS. 12A-12C, the controller body includes a channel 414 that is disposed adjacent the neck region 411. A hand retainer, which is not shown in FIG. 12A so that the channel 414 will not be partially obscured, includes a resilient member 420 that terminates in a projection 425 that extends into the channel 414.

In the embodiment of FIGS. 12B and 12C, the projection 425 includes a catch 427 that prevents longitudinal movement of the projection within the channel 414 when the hand retainer is in the closed position. For example, in the embodiment of FIG. 12C, the catch 427 is a cam that increases friction with an interior surface of the channel 414, when a relative angle of the hand retainer projection 425 corresponds to the closed position of the hand retainer—i.e., when the closed position of the hand retainer results in tension upon the resilient member 420 (e.g. in a downward direction as shown in the cross-section of FIG. 12C).

By contrast, when the hand retainer projection 425 is rotated to a relative angle that corresponds to an open position of the hand retainer (e.g. in an upward direction as shown in the cross-section of FIG. 12C), the friction between the catch 427 and the channel 414 is reduced, and the hand retainer projection 425 may be translated within the channel 414 (as indicated by the motion arrows shown in FIG. 12B). The channel 414 is preferably oriented so that translation of the hand retainer projection along the channel 414 preferably adjusts the relative position of the hand retainer projection 425 towards or away from the purlicue of the user's hand, for example so that the controller 400 can accommodate different hand sizes or finger lengths. In an alternative embodiment, the hand retainer projection 425 may be pivotably attached to the remainder of the hand retainer by a conventional pivot joint. Such rotational degree of freedom is additional to the adjustable translation of the hand retainer projection 425 along the channel 414.

FIGS. 13A-C depict different views of a force sensing resistor (FSR) 1300 according to an example embodiment of the present disclosure. As shown in the cross section of the FSR 1300 in FIG. 13C, the FSR 1300 may include a first substrate 1302 made of polyimide. The FSR 1300 may further include a second substrate 1304 disposed on (or over) the first substrate 1302. The first substrate 1302 and the second substrate 1304 may be considered to be the two primary substrates (or layers) of the FSR 1300, which can be considered a 2-layer FSR 1300, although it is to be appreciated that the FSR 1300 includes additional layers, as will be described in more detail herein. In this context, the first substrate 1302 may be considered a "bottom" or "base" substrate with respect to the two primary substrates of the FSR 1300, although it is to be appreciated that there may be layers of material behind (or below) the first substrate 1302 (i.e., in the negative Z direction, as depicted in FIG. 13C).

The first substrate 1302 has a conductive material disposed on a front surface (i.e., the surface facing in the positive Z direction) of the first substrate 1302. As will be described in more detail with reference to FIG. 14, this conductive material may include a plurality of interdigitated metal fingers. Meanwhile, the second substrate 1304 (sometimes referred to as a resistive "membrane") has resistive material disposed on a back surface (i.e., the surface facing the negative Z direction) of the second substrate 1304. This resistive material may be a semiconductive material, such as an ink composition (e.g., silver ink, carbon ink, mixtures thereof, etc.), that exhibits some level of electrical resistance (e.g., a relatively high sheet resistance within a range of 300 kiloOhm (kOhm) per square (kOhm/sq) to 400 kOhm/sq). Preferably, the sheet resistance of the second substrate 1304 is 350 kOhm/sq, although it is to be appreciated that other sheet resistance values, including those outside of the sheet resistance ranges specified herein, may be used, such as when the FSR 1300 is used in other applications, such as non-controller based applications. As such, the sheet resistance range(s) specified herein is to be understood as non-limiting. In some embodiments, the second substrate 1304 may be made of mylar, with the resistive material disposed on a back surface of the second substrate 1304. In some embodiments, the second substrate 1304 is made of polyimide having a resistive material (e.g., a conductive ink composition) on the back surface. An example benefit of using polyimide for the second substrate 1304 is to create an FSR 1300 that can be mass manufactured using a reflow oven, whereas mylar could not withstand such high temperatures.

The FSR 1300 may include one or more spacer layers interposed between the first substrate 1302 and the second substrate 1304 so that a center portion of the second substrate 1304 is suspended over the first substrate 1302 and spaced a distance therefrom. FIG. 13C shows two spacer layers including, without limitation, a coverlay 1306 disposed on the first substrate 1302 at a periphery of the first substrate 1302, and a layer of adhesive 1308 disposed on the coverlay 1306. The coverlay 1306 may be made of polyimide, and may thus be the same material as the first substrate 1302. A thickness (as measured in the Z direction) of the coverlay 1306 may be within a range of 10 microns to 15 microns. A thickness (as measured in the Z direction) of the layer of adhesive 1308 may be within a range of 50 microns to 130 microns. The total distance at which the second substrate 1304 is spaced from the first substrate 1302 may, therefore, be the sum of the thicknesses of the one or more spacer layers (e.g., the thickness of the coverlay 1306 plus the thickness of the layer of adhesive 1308). These layers may be provided at thicknesses that are outside of the thickness ranges specified herein, such as when the FSR 1300 is used in other applications, such as non-controller based applications. As such, these thickness ranges are to be understood as non-limiting.

An actuator 1310 (such as a disk-shaped, compliant plunger) may be disposed on the second substrate 1304, and is configured to convey a force, F, onto a front surface of the second substrate 1304. The actuator 1310 can be made of Poron, which is a compliant material that deforms to a degree upon application of a force upon the actuator 1310. The actuator 1310 may be concentric with a center of an active area of the FSR 1300 in order to center the applied force, F. The actuator 1310 also spans a portion of the active area of the FSR 1300 in order to evenly distribute the applied force, F, across that portion of the active area of the FSR 1300.

A thickness (as measured in the Z direction) of the second substrate 1304 may be within a range of 50 microns to 130 microns. At this example thickness, the second substrate 1304 is flexible. For example, the second substrate 1304 can be made of mylar, which is flexible at a thickness within the above-specified range. Functional operation of the FSR 1300 relies on the flexibility of the second substrate 1304 in order for the resistive material on the back surface of the second substrate 1304 to come into contact with the conductive material on the front surface of the first substrate 1302 under a compressive force, F, applied to the actuator 1310. A thickness (as measured in the Z direction) of the first substrate 1302 may be within a range of 20 microns to 30 microns. Polyimide, at this thickness, is also flexible. Thus, the first substrate 1302 is also flexible. Meanwhile, a thickness (as measured in the Z direction) of the actuator 1310 may be within a range of 780 microns to 810 microns. These layers may be provided at thicknesses that are outside of the thickness ranges specified herein, such as when the FSR 1300 is used in other applications, such as non-controller based applications. As such, these thickness ranges are to be understood as non-limiting.

The FSR 1300 may exhibit varying resistance in response to a variable force, F, applied to the actuator 1310. For example, as the force, F, on the actuator 1310 is increased, the resistance is decreased. In this manner, the FSR 1300 may be treated as a variable resistor whose value is controlled by the applied force, F. The FSR 1300 can be a "ShuntMode" FSR 1300 or a "ThruMode" FSR 1300, but is preferably a ShuntMode FSR 1300. With a ShuntMode FSR 1300, the conductive material disposed on the front surface of the first substrate 1302 may be in the form of a plurality of interdigitated metal fingers. When the force, F, is applied to the front (or top) of the actuator 1310, the resistive material on the back surface of the second substrate 1304 comes into contact with some of the interdigitated metal fingers, which shunts the metal fingers, thereby varying the resistance across the output terminals of the FSR 1300. In a ThruMode implementation, the conductive material on the first substrate 1302 may be a solid area of conductive material with a semiconductive (or resistive) material disposed on the conductive material, and the second substrate 1304 may have a similar construction (e.g., a solid area of conductive material having a semiconductive (or resistive) material disposed thereon). The solid area of conductive material on each substrate (1302 and 1304) is coupled to an individual output terminal, and excitation current can pass through one layer to the other when the two substrates (1302 and 1304) come into contact under an applied force, F.

In at least the preferred ShuntMode implementation, the Force vs. Resistance response curve—where the FSR 1300 resistance is plotted as a function of applied force, F—exhibits desirable characteristics for use in a controller 100/600 of a VR system. For instance, the response curve of the FSR 1300 may exhibit less hysteresis and higher repeatability (from one FSR 1300 to another FSR 1300), as compared to conventional FSRs, such as those that use mylar as the material for the bottom substrate. Loading hysteresis describes the effect of previously applied forces on the current FSR 1300 resistance. The response curve is also monotonic, and it models a true analog input that can be leveraged for a number of game mechanics in a VR gaming system, such as to crush a virtual rock, squeeze a virtual balloon, etc. It is to be appreciated that although examples herein describe an applied force, F, the FSR 1300 is, in actuality, sensitive to applied pressure (force×area) because equal amounts of force applied at a small point verses a larger area on front surface of the second substrate 1304 will result in a different resistance response of the FSR 1300. Thus, the actuator 1310 plays a role in maintaining repeatability across FSRs 1300 in terms of the response curves under applied force, F.

Figure 14:
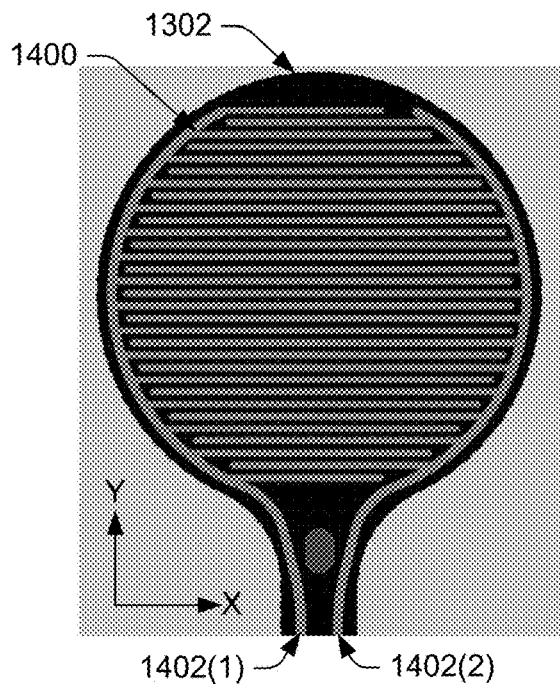
FIG. 14 depicts various front views of a FSR at progressive stages in an example process of constructing the FSR.
Figure 14:
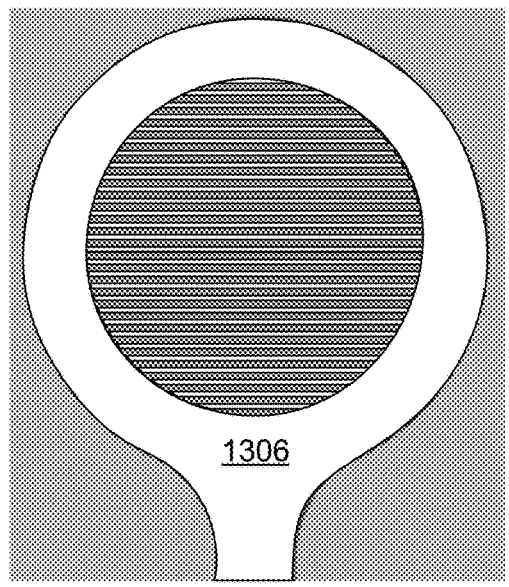
Figure 14:
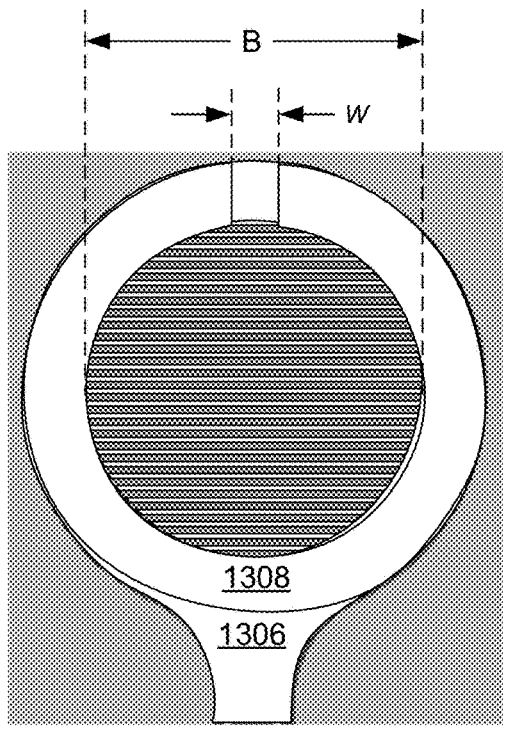
Figure 14:
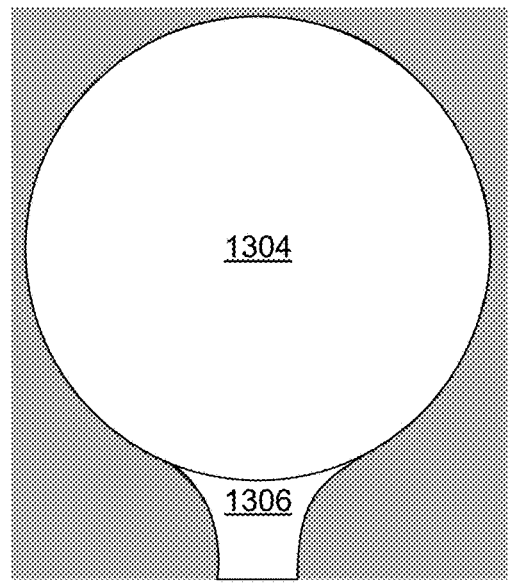

FIG. 14 depicts various front views of the FSR 1300 at progressive stages in an example process of constructing the FSR 1300. At Stage 1 of FIG. 14, a plurality of interdigitated metal fingers 1400 may be formed on a front surface of the first substrate 1302 of polyimide. The metal fingers 1400 are electrically conductive. An example conductive metal used for the metal fingers 1400 is copper, such as ⅓ oz. HA copper. This copper may also be gold plated. The plurality of interdigitated metal fingers 1400 may be formed using a subtractive manufacturing process. For example, prior to Stage 1, the first substrate 1302 of polyimide may be formed with a copper clad layer disposed on its front surface, and the copper clad layer may be etched (e.g., by removing strips of copper material) to create the pattern of interdigitated metal fingers 1400 shown in Stage 1 of FIG. 14. The size and spacing of the etched pattern may be chosen to create a distance (as measured in the Y direction) between pairs of adjacent metal fingers 1400 that is 0.2 millimeters (mm), and a width (as measured in the Y direction) of each metal finger of the plurality of interdigitated metal fingers 1400 that is 0.2 mm. This finger width and spacing between fingers may provide an optimal balance between maximum sensitivity of the FSR 1300 and a minimized manufacturing etch tolerance. Although a uniform pattern of metal fingers 1400 is shown in FIG. 14, it is to be appreciated that other non-uniform patterns (e.g., denser fingers toward a center, and less dense fingers toward the outside) may be employed. FIG. 14 shows two sets of interdigitated metal fingers 1400, each leading to an output terminal 1402 (or lead) of a 2-terminal FSR 1300 having a first output terminal 1402(1) and a second output terminal 1402(2).

As mentioned, the copper that constitutes the metal fingers 1400 may be gold plated. Thus, after etching the pattern of interdigitated metal fingers 1400, a layer of gold plating may be deposited onto the copper fingers to create gold-plated fingers. Thus, the plurality of interdigitated metal fingers 1400 shown in Stage 1 of FIG. 14 can represent gold-plated fingers. The gold-plating may be electroless nickel immersion gold (ENIG). Notably, there may be no additional copper plating over the base layer copper prior to gold plating. Additional copper plating is commonly applied atop the base layer copper when adding vias to multi-layer flex substrates. However, adding additional copper plating over the base layer copper prior to gold-plating may actually cause an undesirable increase of detected resistance, as compared to the disclosed FSR 1300 that does not include any additional copper plating over the base layer copper prior to gold plating. Thus, the omission of any additional copper plating on the metal fingers 1400 prior to the gold plating achieves optimal sensitivity in the FSR 1300. Thus, the copper clad layer that constitutes the metal fingers 1400 remains exposed at the time that the metal fingers 1400 are plated with gold material. In this manner, the gold material is in direct contact with the base copper material of the metal fingers 1400, without any additional copper plating interposed between the base layer copper and the gold plating.

At Stage 2 of FIG. 14, a coverlay 1306 can be deposited atop the first substrate 1302 at a periphery of the first substrate 1302. For example, the coverlay 1306 can be annular in shape to cover a peripheral portion of the metal fingers 1400, and a remaining portion of the metal fingers 1400 is left uncovered by the coverlay 1306 after deposition. The coverlay 1306 may be made of polyimide.

At Stage 3 of FIG. 14, a layer of adhesive 1308 may be deposited atop the coverlay 1306 such that the remaining portion of the metal fingers 1400 (the portion of the metal fingers 1400 left uncovered by the coverlay 1306) is also left uncovered by the layer of adhesive 1308. For example, the layer of adhesive 1308 can be C-shaped so that the layer of adhesive 1308 covers a substantial portion of the coverlay 1306, and so that the layer of adhesive 1308 does not cover an active area of the FSR 1300. The "active area" of the FSR 1300 is shown in Stage 3 of FIG. 14 as having a diameter, B. Furthermore, the layer of adhesive 1308, being C-shaped, can leave a section of the coverlay 1306 uncovered by the layer of adhesive 1308. This uncovered section of the coverlay 1306 is shown in Stage 3 of FIG. 14 as having a width, w. After the second substrate 1304 is placed over the top of the first substrate 1302, this uncovered section of coverlay 1306 creates an air gap that allows air to ingress and/or egress from a space between the first substrate 1302 and the second substrate 1304, which may prevent sensor-to-sensor response variations due to changes in atmospheric pressure. The width, w, of the air gap (i.e., the uncovered section of the coverlay 1306) can be 1 mm, which is small enough to preserve symmetry of the contacted surface area under an applied force, and large enough to allow air to ingress/egress through the air gap. In some embodiments, the layer of adhesive 1308 may be 467 adhesive from 3M® Company of Maplewood, Minn. (i.e., 3M 467 adhesive). The coverlay 1306 and the layer of adhesive 1308 represent examples of spacer layers that can be provided atop the first substrate 1302 in order to space the second substrate 1304 a distance from the first substrate 1304 in a suspended fashion. As mentioned, a thickness (as measured in the Z direction) of the coverlay 1306 may be within a range of 10 microns to 15 microns, and a thickness (as measured in the Z direction) of the layer of adhesive 1308 may be within a range of 50 microns to 130 microns. Preferably, the thickness of the layer of adhesive 1308 is made as thin as possible (e.g., at the lower end of the specified thickness range) to allow for an initial response (e.g., the FSR 1300 starts detecting an input) under a very light applied force, F. However, these layers may be provided at thicknesses that are outside of the thickness ranges specified herein, such as when the FSR 1300 is used in other applications, such as non-controller based applications. As such, these thickness ranges are to be understood as non-limiting.

At Stage 4, a second substrate 1304 can be provided atop the first substrate 1302. In Stage 4, a center portion of the second substrate 1304 is suspended over the first substrate 1302 by virtue of the one or more spacer layers (e.g., the coverlay 1306 and the layer of adhesive 1308) interposed between the first substrate 1302 and the second substrate 1304 (See FIG. 13C). Although it is not shown in FIG. 14, the actuator 1310 can be attached to the front surface of the second substrate 1304 in order to complete the construction of the FSR 1300, as shown in FIGS. 13A-C. The size (as measured in the X-Y plane) of the actuator may span 80% of the active area of the FSR 1300 (i.e., 80% of the diameter, B, shown in Stage 3 of FIG. 14). For instance, a disk shaped actuator 1310 may have a diameter that is equal to 0.8\*B. In some embodiments, the overall diameter of the FSR 1300 may be 14.5 mm. At this dimension, the active area may have a diameter, B, of 10.5 mm, meaning that the coverlay 1306 and the layer of adhesive 1308 may be deposited as a 2 mm ring between the first substrate 1302 and the second substrate 1304. In this embodiment, the actuator 1310 may have a diameter of 8.4 mm (i.e., 0.8\*10.5 mm).

The FSR 1300 may be open-circuit under no external force (or load). In some embodiments, in order to account for any contact of the first substrate 1302 and the second substrate 1304 under zero or negligible applied force, a threshold circuit can be used to set a threshold resistance value at which the first substrate 1302 and the second substrate 1304 are considered to be "in contact," meaning that the FSR 1300 can be open-circuit until the threshold resistance value is met, even if the two primary substrates (i.e., 1302 and 1304) are actually in contact.

Figure 15:
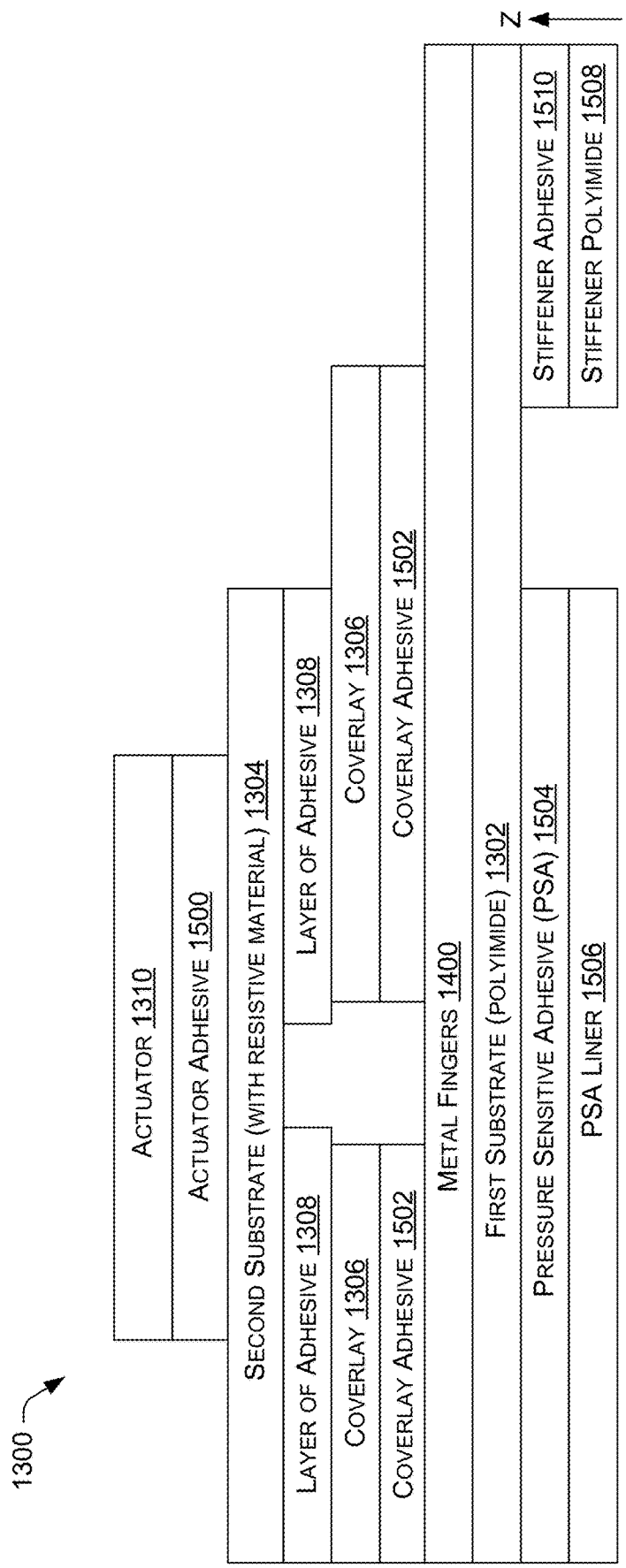
FIG. 15 depicts example layers of a FSR, according to another embodiment of the present disclosure.

FIG. 15 depicts example layers of a FSR 1300, according to another embodiment of the present disclosure. FIG. 15 is not to scale. Rather, FIG. 15 is presented to illustrate example layers of material, and is not meant to represent an actual cross-sectional view of the FSR 1300. As described above with reference to the previous figures, the FSR 1300, as shown in FIG. 15, includes a first substrate 1302 made of polyimide, metal fingers 1400 (i.e., a conductive material) disposed on the front surface of the first substrate 1302, and a second substrate 1304 disposed on the first substrate 1302, with one or more spacer layers interposed between the first substrate 1302 and the second substrate 1304; in this case, there are multiple spacer layers disposed between the two primary substrates, including the aforementioned coverlay 1306 and the layer of adhesive 1308. An actuator 1310 is also disposed on the second substrate 1304.

In the embodiment of FIG. 15, the actuator 1310 may be made of Poron, and may have a thickness (as measured in the Z direction) of 794 microns. A layer of actuator adhesive 1500 may be used to attach the actuator 1310 to the second substrate 1304. This actuator adhesive 1500 can be 70 microns in thickness (as measured in the Z direction). A suitable adhesive for the actuator adhesive 1500 is FT 8397 adhesive from Avery Dennison of Glendale, Calif. In the embodiment of FIG. 15, the thickness (as measured in the Z direction) of the second substrate 1304 may be 125 microns. The sheet resistance of the resistive material on the back surface of the second substrate 1304 may be 350 kOhm/sq. The layer of adhesive 1308 may be a peel-off adhesive, such as 3M MP467 adhesive. The thickness (as measured in the Z direction) of the layer of adhesive 1308 may be 50 microns. The coverlay 1306 may be made of polyimide, and may have a thickness (as measured in the Z direction) of 12.5 microns. A coverlay adhesive 1502 (e.g., polyethylene with adhesive on either side) may be used to attach the coverlay 1306 to the front surface of the first substrate 1302 atop the metal fingers 1400. The coverlay adhesive 1502 may have a thickness (as measured in the Z direction) of 25 microns. The metal fingers 1400 may be made of copper (e.g., gold-plated copper) and may have a thickness (as measured in the Z direction) of 12.5 microns. The first substrate 1302 may have a thickness (as measured in the Z direction) of 25 microns.

A pressure sensitive adhesive (PSA) 1504 may be attached to a back surface of the first substrate 1302. The PSA 1504 may be 3M 467MP, and may have a thickness of 50 microns. A PSA liner 1506 may be disposed over the PSA 1504, and may be peeled off before attaching the FSR 1300 to a planar surface (e.g., to a planar surface of a structure mounted inside of a controller body 110).

At a connector portion of the FSR 1300, a stiffener polyimide 1508 may be attached to the back surface of the first substrate 1302 using a stiffener adhesive 1510. The stiffener polyimide 1508 may have a thickness (as measured in the Z direction) of 137.5 microns, and may create a stiffer connector portion of the FSR 1300 for added durability of the connector portion. The thickness (as measured in the Z direction) of the stiffener adhesive may be 25 microns.

The embodiment of FIG. 15 may represent a FSR 1300 that is suitable for mounting on a planar surface of a structure that is mounted within a handle 112/612 of a controller 100/600 for an electronic system (e.g., a VR system), as disclosed herein. It is to be appreciated that other thickness values, sheet resistance values, and/or materials than those specified with reference to FIG. 15 may be utilized, such as when the FSR 1300 is used in other applications, such as non-controller based applications. As such, these values and materials are to be understood as non-limiting.

Figure 16:
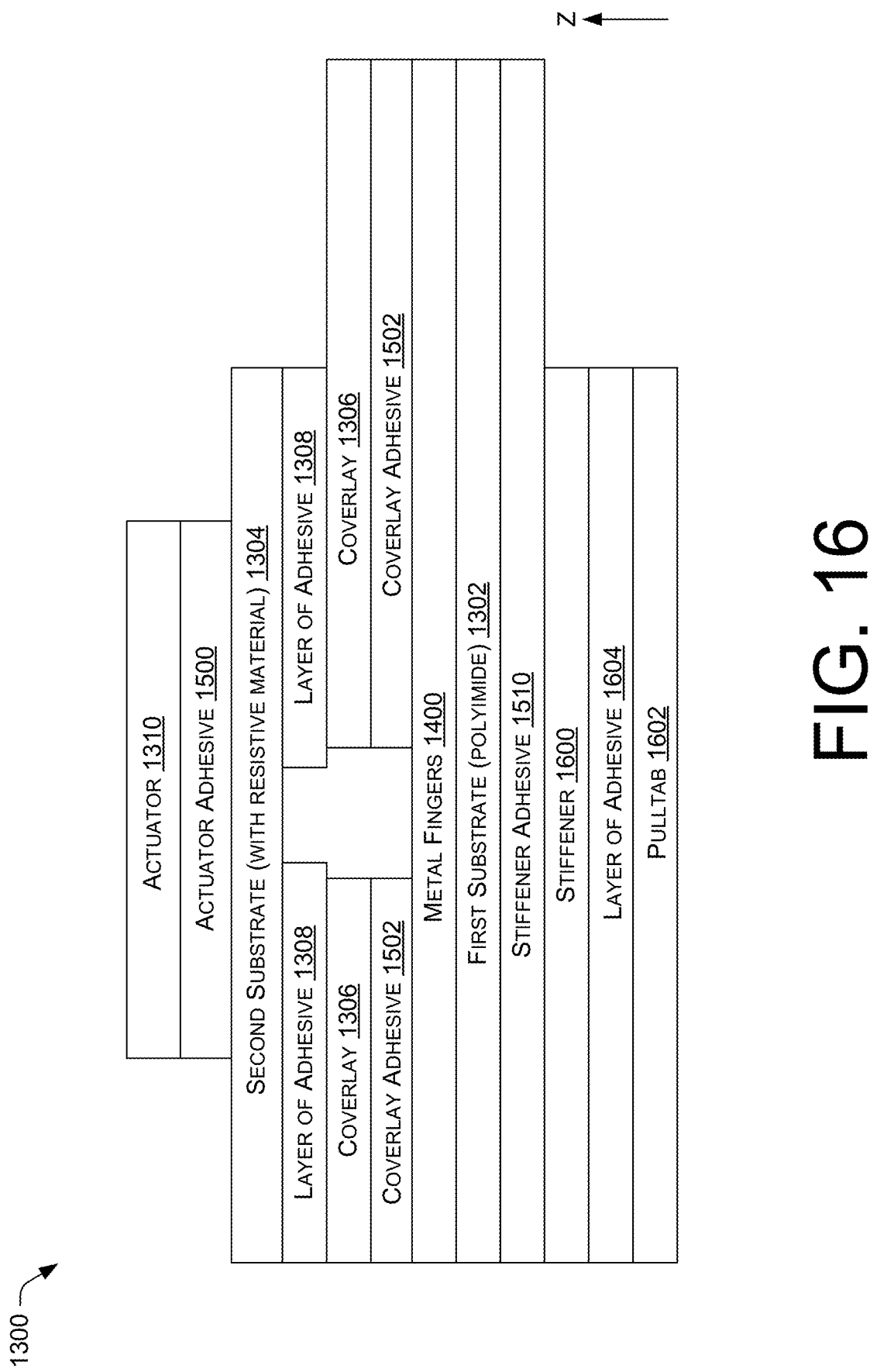
FIG. 16 depicts example layers of a FSR, according to another embodiment of the present disclosure.

FIG. 16 depicts example layers of a FSR 1300, according to another embodiment of the present disclosure. FIG. 16 is not to scale. Rather, FIG. 16 is presented to illustrate example layers of material, and is not meant to represent an actual cross-sectional view of the FSR 1300. The FSR 1300 shown in FIG. 16 with respect to the first substrate 1302 and the layers above (i.e., in the positive Z direction) the first substrate 1302 may be have a similar construction to the FSR 1300 shown in FIG. 15. FIG. 16 differs from FIG. 15 in the layers below (i.e., in the negative Z direction) the first substrate 1302. Thus, for purposes of brevity, the first substrate 1302 and the layers above (i.e., in the positive Z direction) the first substrate 1302 in FIG. 16 will not be described again, as reference can be made to the description of FIG. 15 for these layers in FIG. 16.

In the embodiment of FIG. 16, a stiffener 1600 may be attached to the back surface of the first substrate 1302 underneath the main body portion of the FSR 1300 using a stiffener adhesive 1510. The thickness (as measured in the Z direction) of the stiffener adhesive may be 25 microns, as is the case in the embodiment of FIG. 15, but the stiffener 1600 is located underneath the main body portion of the FSR 1300, whereas the stiffener polyimide 1508 is located underneath a connector portion of the FSR 1300. Furthermore, the stiffener 1600 may be a FR4 stiffener having a thickness (as measured in the Z direction) of 530 microns, which is thicker than the stiffener polyimide 1508 of the embodiment of FIG. 15. A pulltab 1602 may be attached to the back surface of the stiffener 1600 using a layer of adhesive 1604. The layer of adhesive 1604 may be a pulltab adhesive, such as 3M MP467 adhesive. The thickness (as measured in the Z direction) of the layer of adhesive 1604 may be 50 microns.

The embodiment of FIG. 16 may represent a FSR 1300 that is suitable for mounting on a planar surface of a structure that is mounted underneath a thumb-operated control 116 of a controller 100/600 for an electronic system (e.g., a VR system), as disclosed herein. It is to be appreciated that other thickness values, sheet resistance values, and/or materials than those specified with reference to FIG. 16 may be utilized, such as when the FSR 1300 is used in other applications, such as non-controller based applications. As such, these values and materials are to be understood as non-limiting.

Figure 17:
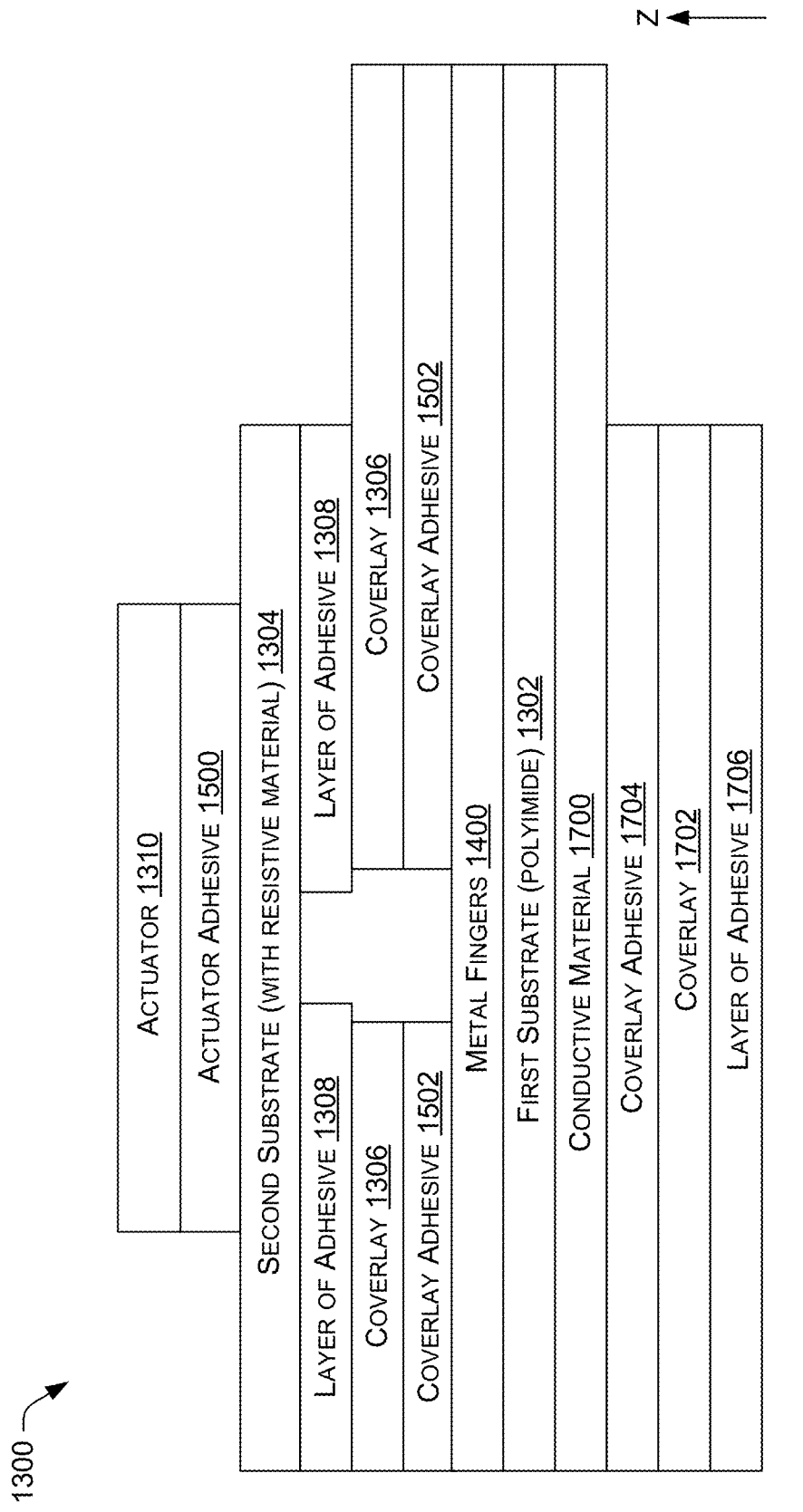
FIG. 17 depicts example layers of a FSR, according to another embodiment of the present disclosure.

FIG. 17 depicts example layers of a FSR 1300, according to another embodiment of the present disclosure. FIG. 17 is not to scale. Rather, FIG. 17 is presented to illustrate example layers of material, and is not meant to represent an actual cross-sectional view of the FSR 1300. Some of the layers of the FSR 1300 shown in FIG. 17 may be have a similar construction to the FSR 1300 shown in FIG. 15. FIG. 17 differs from FIG. 15 several aspects, however.

In the embodiment of FIG. 17, the thickness (as measured in the Z direction) of the second substrate 1304 may be 127 microns. The layer of adhesive 1308 may be a peel-off adhesive, such as 3M 468MP adhesive. For a FSR 1300 that can withstand high temperatures of a reflow oven, the layer of adhesive 1308 may be a peel-off adhesive, such as 3M 9085, or 3M 9082. The thickness (as measured in the Z direction) of the layer of adhesive 1308 may be 125 microns. In some cases, the thickness of the layer of adhesive 1308 may be 50 microns. In addition, the metal fingers 1400 may be made of RA copper. In addition, a conductive material 1700 may be disposed on a back surface of the first substrate 1302. The conductive material 1700 may be HA copper or RA copper having a thickness (as measured in the Z direction) of 12.5 microns. An additional coverlay 1702 may be deposited on the conductive material 1700. This additional coverlay 1702 may be made of polyimide, and may be attached to the conductive material 1700 using a coverlay adhesive 1704. The thickness (as measured in the Z direction) of the additional coverlay 1702 may be 12.5 microns, and a thickness (as measured in the Z direction) of the coverlay adhesive 1704 may be 25 microns. A layer of adhesive 1706 may be disposed on the coverlay 1702. The layer of adhesive 1706 may be a peel-off adhesive, such as 3M 467MP adhesive, at a thickness (as measured in the Z direction) of 60 microns. For a FSR 1300 that can withstand high temperatures of a reflow oven, the layer of adhesive 1706 may be a peel-off adhesive, such as 3M 9085, or 3M 9082.

The embodiment of FIG. 17 may represent a FSR 1300 that is suitable for mounting on a planar surface of a structure that is mounted within a controller body 110 of a non-VR controller. It is to be appreciated that other thickness values, sheet resistance values, and/or materials than those specified with reference to FIG. 17 may be utilized, such as when the FSR 1300 is used in other applications, such as non-controller based applications. As such, these values and materials are to be understood as non-limiting.

FIGS. 18A-D depict a FSR 1800, according to another embodiment of the present disclosure. The FSR 1800 may have component layers that are similar to those described with reference to the FSR 1300, such as a first substrate 1802 made of polyimide, and a second substrate 1804 that is flexible and that has a resistive material on its back surface. One or more spacer layers (e.g., a coverlay 1806 and a layer of adhesive 1808) may be interposed between the first substrate 1802 and the second substrate 1804.

A portion of the first substrate 1802 of the FSR 1800 in FIGS. 18B and 18C is wrapped around the second substrate 1804 and is also disposed on a front surface of the second substrate 1804. FIG. 18A is labeled "Before Fold" and depicts the FSR 1800 before the portion of the first substrate 1802 is wrapped around the second substrate 1804. In FIG. 18A, the FSR 1800 includes a first body portion 1812(1) (sometimes referred to as the "lower balloon" 1812(1)) and a second body portion 1812(2) (sometimes referred to as the "upper balloon" 1812(2)). The lower balloon 1812(1) is connected to the upper balloon 1812(2) by a folding neck 1814 at a first end of the lower balloon 1812(1). A soldering pigtail 1816 extends from a second end of the lower balloon 1812(1) and soldering pads 1818 are on the terminal end of the soldering pigtail 1816. An actuator 1810 in the form of a tact switch is disposed on the upper balloon 1812(2) such that the actuator 1810 ends up being the front or top layer of the FSR 1800 after the folding operation, as shown in FIGS. 18B and 18C. Thus, the portion of the first substrate 1802 of the FSR 1800 that is wrapped around the second substrate 1804 is the upper balloon 1812(2).

Figure 18D:
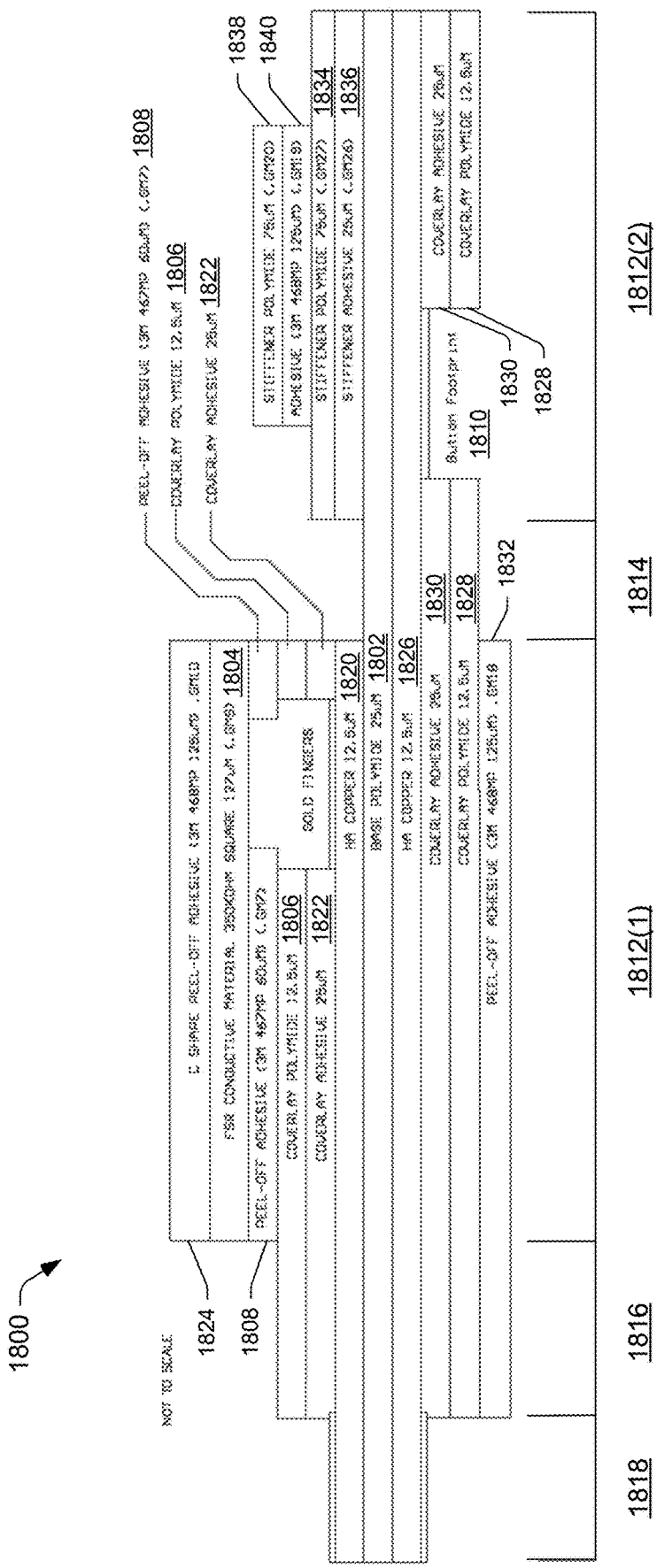
FIG. 18D depicts example layers of the FSR of FIG. 18A.

A cross section of the FSR 1800, after the folding operation, is shown in FIG. 18C to depict example layers of the FSR 1800. Some of the layers shown in FIG. 18C are described in more detail with reference to FIG. 18D. In this embodiment of FIG. 18C, a force, F, can be applied to the actuator 1810 (e.g., tact switch), causing a variable resistance of the FSR 1800 that is converted into a variable digitized value. The use of a tact switch for the actuator 1810 (e.g., a switch that toggled to a different binary state under the application of a predefined amount of force, F) creates a dual-stage FSR 1800 that first "clicks" when the tact switch 1810 is actuated, and then the FSR 1800 can output variable resistance as increased force, F, is applied. This can serve to calibrate the FSR 1800 on individual actuations of the FSR 1800 by assuming that the tact switch 1810 actuates at a same amount of force, F, each time it is depressed. That is, the FSR 1800 can reset to the known amount of force, F, associated with actuation of the tact switch 1810 in response to detecting an actuation of the tact switch 1810. This can mitigate inherent inaccuracy of the FSR 1800.

As shown in FIGS. 18C and 18D, the FSR 1800 includes a first substrate 1802 made of polyimide having a thickness (as measured in the Z direction) of 25 microns. A conductive material (e.g., the metal fingers 1820 made of HA copper (e.g., gold-plated copper) shown in FIG. 18D) having a thickness (as measured in the Z direction) of 12.5 microns may be disposed on the front surface of the first substrate 1802 at the lower balloon 1812(1) such that the conductive material is underneath the resistive material on the second substrate 1804. A coverlay adhesive 1822 may be used to attach the coverlay 1806 to the front surface of the first substrate 1802 atop the metal fingers 1820. The coverlay adhesive 1822 may have a thickness (as measured in the Z direction) of 25 microns. The coverlay 1806 may be made of polyimide, and may have a thickness (as measured in the Z direction) of 12.5 microns. The layer of adhesive 1808 disposed on the coverlay 1806 may be a peel-off adhesive, such as 3M MP467 adhesive. The thickness (as measured in the Z direction) of the layer of adhesive 1808 may be 60 microns. The thickness (as measured in the Z direction) of the sheet substrate 1804 may be 127 microns. The sheet resistance of the resistive material on the back surface of the second substrate 1804 may be 350 kOhm/sq. A layer of adhesive 1824 may be used to attach the upper balloon 1812(2) to the lower balloon 1812(1) when the upper balloon 1812(2) is folded over the lower balloon 1812(1) at the folding neck 1814. The layer of adhesive 1824 can be 125 microns in thickness (as measured in the Z direction). A suitable adhesive for the layer of adhesive 1824 is 3M 468MP. The layer of adhesive 1824 may also be C-shaped.

On the upper balloon 1812(2) of the FSR 1800, a first stiffener polyimide 1834 may be attached to the front surface of the first substrate 1802 (before folding) using a stiffener adhesive 1836. The first stiffener polyimide 1834 may have a thickness (as measured in the Z direction) of 75 microns. The thickness (as measured in the Z direction) of the stiffener adhesive may be 25 microns. In addition, on the upper balloon 1812(2) of the FSR 1800, a second stiffener polyimide 1838 may be attached to the front surface of the first stiffener polyimide 1834 (before folding) using a layer of adhesive 1840. The second stiffener polyimide 1838 may have a thickness (as measured in the Z direction) of 75 microns. The thickness (as measured in the Z direction) of the layer of adhesive may be 125 microns. When the upper balloon 1812(2) is folded over the lower balloon 1812(1) at the folding neck 1814, the second stiffener polyimide 1838 comes into contact with the second substrate 1804, as shown in FIG. 18C, and the layer of adhesive 1824 adheres the two main body portions 1812(1) and 1812(2) of the FSR 1800 in a stacked relationship after the folding operation. It is to be appreciated that other thickness values, sheet resistance values, and/or materials than those specified with reference to FIG. 18D may be utilized, such as when the FSR 1800 is used in other applications, such as non-controller based applications. As such, these values and materials are to be understood as non-limiting In addition, as shown in FIG. 18D, a conductive material 1826 may be disposed on a back surface of the first substrate 1802. The conductive material 1826 may be HA copper having a thickness (as measured in the Z direction) of 12.5 microns. An additional coverlay 1828 may be deposited on the conductive material 1826. This additional coverlay 1828 may be made of polyimide, and may be attached to the conductive material 1826 using a coverlay adhesive 1830. The thickness (as measured in the Z direction) of the additional coverlay 1828 may be 12.5 microns, and a thickness (as measured in the Z direction) of the coverlay adhesive 1830 may be 25 microns. The additional coverlay 1828 and the coverlay adhesive 1830 may span the soldering pigtail 1816, the lower balloon 1812(1), the folding neck 1814, and a portion of the upper balloon 1812(2), leaving a footprint (or space) for the actuator 1810 ("Button Footprint" in FIG. 18D). A layer of adhesive 1832 may be disposed on the additional coverlay 1828. The layer of adhesive 1832 may be a peel-off adhesive, such as 3M 468MP adhesive, at a thickness (as measured in the Z direction) of 125 microns. The layer of adhesive 1832 may span the soldering pigtail 1816 and the lower balloon 1812(1).

Although the example FSR 1300/1800 is shown as having a generally circular shape, it is to be appreciated that the FSR 1300/1800 can be constructed in layers of different cross-sectional shapes, such as square, rectangular, etc. The FSR 1300/1800 can be larger or smaller in overall size than the examples described herein, depending on the particular application. Furthermore, it is to be appreciated that arrays of FSRs can be implemented by connecting multiple FSRs 1300/1800 together. In such an array, the layers of FSR material may be constructed in a long strip of material.

Figure 19:
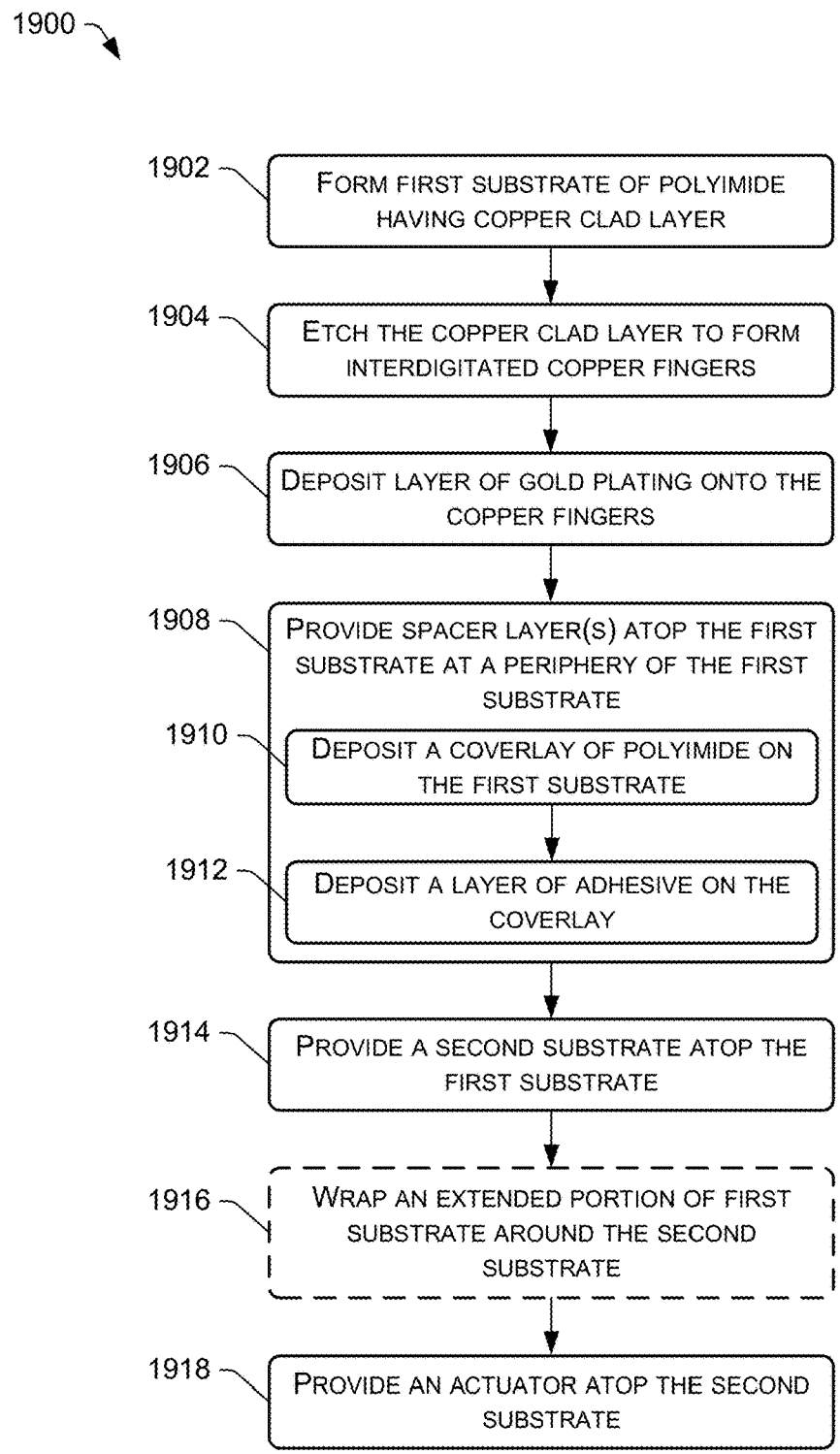
FIG. 19 is a flow diagram of an example process for manufacturing a FSR.

FIG. 19 is a flow diagram of an example process 1900 for manufacturing a FSR, such as the FSR 1300 or the FSR 1800 disclosed herein. The processes described herein are illustrated as a collection of blocks in a logical flow graph, which represent a sequence of operations. The order in which the operations are described is not intended to be construed as a limitation, and any number of the described blocks can be combined in any order and/or in parallel to implement the processes.

At 1902, a first substrate 1302 made of polyimide may be formed with copper clad layer disposed on a front surface of the first substrate 1302.

At 1904, the copper clad layer may be etched to form a plurality of interdigitated copper fingers (i.e., an example of the metal fingers 1400) on the front surface of the first substrate 1302. The etching at block 1904 may include removing strips of copper material having a width of 0.2 mm to create a distance of 0.2 mm between pairs of adjacent copper fingers among the plurality of interdigitated copper fingers. The spacing between sequential strips of removed copper material may also be kept at 0.2 mm to provide copper fingers having a width of 0.2 mm.

At 1906, a layer of gold plating may be deposited onto the plurality of interdigitated copper fingers to create gold-plated fingers. This gold plating may be ENIG.

At 1908, one or more spacer layers may be provided atop the first substrate 1302 at a periphery of the first substrate 1302, thereby leaving a portion of the gold-plated fingers uncovered by the one or more spacer layers. As shown by the sub-blocks 1910 and 1912, multiple spacer layers may be provided in two operations.

At 1910, a coverlay 1306 (e.g., made of polyimide) may be deposited on the first substrate 1302 at a periphery of the first substrate. The coverlay 1306 may cover a peripheral portion of the gold-plated fingers, wherein a remaining portion of the gold-plated fingers is left uncovered by the coverlay 1306.

At 1912, a layer of adhesive 1308 may be deposited on the coverlay 1306 such that the remaining portion of the gold-plated fingers is left uncovered by the layer of adhesive 1308. Furthermore, the operation at block 1912 may include leaving a section of the coverlay 1306 uncovered by the layer of adhesive 1308 to create an air gap that allows air to ingress or egress from a space between the first substrate 1302 and the second substrate 1304.

At 1914, a second substrate 1304 may be provided atop the first substrate 1302 such that a center portion of the second substrate 1304 is suspended over the first substrate 1302 by the one or more spacer layers interposed between the first substrate 1302 and the second substrate 1304. This second substrate 1304 is flexible and has resistive material disposed on a back surface of the second substrate 1304.

At 1916, in order to construct the FSR 1800, an extended portion of the first substrate 1802 may be wrapped around the second substrate 1804 and attached to the front surface of the second substrate 1804, where the extended portion of the first substrate 1802 is to be interposed between a to-be-attached actuator 1810 and the second substrate 1804. As shown by the dotted outline of block 1916, this operation is performed to construct the FSR 1800, but may be omitted when constructing the FSR 1300.

At 1918, an actuator 1310 may be provided atop the second substrate 1304, such as by attaching the actuator 1310 to a front surface of the second substrate 1304 to construct the FSR 1300, or by attaching the actuator 1810 (e.g., a tact switch), to the first substrate 1802 that is interposed between the first substrate second substrate 1804 and the actuator 1810.

The FSR 1300/1800 disclosed herein may be mounted on a planar surface of a structure within a handheld controller, such as the controller 100/600 disclosed herein, and this structure can be positioned at any suitable location within the controller body 110 in order to measure a resistance value that corresponds to an amount of force applied to an outer surface of the controller body 110 (e.g., a force applied by a finger pressing upon a control, a force applied by a hand squeezing the handle 112/612. With specific reference to FIGS. 9A and 9B, the FSR 1300/1800 can be mounted on a planar surface of the PCB 920, which itself may be mounted within the tubular housing 612a, 612b of the handle 612. In this configuration, the plunger 924 may interface with the actuator 1310/1810 of the FSR 1300/1800, which may allow for conveying a compressive force from the plunger 924 to the actuator 1310/1810. Other configurations are possible, however, where the plunger 924 is omitted, and the actuator 1310/1810 interfaces with a portion of the tubular housing 612a, 612b of the handle 612. With specific reference to FIG. 1, a FSR 1300/1800 can be mounted on a planar surface of a structure within a head (between the handle 112 and a distal end 111). The structure mounted within a head may be mounted underneath one or more of the thumb-operated controls 114, 115, 116. For example, the FSR 1300/1800 can be positioned underneath the thumb-operated control 116 (e.g., a track pad). Accordingly, when a user's thumb presses upon the thumb-operated control 116 during operation while the controller 100, the FSR 1300/1800 positioned underneath the thumb-operated control 116 may be configured to measure a resistance value that corresponds to an amount of force applied to the thumb-operated control 116 by the user's thumb. It is to be appreciated that multiple FSRs 1300/1800 can be disposed within the controller body 110 of the controller, such as one or more FSRs 1300/1800 mounted within the handle 112/612 and one or more FSRs 1300/1800 mounted underneath one or more corresponding controls 114, 115, 116 on the head of the controller body 110.

The FSR 1300/1800 disclosed herein may enable variable analog inputs when implemented in a controller 100/600. For instance, squeezing the handle 112/612 or pressing upon the thumb-operated control(s) (e.g., 116) with varying amount of force may cause resistance of the FSR 1300/1800 to vary with the applied force, and the resistance can be converted to a varying digitized value that represents the FSR input for controlling a game mechanic.

Figure 20:
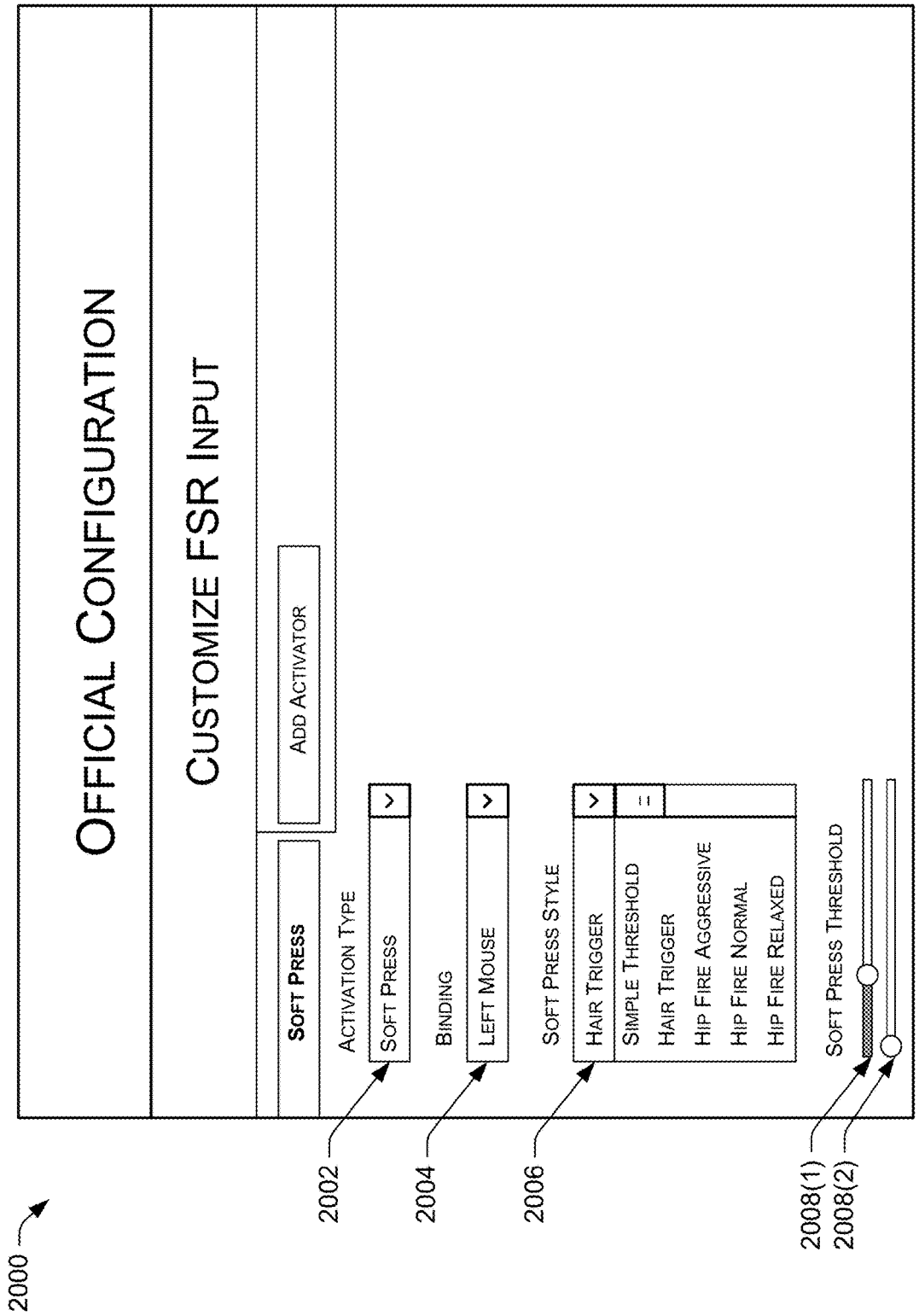
FIG. 20 illustrates an example user interface (UI) that may be used to configure a FSR-based input mechanism of a controller for an electronic system to operate in different pressure modes.

FIG. 20 illustrates an example user interface (UI) 2000 that may be used to configure a FSR-based input mechanism of a handheld controller, such as the controller 100/600, for an electronic system to operate in different modes. The UI 2000 may be output on a display of an electronic system, such as a head mounted display (HMD), or any other type of display used with a personal computer (PC) or a game console. The UI 2000 includes an "Activation Type" drop down menu 2002. The "Activation Type" drop down menu 2002 may be used to select a "Soft Press" type of activation for a FSR-based input mechanism (e.g., the thumb-operated control 116, the handle 112/612, etc.). Here, "Soft Press" means "software press," which allows the controller 100/600 and/or the electronic system with which the controller 100/600 is associated to determine, using logic, when to register a FSR-based input event based on the analog input of the FSR 1300/1800 (e.g., the FSR resistance, which corresponds to the applied force on the FSR 1300/1800, and which is converted to a digitized FSR input value), and also based on the additional configuration settings that will be discussed shortly. In other words, a resistance value can be measured by the FSR 1300/1800, which can be converted into a digitized FSR input value. If this digitized FSR input value meets a criterion specified by the configuration settings for the "Soft Press," a FSR-based input event can be registered.

The UI 2000 may further include a "Binding" drop down menu 2004, which may be used to select a PC-based input control to bind to the corresponding FSR-based input mechanism on the controller 100/600. Here, the binding is selected as the Left Mouse button, but it is to be appreciated that the binding can be selected as other PC-based input controls. The binding can also be analog. For example, for a racing game, the FSR 1300/1800 can be used for the gas pedal (e.g., the harder the user presses upon a FSR-based control mechanism, the faster the racing vehicle goes in the game).

The UI 2000 may further include a "Soft Press Style" drop down menu 2006, which may be used to select one of various styles of a Soft Press. A "Simple Threshold" style means that a FSR input event occurs when the digitized FSR input value meets or exceeds a threshold value. Because the digitized FSR input value corresponds to a particular resistance value measured by the FSR, which, in turn, corresponds to a particular amount of force applied to the FSR 1300/1800, one can also think of this style of Soft Press as registering a FSR input event when the resistance value measured by the FSR meets a threshold resistance value, and/or when the applied amount of force meets a threshold amount of force. For example, if the handle 112/612 of the controller 100/600 includes a FSR 1300/1800, the handle 112/612 can be squeezed until a threshold amount of force is reached, and, in response, a FSR input event is registered as a "Soft Press." The force required to "unpress" may be a fraction of the threshold value for debounce purposes and/or to mimic a tact switch with a physical snap ratio. The "Simple Threshold" style may therefor replace a conventional mechanical switch. The UI 2000 shows that a configurable Soft Press Threshold 2008(1) can be adjusted by the user to increase or decrease a threshold value that is compared to digitized FSR input values to determine whether to register a FSR input event. The user can adjust the Soft Press Threshold 2008(1) lower (e.g., by moving the slider to the left) in order to reduce hand fatigue relating to actuation of the FSR-based input mechanism. The user can adjust the Soft Press Threshold 2008(1) higher (e.g., by moving the slider to the right) in order to reduce the instances in which an accidental input is registered by the FSR-based input mechanism. In some cases, the Soft Press Threshold 2008(1) can be set to a default threshold value for a particular game (e.g., a lower default threshold value for a shooting game, a higher default threshold value for an exploration game, etc.).

Figure 21:
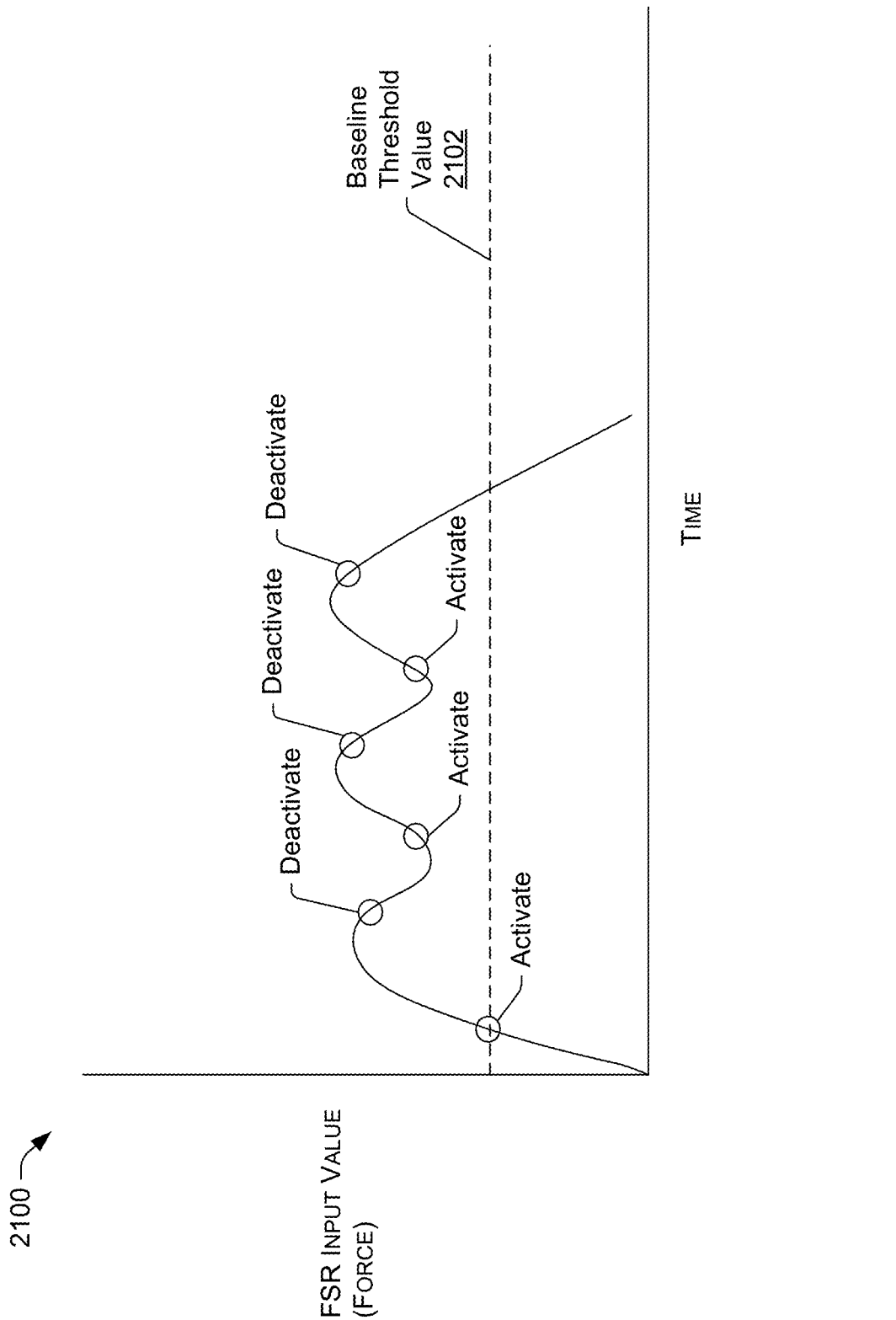
FIG. 21 depicts a Force vs. Time graph illustrating a "Hair Trigger" style of Soft Press for FSR-based input.

A "Hair Trigger" style may set a baseline threshold value, and once a digitized FSR input value associated with the FSR 1300/1800 meets or exceeds the baseline threshold value, the binding is activated (i.e., a FSR input event is registered, akin to a press-and-hold button actuation). Thereafter, any subsequent decrease in force deactivates the binding (i.e., the FSR input event is "unregistered," akin to a user letting go of a button), and any increase in force after deactivating the binding operates to activate the binding again. There may be some debounce in the "Hair Trigger" style of Soft Press. Turning briefly to FIG. 21, an example of the "Hair Trigger" logic is shown on a Force vs. Time graph 2100. The Force axis may represent digitized FSR input values ranging from zero to any suitable maximum value, which corresponds to a range of resistance values that are measurable by the FSR 1300/1800. As shown in FIG. 21, as the digitized FSR input value increases (e.g., the user presses harder and harder on the FSR-based input mechanism), the digitized FSR input value eventually crosses the baseline threshold value 2102, and, in response, the binding is activated (i.e., a FSR input event is registered akin to a press-and-hold type of user input), and thereafter, the binding is deactivated in response to a decrease in the digitized FSR input value (e.g., the user "lets up" slightly on the FSR-based input mechanism). If the user presses harder upon the FSR-based input mechanism, the binding may be activated again, and so on and so forth, as long as the force remains at a value that is greater than the baseline threshold value 2102.

Figure 22:
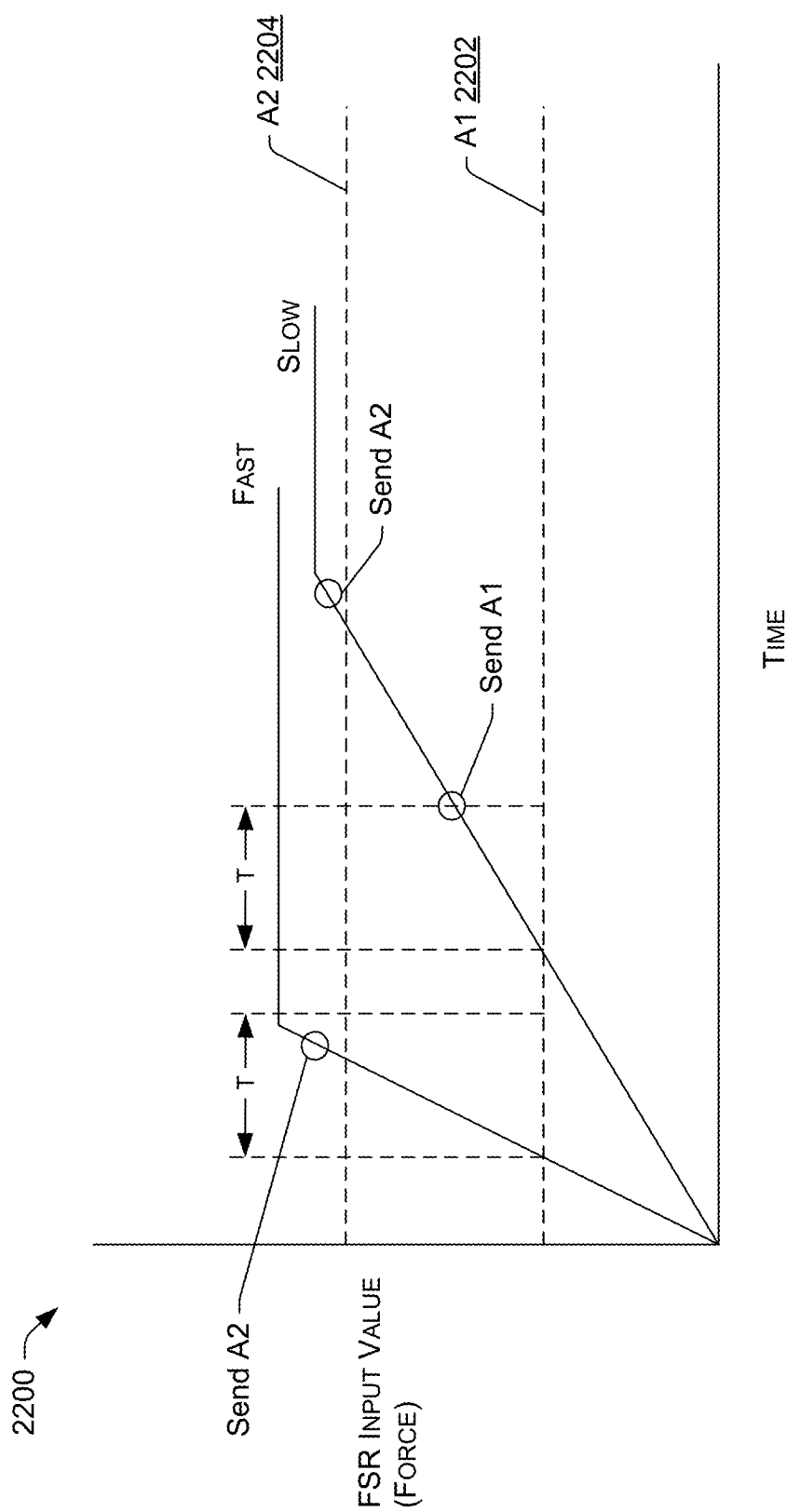
FIG. 22 depicts a Force vs. Time graph illustrating a "Hip Fire" style of Soft Press for FSR-based input.

With reference again to FIG. 20, a "Hip Fire" style of Soft Press may be selected in three different sub-styles (e.g., Aggressive, Normal, and Relaxed). The "Hip Fire" style may be similar to the "Simple Threshold" style of Soft Press, except that the "Hip Fire" style utilizes a time delay so that, in a configuration with multiple levels of bindings, the time delay can be used to ignore lower FSR input values if a higher threshold value is reached quickly enough. The amount of time delay varies between the different sub-styles (e.g., Aggressive, Normal, and Relaxed). Turning briefly to FIG. 22, an example of the "Hip Fire" logic is shown on a Force vs. time graph 2200. Again, the Force axis may represent a range of digitized FSR input values from zero to any suitable maximum value, which corresponds to a range of resistance values that are measurable by the FSR 1300/1800. As shown in FIG. 22, assume that A1 2202 corresponds to a first threshold value that corresponds to a first action, and A2 2204 corresponds to a second threshold value that corresponds to a second action. A time delay, t, can be set based on whether the Hip Fire style is the Aggressive type, the Normal type, or the Relaxed type. In the "Fast" curve shown in FIG. 22, the FSR input values reach A1 2202 quickly, which triggers the time delay to start running. The FSR input values then reach A2 2204 before the time delay has lapsed, which causes the logic to ignore A1 2202 and to register a FSR input event exclusively for the second action that corresponds to A2 2204. In the "Slow" curve shown in FIG. 22, the FSR input values reach A1 2202, and the time delay is started. However, because the FSR input values do not increase fast enough to reach A2 2204 before the time delay lapses, the logic registers a FSR input event for the first action that corresponds to A1 2202, and, thereafter, the FSR input values eventually reach A2 2204, and the logic registers an additional FSR input event for the second action that corresponds to A2 2204. The time delay, t, may be specified in milliseconds, and is configurable.

With reference again to FIG. 20, an additional Soft Press Threshold 2008(2) may be usable, for example, to set a multi-level threshold, such as the thresholds for the "Hip Fire" style of Soft Press. The different styles of Soft Press for FSR-based input can be used to enable a number of different game-related, analog inputs by virtue of the user squeezing or pressing a FSR-based input mechanism with varying force. For example, a VR game can allow a user to crush a rock or squeeze a balloon by squeezing the handle 112/612 of the controller body 110 with increasing force. As another example, a shooting-based game may allow the user to toggle between different types of weapons by pressing a thumb-operated control 116 with different levels of applied force.

Figure 23:
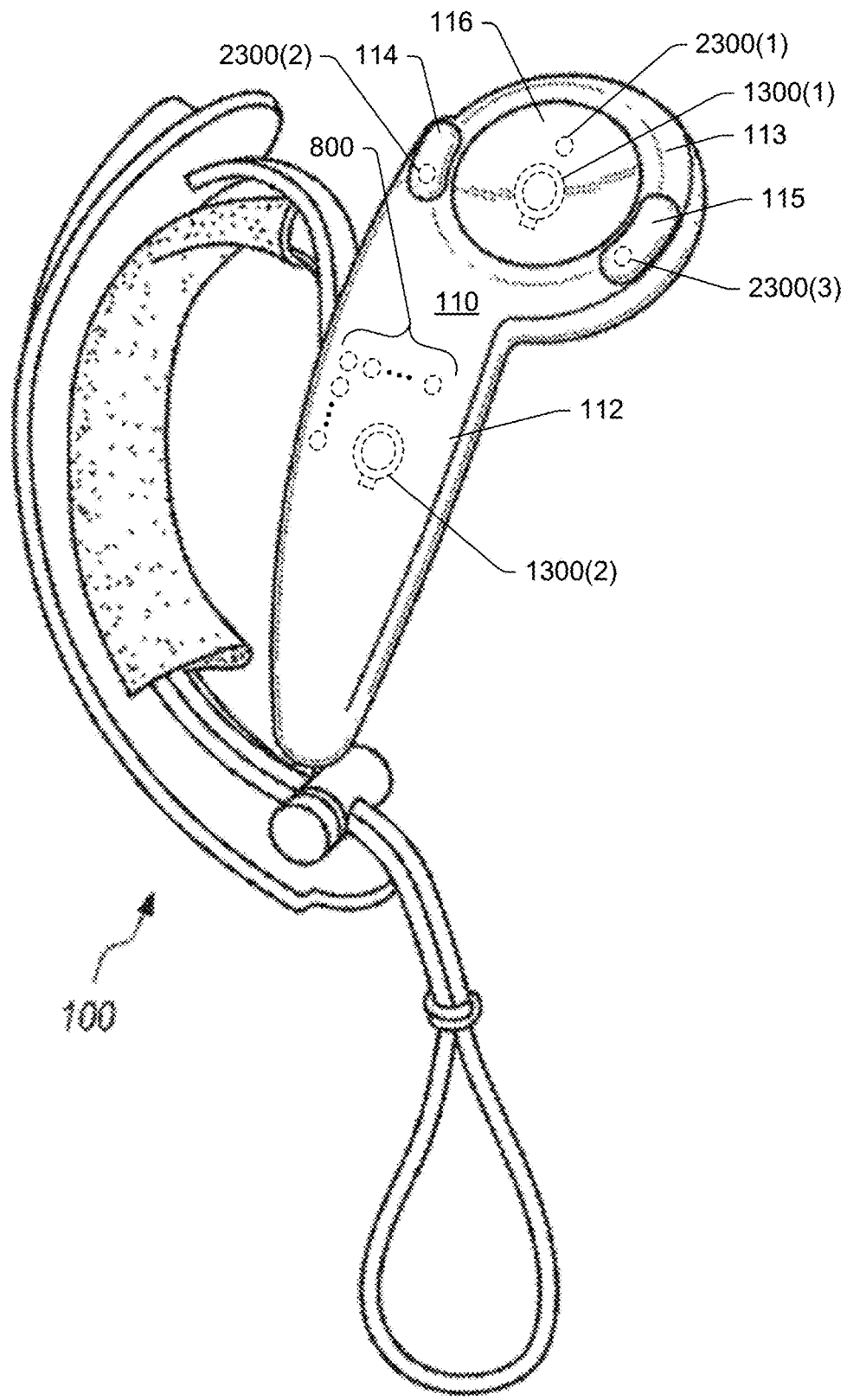
FIG. 23 depicts the controller of FIG. 1 having various sensors disposed within the controller body.

FIG. 23 depicts the controller 100 of FIG. 1 having various sensors disposed within the controller body 110. For example, a first FSR 1300(1) may be mounted underneath a control that is configured to be pressed, such as the thumb-operated control 116 that is included on a head 113 of the controller body 110. A second FSR 1300(2) may be mounted within the handle 112 of the controller body 110, along with an array of proximity sensors 800. It is to be appreciated that one or the other FSR 1300(1) or 1300(2) may be provided within the controller 100, or both FSRs 1300(1) and 1300(2) may be provided within the controller 100. In addition, or alternatively to array of proximity sensors 800, one or more touch sensors 2300 (e.g., touch sensors 2300(1)-(3)) may be associated with one or more controls that are configured to be pressed, such as the thumb-operated control 114, the thumb-operated control 115, and/or the thumb-operated control 116, and/or a finger-operated control (e.g., a trigger 609). The touch sensor(s) 2300 may be configured to provide touch data indicative of an object (e.g., a finger, a thumb, etc.) contacting an associated control (e.g., one or more of the thumb-operated controls 114-116). In an example, the touch sensor(s) 2300 comprises a capacitive sensor (or array of capacitive sensors) that is mounted within the head 113 of the controller body 110 (e.g., adhered or otherwise attached to a back surface of the outer housing and underneath the controls 114-116, attached to a structure, such as a PCB, within the head 113, etc.). In other instances, the touch sensor(s) 2300 can be based on other touch-sensing technologies, such as an infrared or acoustic touch sensor. Meanwhile, the array of proximity sensors 800 that are spatially distributed on the handle 112 may be configured to provide proximity data indicative of a hand grasping the handle 112. The proximity sensors 800 can also use any suitable technology for sensing contact and/or proximity of the hand on/to the handle 112, as disclosed herein. The FSRs 1300 are configured to provide force data indicative of an amount of force of a press of a control (e.g., a press of the control 116), or a squeeze of the handle 112. Sets of the various sensors shown in FIG. 23 may be connected by a flex circuit. For example, the touch sensors 2300 and the FSR 1300(1) in the head 113 may be connected together by a common flex circuit. The polyimide substrate of the FSR 1300 disclosed herein allows for this type of direct soldering of the FSR output terminals to a flex circuit.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 24:
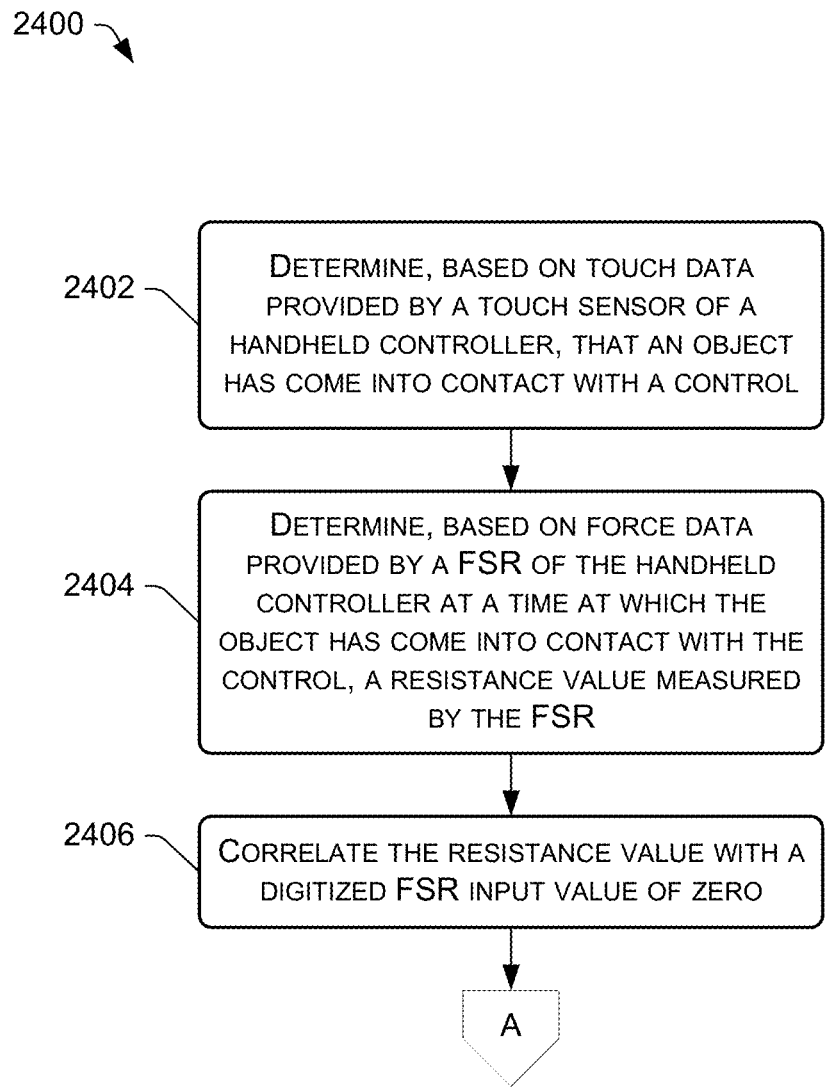
FIG. 24 is a flow diagram of an example process for re-calibrating a FSR of a handheld controller based on touch data provided by a touch sensor.

FIG. 24 is a flow diagram of an example process 2400 for re-calibrating a FSR 1300/1800 of a handheld controller 100/600 based on touch data provided by a touch sensor.

At 2402, logic of the handheld controller 100/600 may determine, based at least in part on touch data provided by a touch sensor, that an object (e.g., a finger, a thumb, etc.) has come into contact with at least one control of the handheld controller. The at least one control may be included on the controller body 110 of the controller 100/600 and may be configured to be pressed. For instance, the control may be the thumb-operated control 116 included on the head 113 of the controller body 110. In this embodiment, the touch sensor can be one of the touch sensors 2300. Alternatively, the control may be the handle 112 of the controller body 110. In this embodiment, the touch sensor can be the array of proximity sensors 800.

At 2404, the logic may determine, based at least in part on force data provided by a FSR 1300/1800 at a time at which the object has come into contact with the at least one control, a resistance value measured by the FSR 1300/1800.

At 2406, the logic may correlate the resistance value with a digitized FSR input value of zero. In other words, the sensed resistance when the object comes into contact with the at least one control can be taken as a force input of zero, meaning that any increase in force applied to the FSR 1300/1800 after that point is correlated with a positive FSR input value. Thus, the process 2400 represents a sensor fusion algorithm that can help mitigate any inherent inaccuracy of the FSR 1300/1800—which might measure some resistance even when an object is not pressing upon the control—through recalibration on the detection of a touch of the control.

Figure 25:
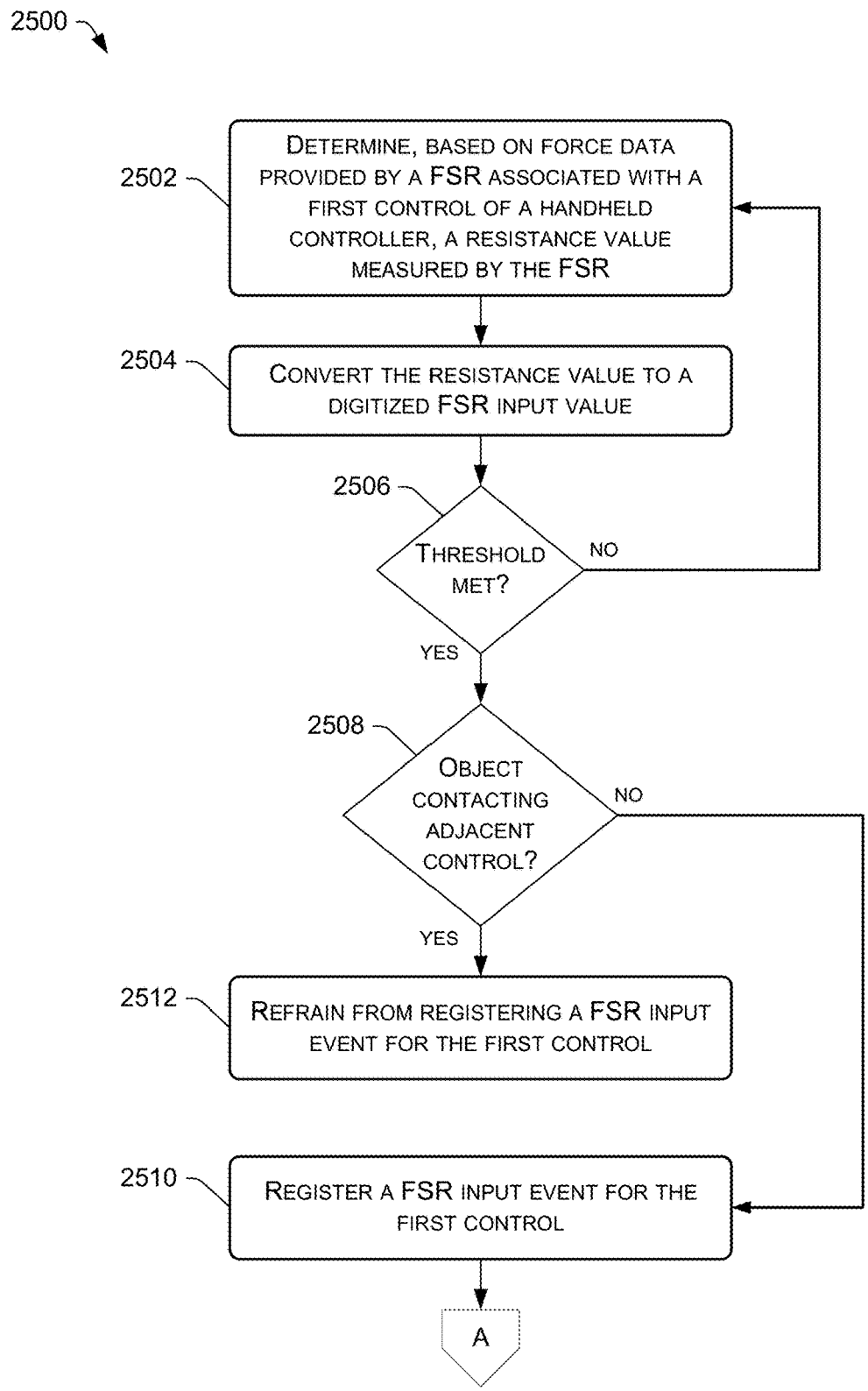
FIG. 25 is a flow diagram of an example process for ignoring spurious input at a FSR of a handheld controller based on touch data provided by a touch sensor for an adjacent control.

FIG. 25 is a flow diagram of an example process 2500 for ignoring spurious input at a FSR 1300/1800 of a handheld controller 100/600 based on touch data provided by a touch sensor for an adjacent control.

At 2502, logic of a handheld controller 100/600 may determine, based at least in part on force data provided by a FSR 1300/1800 associated with a first control (e.g., thumb-operated control 116) of the handheld controller, a resistance value measured by the FSR 1300/1800.

At 2504, the logic may convert the resistance value to a digitized FSR input value.

At 2506, the logic may determine whether the digitized FSR input value meets or exceeds a threshold value that is to be met in order to register a FSR input event for the first control. If the threshold is not met at 2506, the process 2500 follows the "NO" route from block 2506 to block 2502 to await additional force data. If the threshold is met at 2506, the process 2500 follows the "YES" route from block 2506 to block 2508.

At 2508, the logic may determine whether an object (e.g., a finger, a thumb, etc.) is in contact with an adjacent, second control based at least in part on touch data provided by a touch sensor 2300 associated with a second control adjacent to the first control (e.g., thumb-operated control 114 or 115)—the touch data provided at a time at which the FSR resistance value is measured by the FSR 1300/1800. If the object is not in contact with the adjacent, second control, the process 2500 follows the "NO" route from block 2508 to block 2510, where the logic registers a FSR input event for the first control (e.g., by activating a binding for the first control). If the object is in contact with the adjacent, second control, the process 2500 follows the "YES" route from block 2508 to block 2512.

At 2512, the logic may refrain from registering the FSR input event for the first control based at least in part on determining that the object is in contact with the second control. Thus, the process 2500 represents a sensor fusion algorithm that can be used to ignore spurious inputs at the FSR 1300/1800 based on a press of an adjacent control on the handheld controller.

Figure 26:
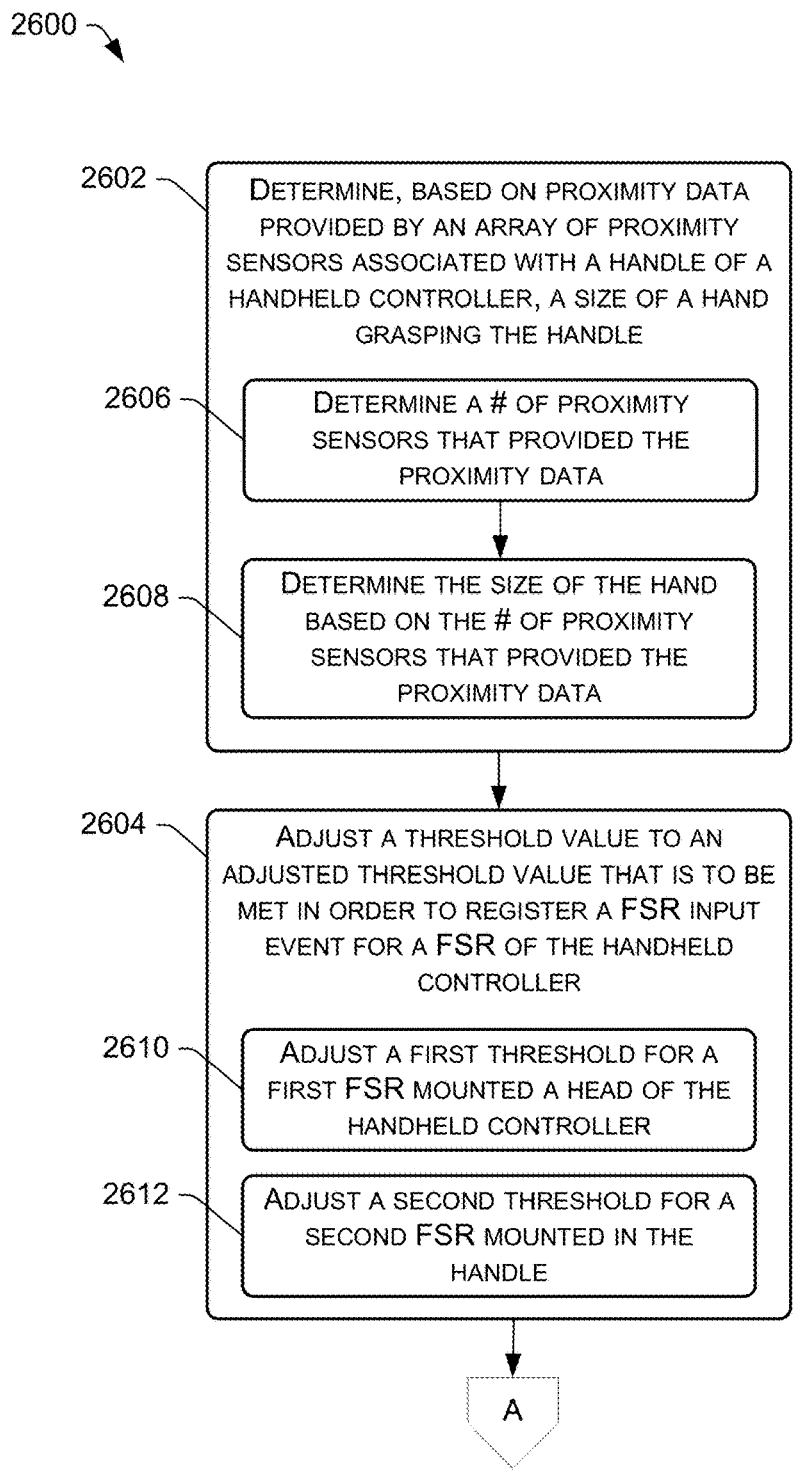
FIG. 26 is a flow diagram of an example process for adjusting a FSR input threshold for a FSR based on a hand size detected by an array of proximity sensors in the handle of the handheld controller.

FIG. 26 is a flow diagram of an example process 2600 for adjusting a FSR input threshold for a FSR 1300/1800 based on a hand size detected by an array of proximity sensors 800 in the handle 112/612 of the handheld controller 100/600.

At 2602, logic of a handheld controller 100/600 may determine, based at least in part on proximity data provided by an array of proximity sensors 800 that are spatially distributed on a handle of the controller 100/600, a size of a hand that is grasping the handle 112/612. The size of the hand may be determined from among a plurality of predefined hand sizes (e.g., small and large, or small, medium, and large, etc.).

At 2604, the logic may adjust, based at least in part on the size of the hand determined at block 2602, a threshold value to an adjusted threshold value that is to be met in order to register a FSR input event for the handle 112/612. This adjusted threshold value corresponds to a particular amount of force with which the handle 112/612 can be squeezed. For example, an amount of force corresponds to a measured resistance of the FSR 1300/1800 in the handle 112/612, and that resistance may correspond to a digitized FSR input value. When the user squeezes the handle, if the digitized FSR input value meets or exceeds the adjusted threshold value, a FSR input event can be registered. Thus, the threshold value may be adjusted to a lower value for a user with a smaller hand, while the threshold value may be adjusted to a greater value for a user with a larger hand, as detected by the array of proximity sensors 800 at block 2602. In some cases, a default threshold value may be configured for the controller 100/600 prior to detection of the hand size at block 2602, and the adjustment at block 2604 may be to increase or decrease the threshold value with respect to the default value.

As shown by the sub-blocks in FIG. 26, the process 2600 may involve more detailed operations. For example, the determining of the hand size at block 2602 may include sub-blocks 2606 and 2608.

At 2606, the logic may determine a number of proximity sensors of the array of proximity sensors 800 that provided the proximity data. For example, a small hand may only span a small subset of the proximity sensors in the array of proximity sensors 800, and the remaining proximity sensors that do not detect the small-sized hand may not provide the aforementioned proximity data. By contrast, a large hand may span the entirety of the array of proximity sensors 800, and, in this case, all (or at least a number above a threshold number) of the proximity sensors 800 may provide the proximity data.

At 2608, the logic may determine the size of the hand based at least in part on the number of proximity sensors (of the array 800) that provided the proximity data.

Additionally, as shown by sub-blocks 2610 and 2612, the adjustment of the threshold value at block 2604 may include adjusting the threshold value for one or more FSRs of the controller 100/600.

For example, at 2610, the logic may adjust a first threshold value (associated with a first FSR 1300(1)) that is to be met in order to register a FSR input event for the control 116. At 2612, the logic may, additionally or alternatively, adjust a second threshold value (associated with a second FSR 1300(2)) that is to be met in order to register a FSR input event for the handle 112/612.

Figure 27:
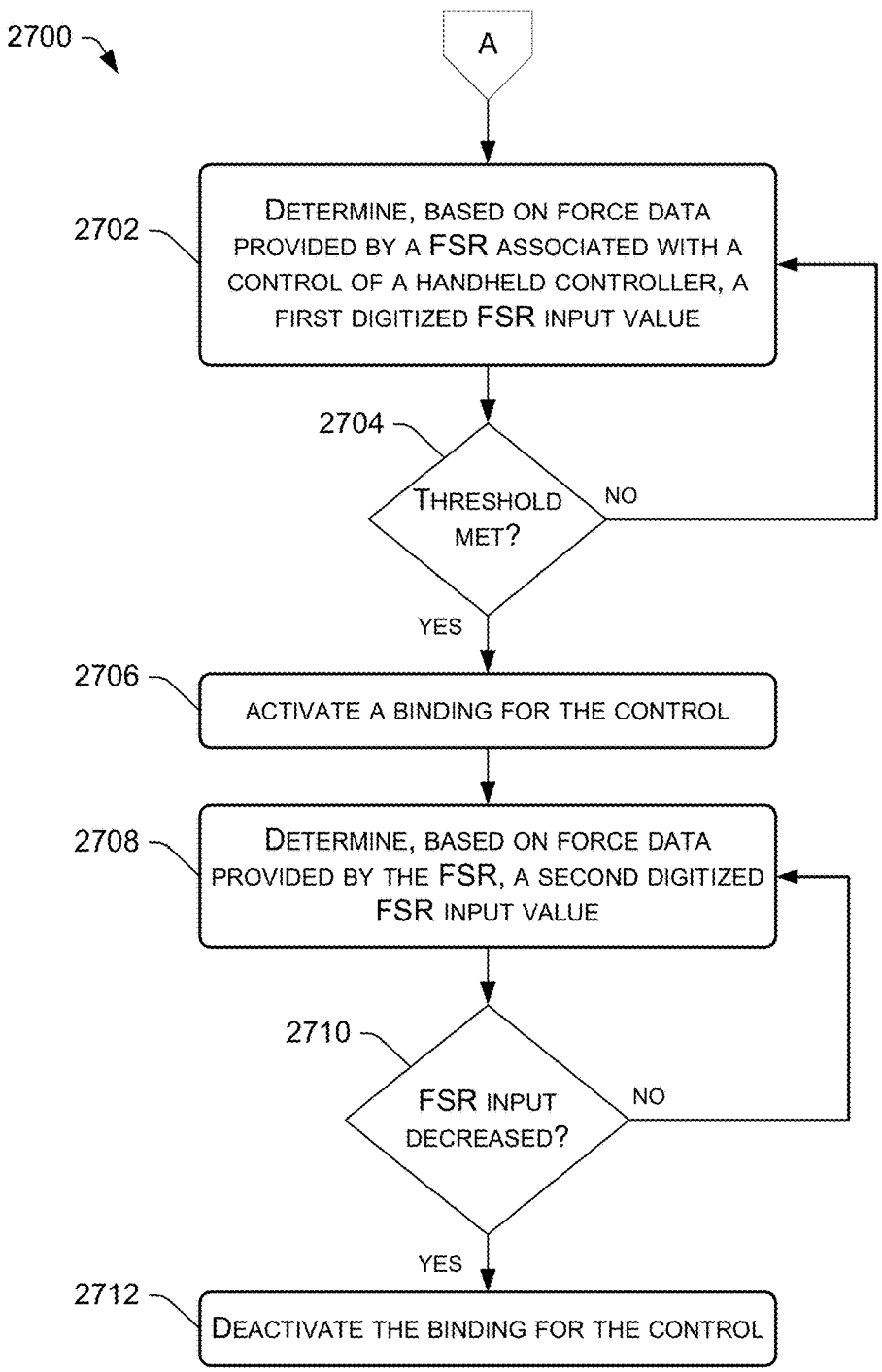
FIG. 27 is a flow diagram of an example process for activing and deactivating a binding for a control of a handheld controller based on FSR input values.

FIG. 27 is a flow diagram of an example process 2700 for activing and deactivating a binding for a control of a handheld controller based on FSR input values. As shown by the off-page reference "A" in FIG. 27, the process 2700 may continue from any of the processes 2400, 2500, or 2600, but it does not have to.

At 2702, logic of a handheld controller 100/600 may determine, based at least in part on force data provided by a FSR 1300/1800 of the controller 100/600, at a first time, a first digitized FSR input value. This first digitized FSR input value may be converted from a first resistance value measured by the FSR 1300/1800 at the first time.

At 2704, the logic may determine whether the first digitized FSR input value meets or exceeds a threshold value that is to be met in order to register a FSR input event (e.g., for binding the control associated with the FSR 1300/1800). If the threshold is not met at 2704, the process 2700 follows the "NO" route from block 2704 to block 2702 where the logic awaits additional force data. If the threshold is met at 2704, the process 2700 follows the "YES" route from block 2704 to block 2706.

At 2706, the logic may register the FSR input event (e.g., to activate the binding associated with the control associated with the FSR 1300/1800) based at least in part on the first digitized FSR input value meeting or exceeding the threshold value.

At 2708, the logic may determine, based at least in part on force data provided by the FSR 1300/1800, at a second time after the first time, a second digitized FSR input value. This second digitized FSR input value may be converted from a second resistance value measured by the FSR 1300/1800 at the second time.

At 2710, the logic may determine whether the second digitized FSR input value is less than the first digitized FSR input value (i.e., whether the FSR input has decreased since a previous measurement by the FSR 1300/1800). If the second digitized FSR input value is less than the first digitized FSR input value, the process 2700 follows the "YES" route from block 2710 to block 2712, where the logic may deactivate the binding for the control associated with the FSR 1300/1800 (which can be thought of as unregistering a previously registered FSR input event that amounts to a press-and-hold input). If the second digitized FSR input value is not less than the first digitized FSR input value at block 2710, the process 2700 follows the "NO" route from block 2710 to block 2708 where the logic awaits additional force data from the FSR 1300/1800. The process 2700 may reflect the FSR detection mode illustrated in FIG. 21 and described above. Thus, the threshold evaluated at block 2704 may correspond to the baseline threshold value 2102 described with reference to FIG. 21.

Figure 28:
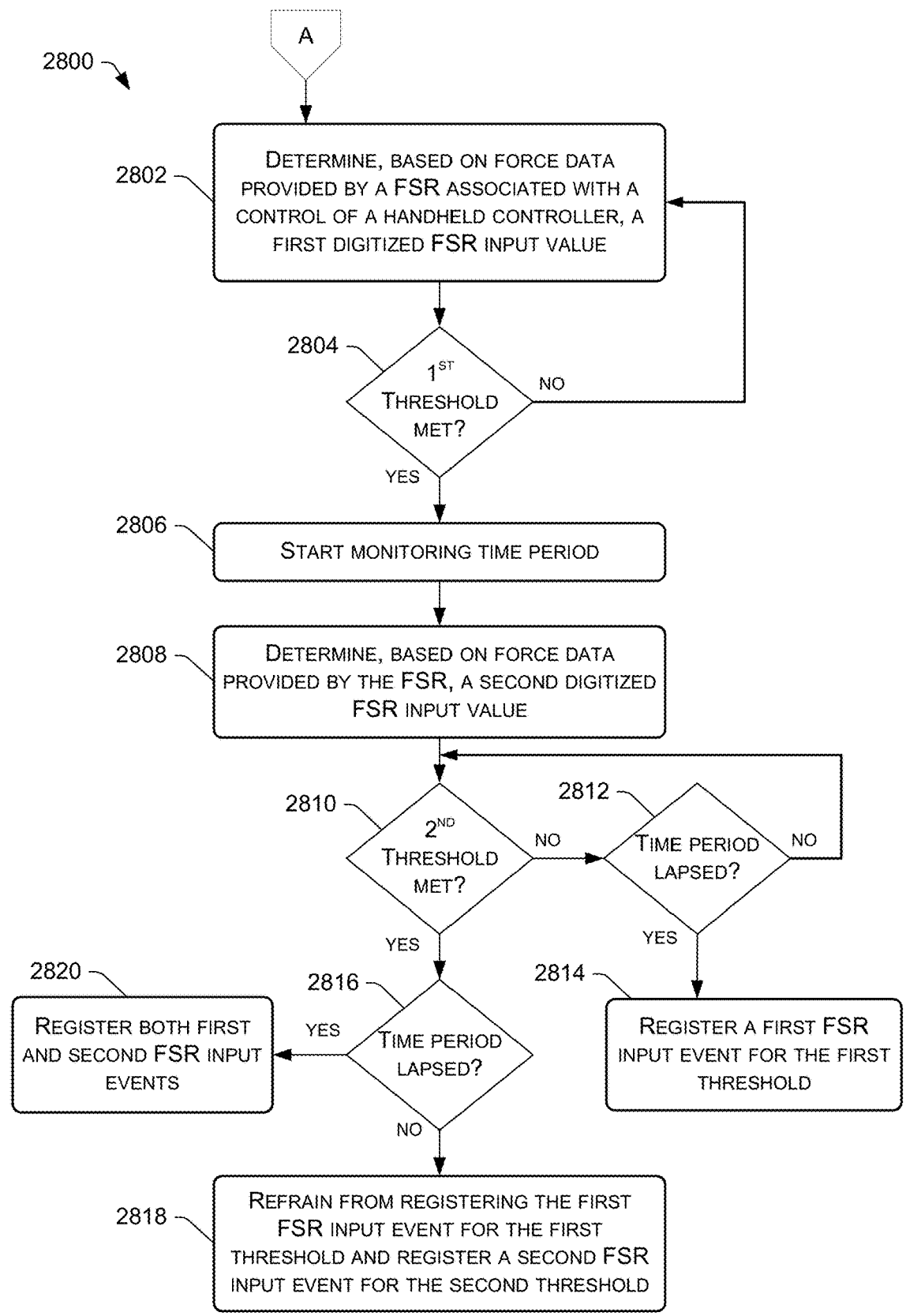
FIG. 28 is a flow diagram of an example process for using a time-delay to determine whether to ignore FSR input for a first of multiple thresholds.

FIG. 28 is a flow diagram of an example process 2800 for using a time-delay to determine whether to ignore FSR input for a first of multiple thresholds. As shown by the off-page reference "A" in FIG. 28, the process 2800 may continue from any of the processes 2400, 2500, or 2600, but it does not have to.

At 2802, logic of a handheld controller 100/600 may determine, based at least in part on force data provided by a FSR 1300/1800 of the controller 100/600, at a first time, a first digitized FSR input value. This first digitized FSR input value may be converted from a first resistance value measured by the FSR 1300/1800 at the first time.

At 2804, the logic may determine whether the first digitized FSR input value meets or exceeds a first threshold value (e.g., A1 2202 of FIG. 22) that is to be met in order to register a first FSR input event (e.g., for binding the control associated with the FSR 1300/1800). The first FSR input event may be associated with a first action (e.g., a first game mechanic). If the first threshold is not met at 2804, the process 2800 follows the "NO" route from block 2804 to block 2802 where the logic awaits additional force data. If the threshold is met at 2804, the process 2800 follows the "YES" route from block 2804 to block 2806.

At 2806, the logic may start monitoring a predefined time period (e.g., the time delay, t, in FIG. 22).

At 2808, the logic may determine, based at least in part on force data provided by the FSR 1300/1800, at a second time after the first time, a second digitized FSR input value. This second digitized FSR input value may be converted from a second resistance value measured by the FSR 1300/1800 at the second time.

At 2810, the logic may determine whether the second digitized FSR input value meets or exceeds a second threshold value (e.g., A2 2204 of FIG. 22) that is to be met in order to register a second FSR input event (e.g., for binding the control associated with the FSR 1300/1800). The second FSR input event may be associated with a second action (e.g., a second game mechanic) different from the first action, and the second threshold is greater than the first threshold. If the second threshold is not met at 2810, the process 2800 follows the "NO" route from block 2810 to block 2812 where the logic awaits determines whether the predefined time period has lapsed (e.g., whether the difference between the second time and the first time is less than the predefined time period). If the time period has not yet lapsed at block 2812, the process 2800 iterates by following the "NO" route from block 2812 back to block 2810. If the time period has lapsed at block 2812 and the second threshold has not been met, the process 2800 follows the "YES" route from block 2812 to block 2814 where the logic may register the first FSR input event for the first threshold (e.g., which may be associated with a first action or game mechanic).

If the second threshold is met at 2810, the process 2800 follows the "YES" route from block 2810 to block 2816, where the logic evaluates the predefined time period. If the time period has not yet lapsed at block 2816, the process 2800 follows the "NO" route from block 2816 back to block 2818 where the logic refrains from registering the first FSR input event, and registers the second FSR input event associated with the second threshold (e.g., which may be associated with a second action or game mechanic). If the time period has lapsed at block 2816 and the second threshold has been met, the process 2800 follows the "YES" route from block 2816 to block 2820 where the logic may register both the first FSR input event for the first threshold and the second FSR input event for the second threshold. The process 2800 may reflect the FSR detection mode illustrated in FIG. 22 and described above.

Figure 29:
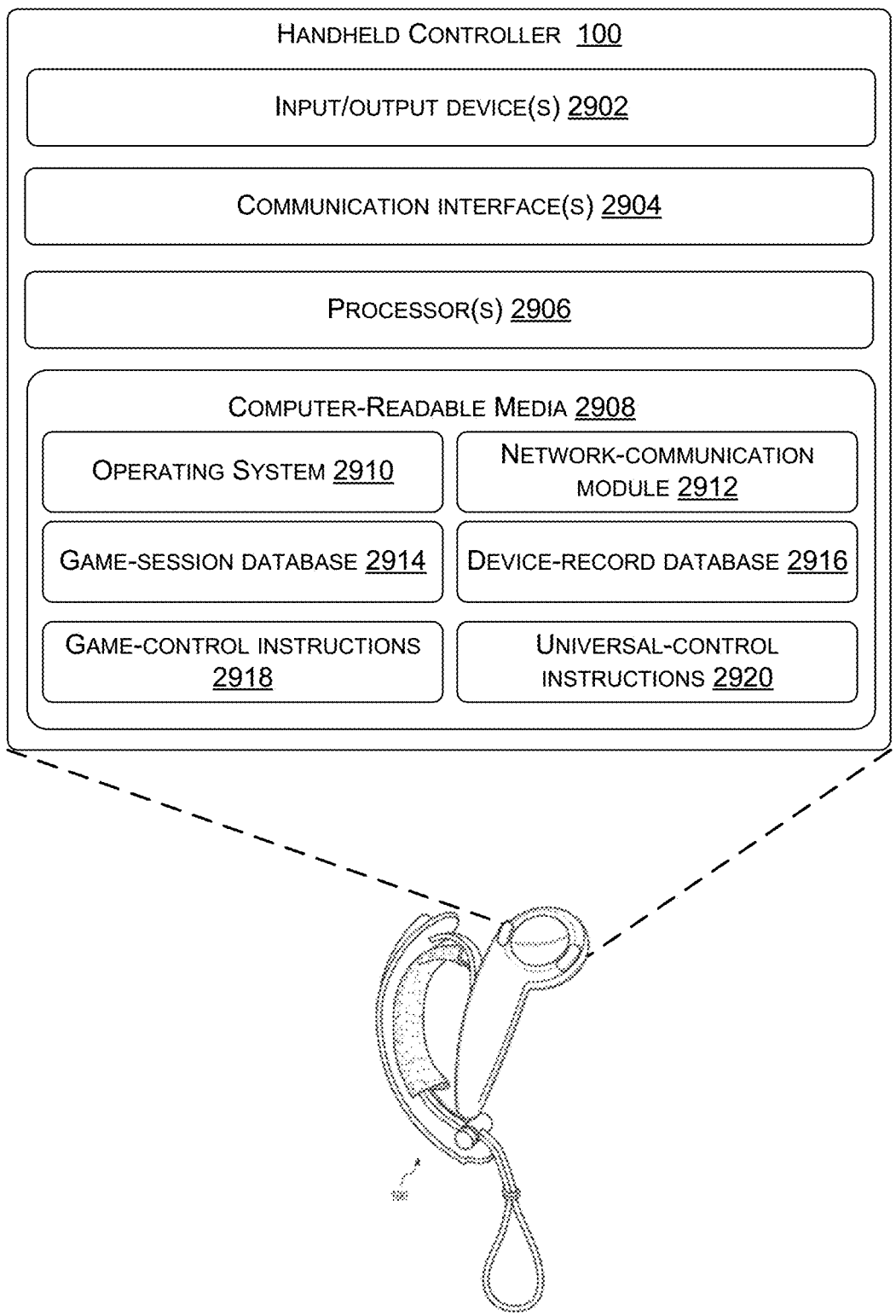
FIG. 29 illustrates example components of a handheld controller, such as the controller of FIG. 1.

FIG. 29 illustrates example components of a handheld controller, such as the controller 100 of FIG. 1, although the components shown in FIG. 29 can be implemented by the controller 600 as well. As illustrated, the handheld controller includes one or more input/output (I/O) devices 2902, such as the controls described above (e.g., joysticks, trackpads, triggers, etc.), potentially any other type of input or output devices. For example, the I/O devices 2902 may include one or more microphones to receive audio input, such as user voice input. In some implementations, one or more cameras or other types of sensors (e.g., inertial measurement unit (IMU)) may function as input devices to receive gestural input, such as motion of the handheld controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively comprise any other type of output device.

In addition, the handheld controller 100 may include one or more communication interfaces 2904 to facilitate a wireless connection to a network and/or to one or more remote systems (e.g., a host computing device executing an application, a game console, etc.). The communication interfaces 2904 may implement one or more of various wireless technologies, such as Wi-Fi, Bluetooth, radio frequency (RF), and so on. It is to be appreciated that the handheld controller 100 may further include physical ports to facilitate a wired connection to a network, a connected peripheral device, or a plug-in network device that communicates with other wireless networks.

In the illustrated implementation, the handheld controller further includes one or more processors 2906 and computer-readable media 2908. In some implementations, the processors(s) 2906 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 2906 may possess its own local memory, which also may store program modules, program data, and/or one or more operating systems.

In general, the controller may include logic (e.g., software, hardware, and/or firmware, etc.) that is configured to implement the techniques, functionality, and/or operations described herein. The computer-readable media 2908 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 2908 may be implemented as computer-readable storage media ("CRSM"), which may be any available physical media accessible by the processor(s) 2906 to execute instructions stored on the computer-readable media 2908. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 2906.

Several modules such as instruction, datastores, and so forth may be stored within the computer-readable media 2908 and configured to execute on the processor(s) 2906. A few example functional modules are shown as stored in the computer-readable media 2908 and executed on the processor(s) 2906, although the same functionality may alternatively be implemented in hardware, firmware, or as a system on a chip (SOC).

An operating system module 2910 may be configured to manage hardware within and coupled to the handheld controller 100 for the benefit of other modules. In addition, the computer-readable media 2908 may store a network-communications module 2912 that enables the handheld controller 100 to communicate, via the communication interfaces 2904, with one or more other devices, such as a personal computing device executing an application (e.g., a game application), a game console, a HMD, a remote server, or the like. The computer-readable media 2908 may further include a game-session database 2914 to store data associated with a game (or other application) executing on the handheld controller or on a computing device to which the handheld controller 100 couples. The computer-readable media 2908 may also include a device-record database 2916 that stores data associated with devices to which the handheld controller 100 couples, such as the personal computing device, game console, HMD, remote server or the like. The computer-readable media 2908 may further store game-control instructions 2918 that configure the handheld controller 100 to function as a gaming controller, and universal-control instructions 2920 that configure the handheld controller 100 to function as a controller of other, non-gaming devices.

Figure 30:
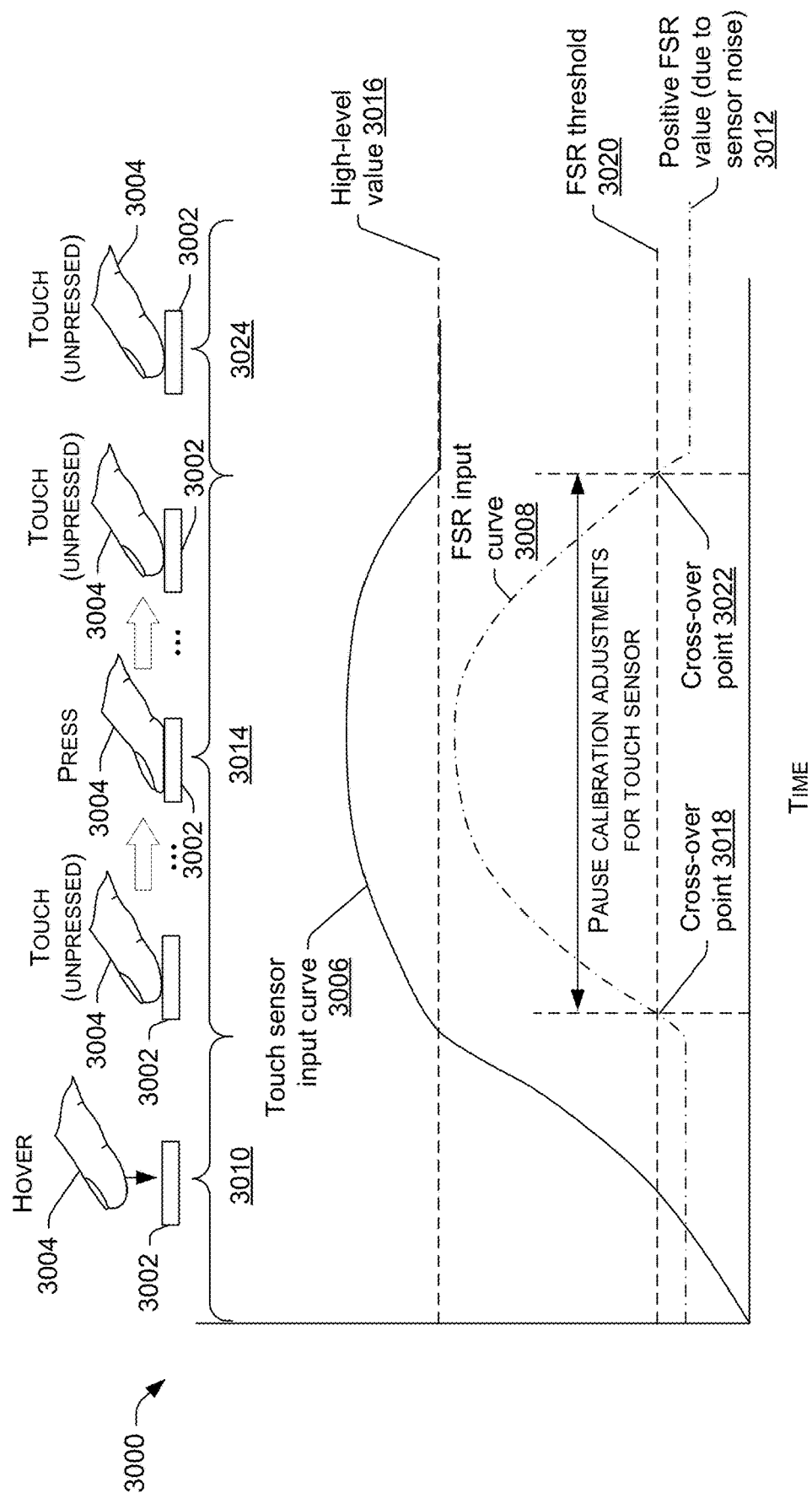
FIG. 30 depicts a graph illustrating a technique for pausing calibration adjustments for a touch sensor with respect to a high-level value as a user presses upon a control of a handheld controller with an above-threshold amount of force.

FIG. 30 depicts a graph 3000 illustrating a technique for pausing calibration adjustments for a touch sensor—at least with respect to a high-level value indicative of an object touching a control without pressing—as a user presses upon a control of a handheld controller with an above-threshold amount of force. FIG. 30 shows a control 3002 of a handheld controller 100, as well as a finger 3004 depicted in various positions relative to the control 3002 over a time range. The finger 3004 is an example of an object that may interact with the control 3002. Because the control 3002 may be associated with a touch sensor that is configured to provide touch sensor data indicative of a proximity of the finger 3004 relative to the control 3002, the finger 3004 may interact with the control 3002 by hovering above the control 3002 without touching the control 3002, and/or by touching or contacting the control 3002. Because the control 3002 may also be associated with a FSR, the finger 3004 may interact with the control 3002 by pressing upon the control 3002 with variable force. These different types of interactions may "operate" the control 3002 to implement different functions. It is to be appreciated that, although FIG. 30 depicts a finger 3004 as an example object that may interact with the control 3002, other objects (e.g., a thumb, a portion of a hand, such as a palm of the hand, multiple fingers, a stylus, etc.) may interact with the control 3002 to operate the control 3002 in a similar fashion. Accordingly, the finger 3004 shown in FIG. 30 is merely an example, and other objects are considered herein with respect to the disclosed embodiments.

The control 3002 may represent any of the controls described herein that are provided on a handheld controller 100, as described herein. For example, with reference to FIG. 23, the control 3002 may represent a control that is disposed on the controller body 110 and is configured to be pressed by a finger or a thumb. For example, the control 3002 may represent the thumb-operated control 114, the thumb-operated control 115, and/or the thumb-operated control 116, and/or a finger-operated control (e.g., a trigger 609, shown in FIG. 6B). Thus, the control 3002 may be disposed on the head 113 of the controller body 100, for example. As another example, the control 3002 may represent the handle 112 of the controller body 110, which is configured to be squeezed by a hand. Accordingly, the control 3002 of FIG. 30 may be associated with a touch sensor, such as the touch sensor(s) 2300 of FIG. 23, which may be configured to provide touch sensor data indicative of a proximity of an object (e.g., a finger, a thumb, etc.) relative to the associated control 3002 (e.g., one or more of the thumb-operated controls 114-116). This may include touch sensor data that is indicative of the object contacting the associated control 3002. The touch sensor(s) associated with the control 3002 may, in some embodiments, include the array of proximity sensors 800 included within the handle 112 of the controller body 110. For example, the array of proximity sensors 800 may be spatially distributed on the handle 112 may be configured to provide proximity data indicative of a hand grasping the handle 112 (an example of the control 3002 in FIG. 30). Accordingly, the control 3002 may be associated with a touch sensor that uses any suitable technology for sensing contact and/or proximity of an object, such as the finger 3004, to the control 3002, as disclosed herein. In an example, the touch sensor(s) associated with the control 3002 comprises a capacitive sensor (or array of capacitive sensors) that are mounted within the controller body 110 (e.g., adhered or otherwise attached to a back surface of the outer housing and underneath the controls 114-116 and/or the handle 112, attached to a structure, such as a PCB, within the head 113, etc.). In other instances, the touch sensor(s) associated with the control 3002 may be based on other touch-sensing technologies, such as an infrared or acoustic touch sensing.

The control 3002 may also be associated with a FSR configured to provide force data indicative of an amount of force of a press of the control 3002. When the control 3002 represents the handle 112 of the controller 100, such a press may include a squeeze of the handle 112. Accordingly, the control 3002 may be associated with one or more of the FSRs 1300 shown in FIG. 23, which may be mounted within the controller body 110, as described herein.

FIG. 30 illustrates how a touch sensor input curve 3006 and a FSR input curve 3008 change over time, respectively, in accordance with the interaction between the finger 3004 and the control 3002. The touch sensor input curve 3006 plots, against time, the digitized proximity values based on touch sensor data provided by the touch sensor associated with the control 3002. In embodiments where the touch sensor is a capacitive sensor configured to measure capacitance values, the values of the touch sensor input curve 3006 may represent digitized capacitive values that have been converted from an analog capacitance measured by the touch sensor. Meanwhile, the FSR input curve 3008 plots, against time, the digitized FSR values based on force data provided by the FSR associated with the control 3002. These values of the FSR input curve 3008 may represent digitized values that have been converted from an analog resistance measured by the FSR.

At the start of the time range 3010, the digitized proximity values on the touch sensor input curve 3006 are low because the finger 3004 is spaced apart from the control 3002 and not touching the control 3002. At this low point of the touch sensor input curve 3006, the finger 3004 is also not pressing on control 3002. During the time range 3010, the positive FSR value 3012 on the FSR input curve 3008 represents bias of the FSR output due to sensor noise. That is, the force data provided by the FSR, even when the finger 3004 is not touching the control 3002, may be converted into a positive digitized FSR value, which is an "imaginary" force in the sense that it is a force that is output when the finger 3004 is not pressing upon the control 3002. Over the course of the time range 3010, the finger 3004 moves closer to the control 3002, and the values of the touch sensor input curve 3006 increase in accordance with this movement because the touch sensor associated with the control 3002 is configured to provide touch sensor data indicative of a proximity of an object (e.g., the finger 3004) relative to the control 3002, which means that the digitized proximity values on the touch sensor input curve 3006 increase as the finger 3004 is detected to be at closer and closer positions relative to the control 3002. Meanwhile, the FSR input curve 3008 remains constant (does not change) during the time range 3010 because no pressure is being applied to the control 3002.

At the start of the time range 3014, the finger 3004 comes into contact with the control 3002 for the first time. At this point the digitized proximity values on the touch sensor input curve 3006 may be measured at or near a high-level value 3016. This is sometimes referred to as the maximum proximity value corresponding to a touch input. The high-level value 3016 indicative of an object (e.g., the finger 3004) contacting the control 3002, without pressing the control 3002. In some embodiments, this high-level value 3016 may have been determined based on a discrete gesture detection. For example, a calibration algorithm for the touch sensor associated with the control 3002 may analyze the touch sensor data (i.e., the capacitance values) provided by the control to detect a discrete gesture. For instance, if the touch sensor data indicates that digitized proximity values (e.g., capacitance values) of the touch sensor suddenly drop, the calibration algorithm for the touch sensor may associate this drop of values with the user releasing a grip on the controller 100 (e.g., spreading fingers away from the handle 112) or releasing a particular finger 3004 from the control 3002 (e.g., lifting the finger 3004 off of the control 3002 to cease touching the control 3002). The proximity (e.g., capacitance) values received as the user suddenly releases his or her finger 3004 from the control 3002 may correspond to a low-level value for a range of proximity (e.g., capacitance) values detected by the touch sensor (e.g., where the low-level value represents when the finger 3004 is not touching the control 3002 and is spaced apart from the control 3002). The proximity (e.g., capacitance) values received prior to the sudden drop may correspond to the high-level value 3016 shown in the graph 3000 (e.g., where the high-level value 3016 represents when the finger 3004 is touching the control 3002 without pressing). With the range of proximity (e.g., capacitance) values, the calibration algorithm may determine a bias and a scale factor for the touch sensor to normalize the proximity (e.g., capacitance) values measured by touch sensor.

At a slightly later time during the time range 3014, the finger 3004 presses upon the control 3002. At this point, the digitized FSR values on the FSR input curve 3008 may start to increase due to the application of an amount of force with on the control 3002 with the initial touch input. As the finger 3004 presses harder upon the control 3002, the FSR values on the FSR input curve 3008 begin to increase, approaching a cross-over point 3018 where the FSR values transition from below a FSR threshold 3020 (a threshold value) to above the FSR threshold 3020. Thus, logic of the handheld controller 100 may determine that a first digitized FSR value (based on the force data provided by the FSR associated with the control 3002) exceeds the FSR threshold 3020, which is indicative of a transition from the finger 3004 contacting the control 3002 without pressing upon the control 3002 to the finger 3004 pressing upon the control 3002 with an above-threshold amount of force that corresponds to the FSR threshold 3020. Said another way, the logic may detect a first transition from a first digitized FSR value less than or equal to the FSR threshold 3020 to a second digitized FSR value greater than the FSR threshold 3020. In response to determining that a digitized FSR value exceeds the FSR threshold 3020 (e.g., in response to detecting the first transition over the cross-over point 3018), the logic may pause the ongoing calibration adjustments for the touch sensor, which, in the absence of the pausing would have increased the high-level value 3016 to the values on the touch sensor input curve 3006 that exceed the existing high-level value 3016 during the time range 3014. That is, during the time range 3014, the finger 3004 may press, and then release the pressure on the control 3002. Contemporaneously with this pressing and release of pressure on the control 3002, the FSR input curve 3008 rises and falls (e.g., spikes), and the touch sensor input curve 3006 also rises and falls above the high-level value 3016 due to the larger contact area and/or downward deflection of the control 3002 towards the associated touch sensor. The pausing of the calibration adjustments effectively clips the high-level value 3016 to a value at or near the cross-over point 3018 by instructing the calibration algorithm to pause, suspend, or otherwise halt its tracking of the high-level value 3016 between the cross-over point 3018 and a subsequent cross-over point 3022 when the FSR values transition from above the FSR threshold 3020 to below the FSR threshold 3020.

During the time range 3024, the finger 3004 remains in a state of touching the control 3002 without pressing, and the FSR values have now transitioned below the FSR threshold 3020 at the cross-over point 3022. At this point, calibration tracking can be resumed because the finger 3004 is no longer pressing upon the control 3002. Thus, the pausing of calibration adjustments for the touch sensor—at least with respect to the high-level value 3016, effectively instructs the calibration algorithm to ignore the range of proximity (e.g., capacitance) values on the touch sensor input curve 3006 during a time when the FSR values are above the FSR threshold 3020; the calibration algorithm essentially pretends that these proximity values on the touch sensor input curve 3006 do not exist for purposes of calibration tracking for the touch sensor. The rationale for ignoring the higher proximity values on the touch sensor input curve 3006 during between the cross-over points 3018 and 3022 is that the FSR is capturing the pressure-based input during this time, so there is no need to monitor the values on the touch sensor input curve 3006 during this time because the input during this time is due to the finger 3004 pressing harder upon the control 3002. By ignoring this data for calibration purposes, the touch sensor output is improved through better calibration of the touch sensor. This, in turn, may improve finger tracking algorithms so that, for example, a VR application does not render fingers of a virtual hand lifting off of the controller 100 when the user's hand still grasping the controller 100, or the VR application does not inadvertently interpret touch sensor data to inadvertently drop an object in a VR game.

As indicated in the graph 3000, the FSR associated with the control 3002 is configured to measure a range of resistance values that are converted into digitized FSR values. For example, the peak of the FSR input curve 3008 may represent an upper bound of the FSR range, and the positive FSR value 3012 may represent a lower bound of the FSR range. In some embodiments, the FSR threshold 3020 is about 5% to about 15% of the range of resistance values measurable by the FSR (or 5-15% of the range of digitized FSR values depicted in the graph 3000). In some embodiments, the FSR threshold 3020 is about 10% of the range of resistance values measurable by the FSR (or 10% of the range of digitized FSR values depicted in the graph 3000). In some embodiments, the FSR threshold 3020 is set to a value that is greater than the positive FSR value 3012 shown in the graph 3000 (or a corresponding positive resistance value measured by the FSR due to sensor noise). In some embodiments, the FSR threshold 3020 is greater than this positive FSR value 3012 by a threshold amount, such as two standard deviations greater than the noise floor, represented by the positive FSR value 3012. An objective may be to set the FSR threshold 3020 at a point where it is safe to interpret the digitized FSR value as pressure being applied to the control 3002, as opposed to a bias value due to sensor noise. Even if the zero point of the FSR output unknown to the calibration pausing logic, the low fidelity FSR range that is above the noise floor of the FSR can be identified so that the portion of the time range 3014 between the cross-over points 3018 and 3022 corresponds, with reasonable confidence, to the finger 3004 pressing upon the control 3002, as opposed to the finger 3004 touching the control 3002 without pressing.

Figure 31:
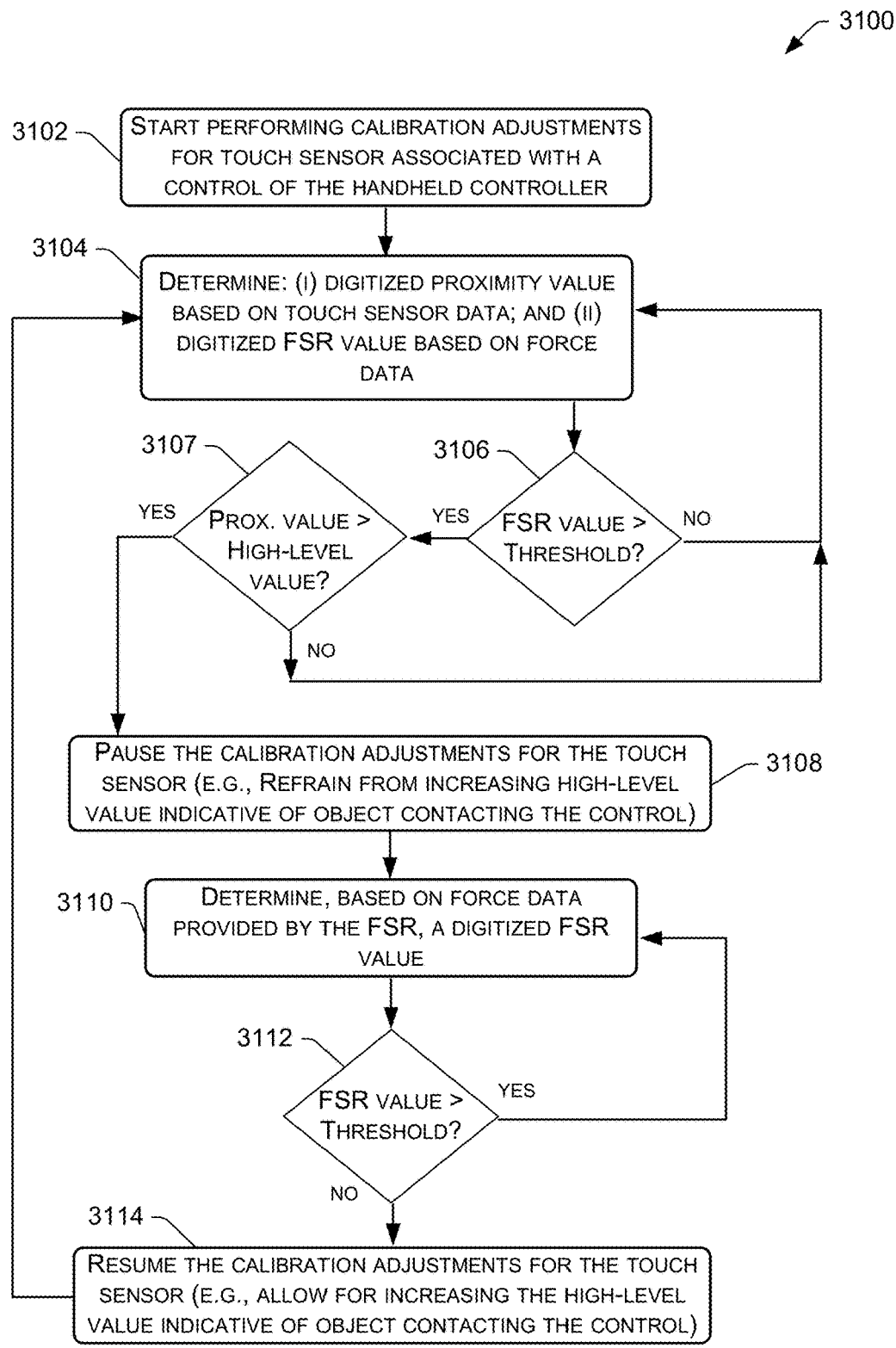
FIG. 31 is a flow diagram of an example process for pausing calibration adjustments for a touch sensor with respect to a high-level value as a user presses upon a control of a handheld controller with an above-threshold amount of force.

FIG. 31 is a flow diagram of an example process 3100 for pausing calibration adjustments for a touch sensor with respect to a high-level value as a user presses upon a control 3002 of a handheld controller 100/600 with an above-threshold amount of force.

At 3102, logic of a handheld controller 100/600 may start performing calibration adjustments for a touch sensor associated with at least one control 3002 of the handheld controller 100/600. Performing calibration adjustments at block 3102 may be started in response to the controller 100/600 being powered on, and may involve adjusting, in response to a criterion being satisfied, at least a high-level value 3016 indicative of the object (e.g., a finger, thumb, portion of a hand, stylus, etc.) contacting the control 3002. The criterion may be satisfied, in this context, when an average proximity value (based on touch sensor data from the touch sensor over a previous number of samples) exceeds the existing high-level value 3016. If such a criterion is satisfied during use of the handheld controller 100/600, the high-level value 3016 may be increased from an existing value to a new value that is greater than the existing value. An example calibration algorithm is discussed in more detail with respect to FIG. 32, below. It is to be appreciated that performing calibration adjustments at block 3102 may also involve adjusting a low-level value indicative of the object being spaced apart from the control 3002 if a different criterion is satisfied.

At 3104, the logic may determine: (i) a digitized proximity value based at least in part on the touch sensor data provided by a touch sensor associated with the control 3002, and (ii) a (first) digitized FSR value based at least in part on the force data provided by an FSR associated with the control 3002. For example, the digitized proximity value may be converted from a capacitance measured by the touch sensor, and/or this digitized FSR value may be converted from a resistance measured by the FSR.

At 3106, the logic may determine whether the (first) digitized FSR value determined at block 3104 exceeds a threshold value (e.g., the FSR threshold 3020). If the digitized FSR value does not exceed the threshold value, the process 3100 may follow the "NO" route from block 3106 to determine another digitized proximity value and another digitized FSR value. In other words, the calibration adjustments are not paused so long as the digitized FSR values do not exceed the FSR threshold 3020. If the (first) digitized FSR value exceeds the threshold value at block 3106, the process 3100 may follow the "YES" route from block 3106 to block 3107. The digitized FSR value exceeding the FSR threshold 3020 may be indicative of a transition from the object contacting the control 3002 without pressing upon the control 3002 to the object pressing upon the control 3002. Said another way, the logic, at block 3106, may detect, based at least in part on the force data provided by the FSR associated with the control 3002, a first transition from a (first) digitized FSR value less than or equal to a threshold value (e.g., FSR threshold 3020) to a (second) digitized FSR value greater than the threshold value.

At 3107, the logic may, in response to determining that the digitized FSR value exceeds the threshold value at block 3106, determine whether the digitized proximity value determined at block 3104 exceeds the high-level value 3016. If the digitized proximity value does not exceed the high-level value 3016, the process 3100 may follow the "NO" route from block 3107 to determine another digitized proximity value and another digitized FSR value. In other words, the calibration adjustments are not paused so long as the digitized proximity values do not exceed the high-level value 3016. In reference to FIG. 30, this scenario would occur if the touch sensor input curve 3006 happened to be below the high-level value 3016 at a time corresponding to the cross-over point 3018. If the digitized proximity value exceeds the high-level value 3016 at block 3107, the process 3100 may follow the "YES" route from block 3107 to block 3108.

At 3108, the logic may pause the calibration adjustments that were started at block 3102. This pausing of the calibration adjustments at block 3108 may be performed in response to determining that the digitized FSR value exceeds the threshold value at block 3106 (e.g., in response to detecting the first transition from a (first) digitized FSR value less than or equal to a threshold value to a (second) digitized FSR value greater than the threshold value) and also in response to determining that the digitized proximity value exceeds the high-level value 3016 at block 3107. Pausing calibration adjustments may include refraining from increasing the high-level value 3016 after detecting the first transition at block 3106 and after determining that the current digitized proximity value is greater than the high-level value 3016. Pausing calibration adjustments may include limiting the high-level value 3016 to a fixed value such that the high-level value 3016 does not increase while limited to the fixed value. Example techniques for pausing the calibration adjustment are further disclosed with reference to FIGS. 33 and 34, below.

At 3110, the logic may determine a (second) digitized FSR value based at least in part on the force data provided by the FSR associated with the control 3002. For example, this digitized FSR value may be converted from a resistance measured by the FSR after pausing the calibration adjustments at block 3108.

At 3112, the logic may determine whether the (second) digitized FSR value determined at block 3110 exceeds the threshold value (e.g., the FSR threshold 3020). If the digitized FSR value exceeds the threshold value at block 3112, the process 3100 may follow the "YES" route from block 3112 to determine another digitized FSR value. In other words, the calibration adjustments remain paused so long as the digitized FSR values continue to exceed the FSR threshold 3020. If the (second) digitized FSR value is less than or equal to the threshold value at block 3112, the process 3100 may follow the "NO" route from block 3112 to block 3114. The digitized FSR value being less than or equal to the FSR threshold 3020 at block 3112 may be indicative of a transition from the object pressing upon the control 3002 to the object contacting the control 3002 without pressing upon the control 3002. Said another way, the logic, at block 3112, may detect, based at least in part on the force data provided by the FSR associated with the control 3002, a second transition from a (third) digitized FSR value greater than the threshold value (e.g., FSR threshold 3020) to a (fourth) digitized FSR value less than or equal to the threshold value.

At 3114, the logic may, in response to determining that the digitized FSR value is less than or equal to the threshold value at block 3112 (e.g., in response to detecting the second transition from a (third) digitized FSR value greater than the threshold value to a (fourth) digitized FSR value less than or equal to the threshold value, resume the calibration adjustments that were paused at block 3108. Resuming calibration adjustments may include allowing for increasing the high-level value 3016 after detecting the second transition at block 3112. Following block 3114, the process 3100 may iterate blocks 3104 to 3114 until the handheld controller 100/600 is powered off, for example.

Figure 32:
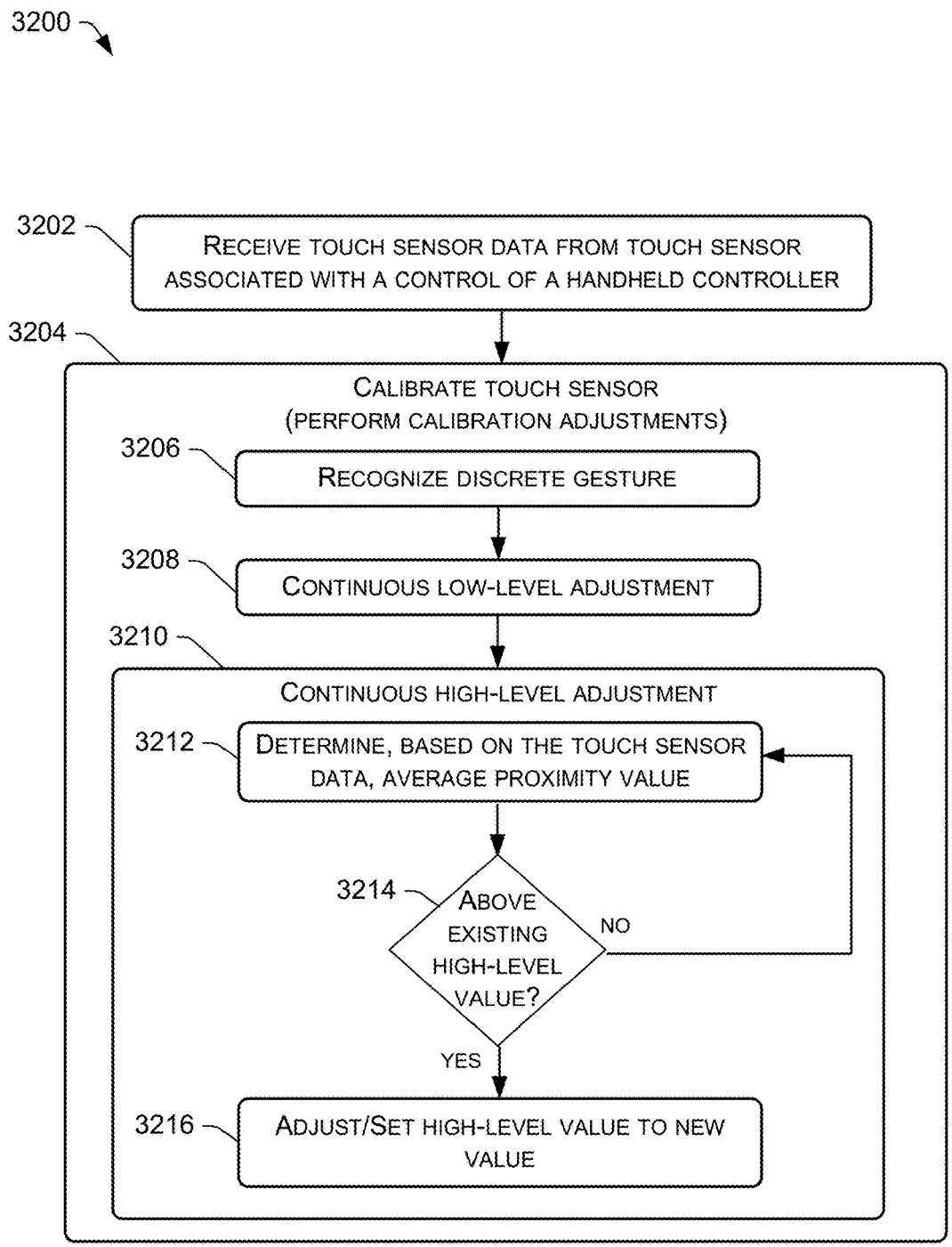
FIG. 32 is a flow diagram of an example process for performing continuous calibration adjustments for a touch sensor associated with a control of a handheld controller.

FIG. 32 is a flow diagram of an example process 3200 for performing continuous calibration adjustments for a touch sensor associated with a control 3002 of a handheld controller 100/600.

At 3202, one or more processors of the handheld controller 100/600 may receive touch sensor data from a touch sensor associated with a control 3002 of the handheld controller 100/600. For example, the touch sensor data may include digitized proximity (e.g., capacitive) values converted from an analog proximity measurement (e.g., capacitance) of the touch sensor.

At 3204, logic of the handheld controller 100/600 (e.g., logic implementing a calibration algorithm) may calibrate the touch sensor associated with the control 3002 by performing calibration adjustments. As shown by the sub-blocks of block 3204, this calibration may involve various sub-operations.

At 3206, the logic may perform a discrete gesture detection. This may involve analyzing the touch sensor data (i.e., the capacitance values) provided by the touch sensor to detect a discrete gesture at the controller 100/600. For instance, if the touch sensor data indicates that proximity (e.g., capacitance) values for the touch sensor suddenly drop, the logic may associate this drop of proximity (e.g., capacitance) values with the user releasing his or her hand from the control 3002 or releasing a particular finger 3004 from the control 3002. The proximity (e.g., capacitance) values received as the user suddenly releases his or her finger 3004 from the control 3002 may correspond to a low-level value for a range of proximity (e.g., capacitance) values detected by touch sensor (e.g., where the low-level value represents when the finger 3004 is spaced apart from and is not touching the control 3002). The proximity (e.g., capacitance) values received prior to the sudden drop may correspond to a high-level value 3016 of the range of proximity (e.g., capacitance) values detected by the touch sensor (e.g., where the high-level value 3016 represents when the finger 3004 is touching the control 3002 without pressing).

At 3208, the logic may perform a continuous calibration (update and decay) for the low-level value. For instance, as touch sensor data is received from the touch sensor, the logic may continuously monitor the touch sensor data to re-calibrate or reset the low-level value for the range of proximity (e.g., capacitance) values for the touch sensor. In other words, through continuously receiving the touch sensor data from the touch sensor, the logic may determine whether the proximity (e.g., capacitance) values are lower than the previously determined low-level value of the range. For instance, as the capacitance changes through a gameplay experience (e.g., hands become sweaty or dry, humidity, temperature, etc.), the logic, at block 3208 may determine, or set, a new low-level value, thereby adjusting the range of proximity (e.g., capacitance) values detected by the touch sensor.

At 3210, the logic may perform a continuous calibration (update and decay) for the high-level value 3016. For instance, as touch sensor data is received from the touch sensor, the logic may continuously monitor the touch sensor data to re-calibrate or reset the high-level value 3016 for the range of proximity (e.g., capacitance) values for the touch sensor. In other words, through continuously receiving the touch sensor data from the touch sensor, the logic may determine whether the proximity (e.g., capacitance) values are greater than the previously determined high-level capacitance value of the range. For example, sub-blocks 3212-3216 may be performed at block 3210.

At 3212, the logic may determine an average proximity value based at least in part on the touch sensor data provided by the touch sensor over a previous number of samples (e.g., counts, frames, etc.). For example, the proximity values detected over the previous N (e.g., where N=20) samples may be converted from analogue output of the touch sensor (e.g., a measured analog capacitance), and the logic may determine the average of these N proximity values. This provides the average proximity value over the previous N samples.

At 3214, the average proximity value determined at block 3212 may be compared to the high-level value 3016 that is set to an existing value to determine whether the average proximity value exceeds the high-level value 3016. If the average proximity value does not exceed the existing high-level value 3016, the process 3200 may follow the "NO" route from block 3214 to block 3212 where another, subsequent average proximity value is determined based on additional touch sensor data provided by the touch sensor. If the average proximity value exceeds the existing high-level value 3016, the process 3200 may follow the "YES" route from block 3214 to block 3216.

At 3216, in response to the average proximity value exceeding the existing high-level value 3016, the logic may adjust the high-level value 3016 from the existing value to a new value greater than the existing value. In other words, the high-level value 3016 is increased at block 3216. In some embodiments, the new high-level value 3016 is determined at block 3216 based at least in part on a percentage, or weight, of the average proximity values received over a predetermined number of frames. For instance, the new high-level value 3016, may extend (or be pushed up) towards the average proximity value determined from the previous number of past samples. In some instances, the amount the high-level value 3016 "grows" may be determined by multiplying the average proximity values from the previous number of frames by a variable, such as 0.2. However, the variable may be optimized such that the high-level value 3016 "grows" towards the average proximity value determined over the previous number of frames to accurately determine a hand gesture of the user holding the handheld controller 100/600. In some instances, the amount of growth of the high-level value 3016 may also be based at least in part on an amount that the average proximity value exceeds the high-level value 3016 at block 3214.

In some embodiments, performing the calibration adjustments at block 3204 may include decaying the low-level value or the high-level value 3016 over time, depending on how the user grips the controller 100/600, environmental conditions (e.g., humidity), or other properties (e.g., skin wetness). For example, the high-level value 3016 may gradually decrease from an existing value to a predetermined lower value, and/or the low-level value may gradually increase from an existing value to a predetermined higher value. The amount the low-level value and the high-level value 3016 may decay may be limited, such that the low-level value and the high-level value 3016 are separated by a threshold amount of range to reduce sensor noise of the touch sensor. In some instances, the decay may depend on time and/or a rate of change in the proximity (e.g., capacitance) values of the touch sensor. For instance, if the user taps their fingers on the control 3002, or a different user picks up the controller 100/600, thereby potentially causing a change in the proximity (e.g., capacitance) values received, the rate of decay may increase to reduce an amount of time required to update the low-level value and/or the high-level value 3016.

It is to be appreciated that when the calibration adjustments are paused (e.g., at block 3108 of the process 3100), this pausing of the calibration adjustments may include omitting or otherwise ignoring sub-block 3210 of block 3204 after such pausing. In other words, the pausing of calibration adjustments in response to an object pressing upon the control 3002 with an above-threshold amount of force, as described herein, means that the high-level value 3016 is not allowed to increase, yet, the continuous low-level adjustment at block 3208 may continue after the pausing. The pausing at least refers to preventing the high-level value 3016 from further increasing.

Figure 33:
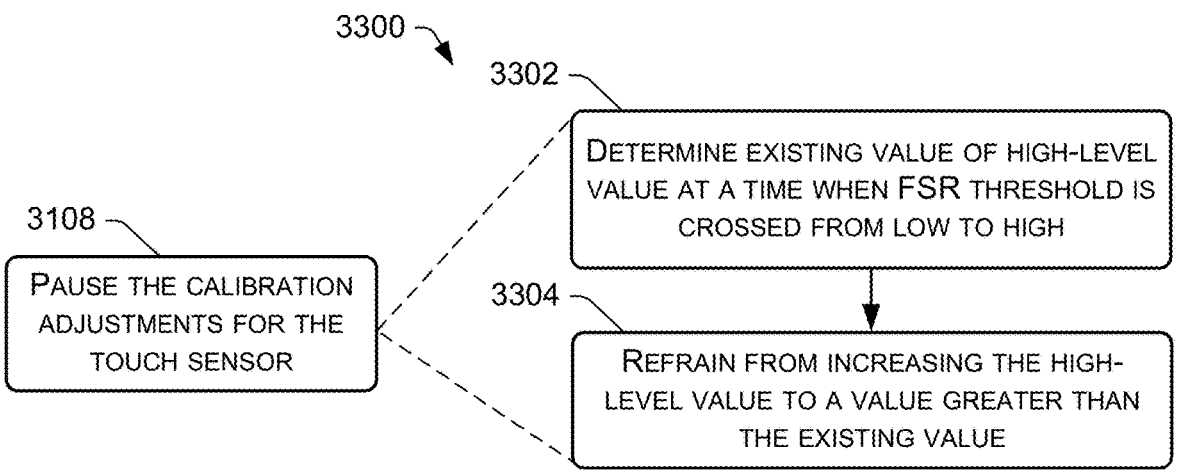
FIG. 33 is a flow diagram of an example sub-process of pausing the calibration adjustments for a touch sensor.

FIG. 33 is a flow diagram of an example sub-process 3300 of pausing the calibration adjustments for a touch sensor. For example, the process 3300 may be performed as part of block 3108 of the process 3100.

At 3302, logic of the handheld controller 100/600 may determine, at a time of determining that a (first) digitized FSR value exceeds the FSR threshold 3020 (e.g., at a time of detecting a first transition from a (first) digitized FSR value less than or equal to a threshold value (e.g., FSR threshold 3020) to a (second) digitized FSR value greater than the threshold value), an existing value to which the high-level value 3016 is currently set.

At 3304, the logic may refrain from increasing the high-level value 3016 to a value greater than the existing value determined at block 3302. In other words, the process 3300 determines what the high-level value 3016 is set to when the FSR input curve 3008 of the graph 3000 crosses the FSR threshold 3020 at the cross-over point 3018 (e.g., from below the FSR threshold 3020 to above the FSR threshold 3020), and the logic "freezes" the high-level value 3016 at the value it is currently set to at this point in time.

Figure 34:
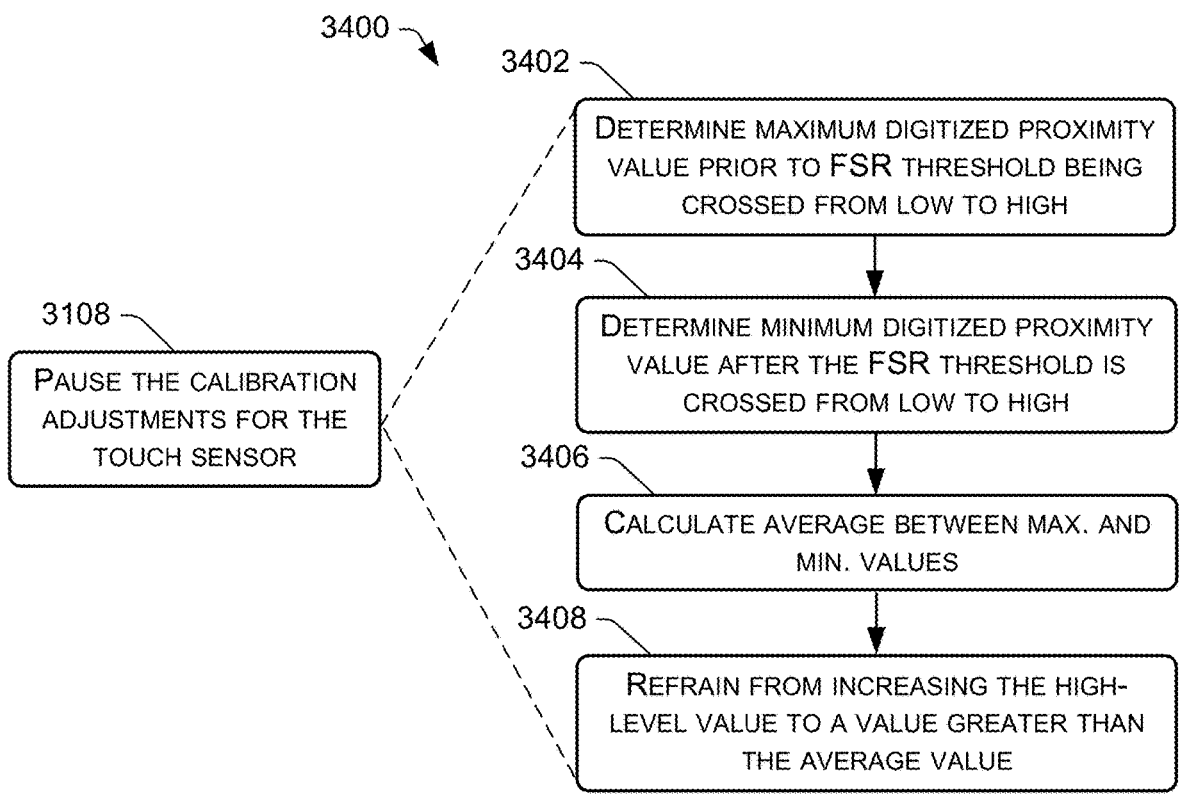
FIG. 34 is a flow diagram of another example sub-process of pausing the calibration adjustments for a touch sensor.

FIG. 34 is a flow diagram of another example sub-process 3400 of pausing the calibration adjustments for a touch sensor. For example, the process 3400 may be performed as part of block 3108 of the process 3100. The process 3400 may be performed in response to logic of the handheld controller 100/600 determining that a (first) digitized FSR value exceeds the FSR threshold 3020 (e.g., in response to detecting a first transition from a (first) digitized FSR value less than or equal to a threshold value (e.g., FSR threshold 3020) to a (second) digitized FSR value greater than the threshold value).

At 3402, the logic may determine a maximum value among multiple first digitized proximity (e.g., capacitance) values determined based on the touch sensor data that was provided by the touch sensor prior to determining that the (first) digitized FSR value exceeds the FSR threshold 3020 (e.g., prior to detecting the first transition). That is, the logic may determine the maximum proximity value of the touch sensor at a time before the FSR threshold 3020 was crossed from below the FSR threshold 3020 to above the FSR threshold 3020.

At 3404, the logic may determine a minimum value among multiple second digitized proximity values determined based on the touch sensor data that was provided by the touch sensor after determining that the (first) digitized FSR value exceeds the FSR threshold 3020 (e.g., after detecting the first transition). That is, the logic may determine the minimum proximity value of the touch sensor at a time after the FSR threshold 3020 was crossed from below the FSR threshold 3020 to above the FSR threshold 3020.

At 3406, the logic may calculate an average value between the maximum value determined at block 3402 and the minimum value determined at block 3404.

At 3408, the logic may refrain from increasing the high-level value 3016 to a value greater than the average value determined at block 3406. In other words, the process 3400 determines an average between the highest proximity (e.g., capacitance) value seen prior to the FSR input curve 3008 of the graph 3000 crossing the FSR threshold 3020 at the cross-over point 3018 (e.g., from below the FSR threshold 3020 to above the FSR threshold 3020) and the lowest proximity (e.g., capacitance) value seen after the FSR input curve 3008 crossed the FSR threshold 3020 at the cross-over point 3018, and the logic "freezes" the high-level value 3016 at the average value to pause the calibration adjustments.

Unless otherwise indicated, all numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Although the subject matter has been described in language specific to structural features, it is to be understood that the subject matter defined in the appended claims is not necessarily limited to the specific features described. Rather, the specific features are disclosed as illustrative forms of implementing the claims.

The disclosure is described with reference to specific exemplary embodiments herein, but those skilled in the art will recognize that the disclosure is not limited to those. It is contemplated that various features and aspects of the disclosure may be used individually or jointly and possibly in a different environment or application. For example, features shown with regards to a right-hand controller may be implemented also in a left-hand controller, and vice versa. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:
1. A system comprising:
one or more processors;
a handheld controller comprising a controller body, the controller body including:
  at least one control that is configured to be pressed;
  a touch sensor associated with the at least one control and configured to provide, to the one or more processors, touch sensor data indicative of a proximity of an object relative to the at least one control; and
  a force sensing resistor (FSR) associated with the at least one control and configured to provide, to the one or more processors, force data indicative of an amount of force of a press of the at least one control; and
logic configured to:
  perform calibration adjustments for the touch sensor by adjusting, in response to a criterion being satisfied, a high-level value indicative of the object contacting the at least one control;
  determine a first digitized FSR value based at least in part on the force data provided by the FSR;
  determine that the first digitized FSR value exceeds a threshold value indicative of a transition from the object contacting the at least one control without pressing upon the at least one control to the object pressing upon the at least one control;
  pause the calibration adjustments in response to determining that the first digitized FSR value exceeds the threshold value;
  determine a second digitized FSR value based at least in part on the force data provided by the FSR;

determine that the second digitized FSR value is less than or equal to the threshold value indicative of a transition from the object pressing upon the at least one control to the object contacting the at least one control without pressing upon the at least one control; and resume the calibration adjustments in response to determining that the second digitized FSR value is less than or equal to the threshold value.

2. The system of claim 1, wherein:

the touch sensor comprises a capacitive sensor configured to measure capacitance values based on a proximity of the object relative to the at least one control;

the high-level value represents a high-level capacitance value that corresponds to a capacitance value measured by the capacitive sensor at a time at which the object contacts the at least one control.

3. The system of claim 1, wherein:

the FSR is configured to measure a range of values; and the threshold value is about 5% to about 15% of the range of values.

4. The system of claim 1, wherein:

the high-level value is set to an existing value at a time of determining that the first digitized FSR value exceeds the threshold value; and pausing the calibration adjustments comprises refraining from increasing the high-level value to a value greater than the existing value.

5. The system of claim 1, wherein pausing the calibration adjustments comprises:

determining a maximum value among multiple first digitized proximity values determined based on the touch sensor data provided by the touch sensor prior to determining that the first digitized FSR value exceeds the threshold value;

determining a minimum value among multiple second digitized proximity values determined based on the touch sensor data provided by the touch sensor after determining that the first digitized FSR value exceeds the threshold value;

calculating an average value between the maximum value and the minimum value; and refraining from increasing the high-level value to a value greater than the average value.

6. The system of claim 1, wherein performing the calibration adjustments for the touch sensor comprises:

determining an average proximity value based at least in part on the touch sensor data provided by the touch sensor over a previous number of samples;

comparing the average proximity value to the high-level value that is set to an existing value; and if the average proximity value exceeds the existing value, adjusting the high-level value from the existing value to a new value that is greater than the existing value.

7. The system of claim 1, wherein the object is a finger or a thumb, and wherein the at least one control is disposed on a head of the controller body and is configured to be pressed by the finger or the thumb.

8. The system of claim 1, wherein the logic is further configured to:

determine a digitized proximity value based on the touch sensor data provided by the touch sensor; and determine that the digitized proximity value exceeds the high-level value, wherein pausing the calibration adjustments is further in response to determining that the digitized proximity value exceeds the high-level value.

9. A computer-implemented method comprising:

performing calibration adjustments for a touch sensor that is associated with at least one control of a handheld controller by adjusting, in response to a criterion being satisfied, a high-level value indicative of an object contacting the at least one control;

determining a first digitized force sensing resistor (FSR) value based at least in part on force data provided by a FSR that is associated with the at least one control;

determining that the first digitized FSR value exceeds a threshold value;

pausing the performing of the calibration adjustments in response to the determining that the first digitized FSR value exceeds the threshold value;

determining a second digitized FSR value based at least in part on the force data provided by the FSR;

determining that the second digitized FSR value is less than or equal to the threshold value; and resuming the performing of the calibration adjustments in response to the determining that the second digitized FSR value is less than or equal to the threshold value.

10. The computer-implemented method of claim 9, wherein:

the touch sensor comprises a capacitive sensor configured to measure capacitance values based on a proximity of the object relative to the at least one control; and the high-level value represents a high-level capacitance value that corresponds to a capacitance value measured by the capacitive sensor at a time at which the object contacts the at least one control.

11. The computer-implemented method of claim 9, wherein:

the FSR is configured to measure a range of values; and the threshold value is about 5% to about 15% of the range of values.

12. The computer-implemented method of claim 9, wherein:

the high-level value is set to an existing value at a time of the determining that the first digitized FSR value exceeds the threshold value, the method further comprising; and the pausing the performing of the calibration adjustments comprises refraining from increasing the high-level value to a value greater than the existing value.

13. The computer-implemented method of claim 9, wherein the pausing the performing of the calibration adjustments comprises:

determining a maximum value among multiple first digitized proximity values determined based on touch sensor data provided by the touch sensor prior to the determining that the first digitized FSR value exceeds the threshold value;

determining a minimum value among multiple second digitized proximity values determined based on the touch sensor data provided by the touch sensor after the determining that the first digitized FSR value exceeds the threshold value;

calculating an average value between the maximum value and the minimum value; and refraining from increasing the high-level value to a value greater than the average value.

14. The computer-implemented method of claim 9, further comprising:

determining a digitized proximity value based on touch sensor data provided by the touch sensor; and determining that the digitized proximity value exceeds the high-level value, wherein the pausing the performing of the calibration adjustments is further in response to the determining that the digitized proximity value exceeds the high-level value.

15. A system comprising:
one or more processors;
a handheld controller comprising a controller body, the controller body including:
  at least one control that is configured to be pressed;
  a touch sensor associated with the at least one control and configured to provide, to the one or more processors, touch sensor data indicative of a proximity of an object relative to the at least one control; and
  a force sensing resistor (FSR) associated with the at least one control and configured to provide, to the one or more processors, force data indicative of an amount of force of a press of the at least one control; and
logic configured to:
  perform calibration adjustments for the touch sensor by adjusting, in response to a criterion being satisfied, a high-level value indicative of the object contacting the at least one control;
  detect, based at least in part on the force data provided by the FSR, a first transition from a first digitized FSR value less than or equal to a threshold value to a second digitized FSR value greater than the threshold value;
  pause the calibration adjustments in response to detecting the first transition;
  detect, based at least in part on the force data provided by the FSR, a second transition from a third digitized FSR value greater than the threshold value to a fourth digitized FSR value less than or equal to the threshold value; and
  resume the calibration adjustments in response to detecting the second transition.

16. The system of claim 15, wherein:
the touch sensor comprises a capacitive sensor configured to measure capacitance values based on a proximity of the object relative to the at least one control; and
the high-level value represents a high-level capacitance value that corresponds to a capacitance value measured by the capacitive sensor at a time at which the object contacts the at least one control.

17. The system of claim 15, wherein:
the FSR measures a positive value when the object is not contacting the touch sensor; and
the threshold value is set to a value greater than the positive value.

18. The system of claim 15, wherein:
the high-level value is set to an existing value at a time of detecting the first transition; and
the logic is further configured to pause the calibration adjustments by refraining from increasing the high-level value to a value greater than the existing value.

19. The system of claim 15, wherein pausing the calibration adjustments comprises:
determining a maximum value among multiple first digitized proximity values determined based on the touch sensor data provided by the touch sensor prior to detecting the first transition;
determining a minimum value among multiple second digitized proximity values determined based on the touch sensor data provided by the touch sensor after the detecting the first transition;
calculating an average value between the maximum value and the minimum value; and
refraining from increasing the high-level value to a value greater than the average value.

20. The system of claim 15, wherein performing the calibration adjustments for the touch sensor comprises:
determining an average proximity value based at least in part on the touch sensor data provided by the touch sensor over a previous number of samples;
comparing the average proximity value to the high-level value that is set to an existing value; and
if the average proximity value exceeds the existing value, adjusting the high-level value from the existing value to a new value that is greater than the existing value.

* * * * *